(12) United States Patent
Kubota et al.

(10) Patent No.: US 11,693,114 B2
(45) Date of Patent: Jul. 4, 2023

(54) DISTANCE MEASURING DEVICE

(71) Applicants:KABUSHIKI KAISHA TOSHIBA, Tokyo (JP); TOSHIBA ELECTRONIC DEVICES & STORAGE CORPORATION, Tokyo (JP)

(72) Inventors: Hiroshi Kubota, Yokohama Kanagawa (JP); Nobu Matsumoto, Ebina Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 286 days.

(21) Appl. No.: 17/200,504

(22) Filed: Mar. 12, 2021

(65) Prior Publication Data

US 2022/0091261 A1 Mar. 24, 2022

(30) Foreign Application Priority Data

Sep. 18, 2020 (JP) ................................ 2020-157625

(51) Int. Cl.
*G01S 17/89* (2020.01)
*G01S 17/10* (2020.01)
*G01S 7/4863* (2020.01)
*G01S 7/487* (2006.01)

(52) U.S. Cl.
CPC .............. *G01S 17/10* (2013.01); *G01S 7/487* (2013.01); *G01S 7/4863* (2013.01); *G01S 17/89* (2013.01)

(58) Field of Classification Search
CPC ........ G01S 17/10; G01S 17/89; G01S 17/931; G01S 17/42; G01S 7/4863; G01S 7/487; G01S 7/4814; G01S 7/4815; G01S 7/4816; G01S 7/4817

See application file for complete search history.

(56) References Cited

U.S. PATENT DOCUMENTS

| 2012/0242972 | A1 | 9/2012 | Wee | |
|---|---|---|---|---|
| 2013/0015331 | A1* | 1/2013 | Birk | ......................... G01J 1/18 |
| | | | | 250/208.2 |
| 2014/0071428 | A1 | 3/2014 | Suzuki et al. | |
| 2017/0139041 | A1* | 5/2017 | Drader | .................... G01S 7/487 |
| 2018/0003803 | A1 | 1/2018 | Kakani et al. | |
| 2018/0231660 | A1 | 8/2018 | Deane | |

(Continued)

FOREIGN PATENT DOCUMENTS

| JP | 2014-055860 A | 3/2014 |
|---|---|---|
| JP | 2019-521355 A | 7/2019 |

(Continued)

*Primary Examiner* — Jonathan M Hansen
(74) *Attorney, Agent, or Firm* — Kim & Stewart LLP

(57) ABSTRACT

A distance measuring device according to one embodiment includes a light emitter, a first light receiver, and a second light receiver. The light emitter includes a light source. The light source emits an optical signal. The first light receiver includes a first sensor and a first optical system. The first sensor includes first pixels. The first optical system is configured to guide a reflected light of the optical signal emitted from the light emitter to the first sensor. The second light receiver includes a second sensor and a second optical system. The second sensor includes second pixels. The second optical system is configured to guide the reflected light to the second sensor.

20 Claims, 32 Drawing Sheets

(56) References Cited

U.S. PATENT DOCUMENTS

| | | | |
|---|---|---|---|
| 2019/0227148 A1 | 7/2019 | Frederiksen et al. | |
| 2019/0317213 A1 | 10/2019 | Kubota et al. | |
| 2019/0331771 A1* | 10/2019 | Iguchi | G01S 7/4863 |
| 2020/0025934 A1 | 1/2020 | Kwon et al. | |
| 2020/0284884 A1* | 9/2020 | Henderson | G01S 7/4865 |
| 2020/0300985 A1 | 9/2020 | Kubota et al. | |
| 2021/0293957 A1 | 9/2021 | Kubota et al. | |

FOREIGN PATENT DOCUMENTS

| | | |
|---|---|---|
| JP | 2019-184545 A | 10/2019 |
| JP | 2020-013950 A | 1/2020 |
| JP | 2020-153746 A | 9/2020 |
| JP | 2021-148477 A | 9/2021 |

* cited by examiner

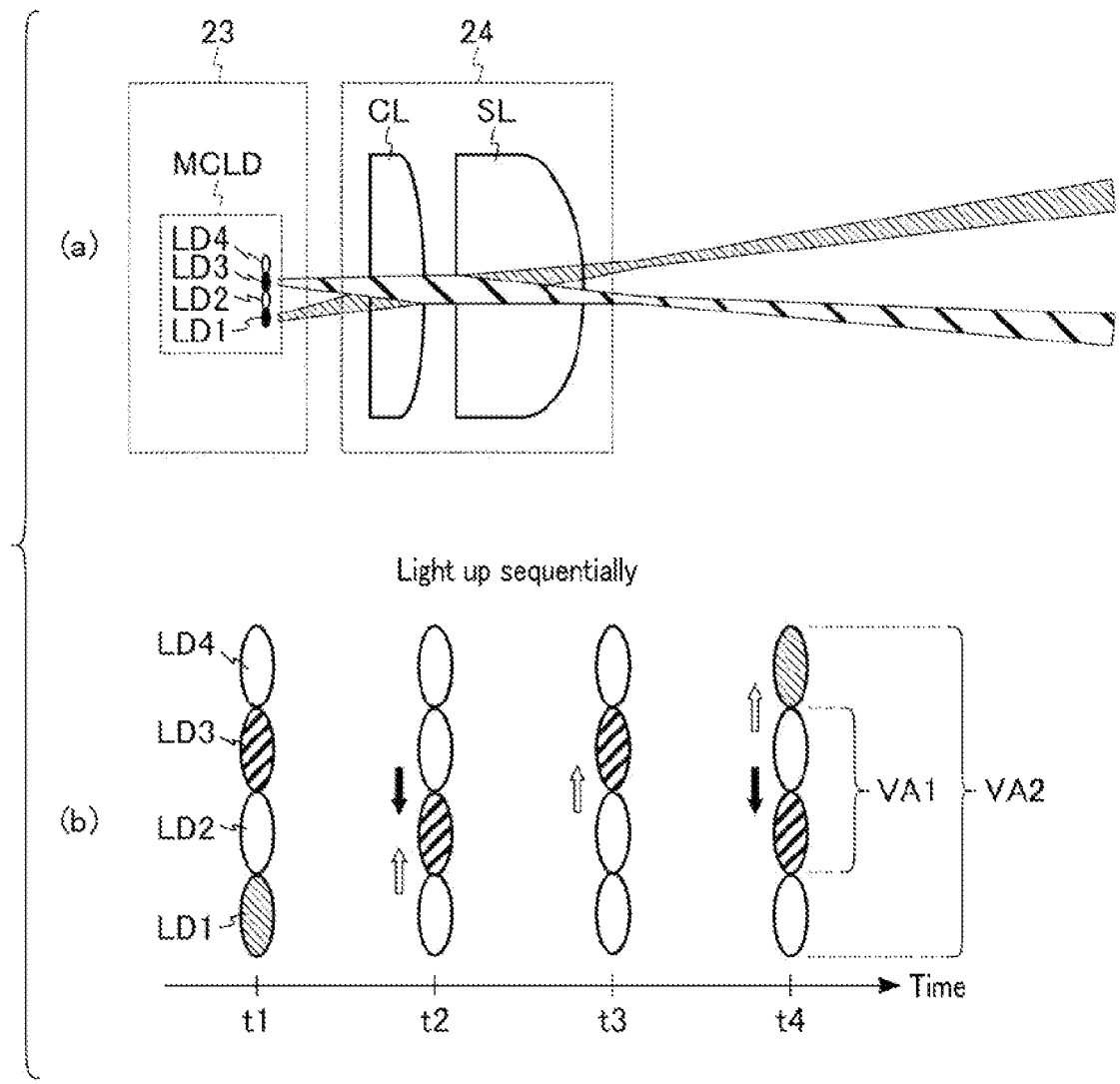
F I G. 18

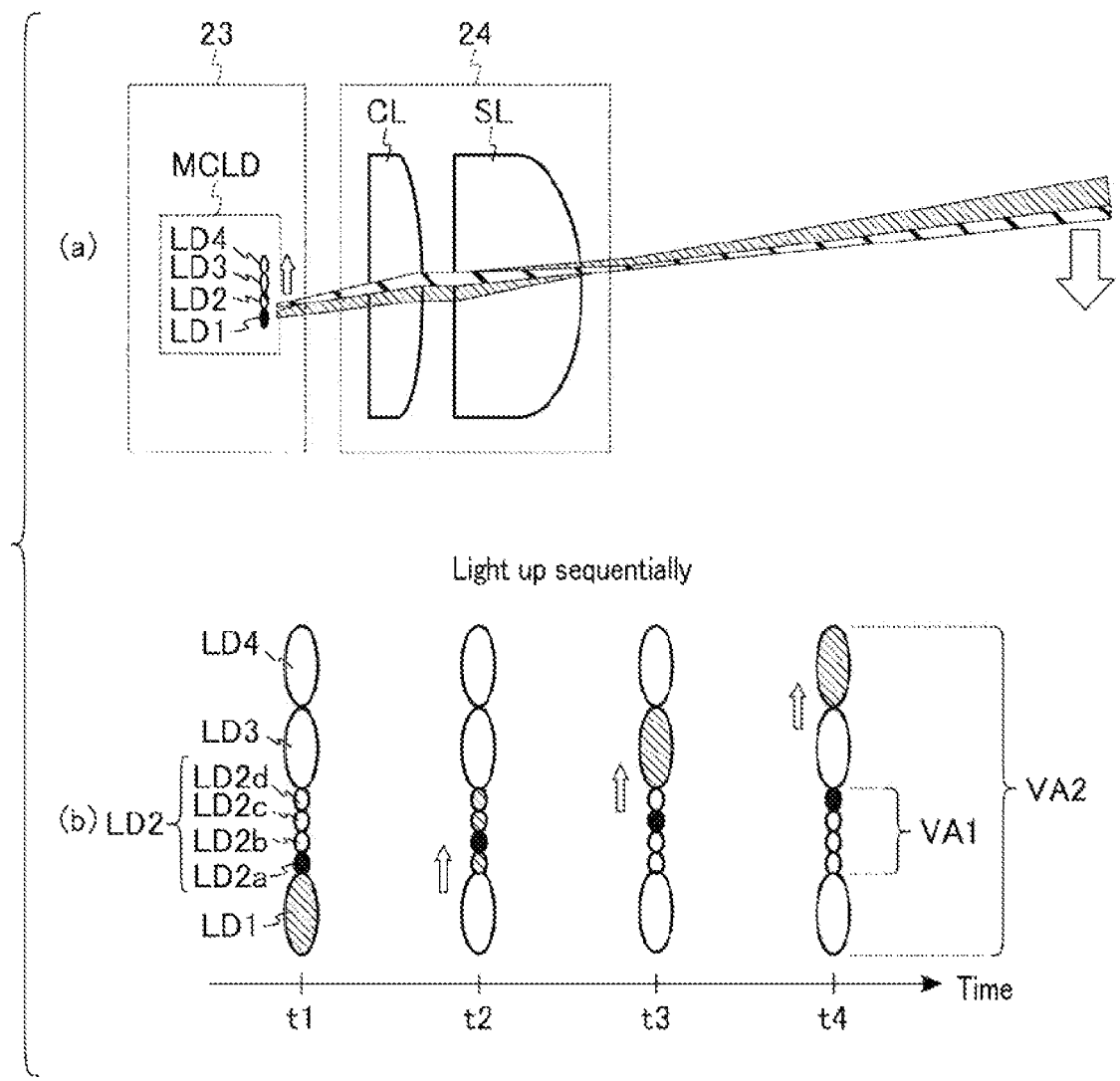
F I G. 19

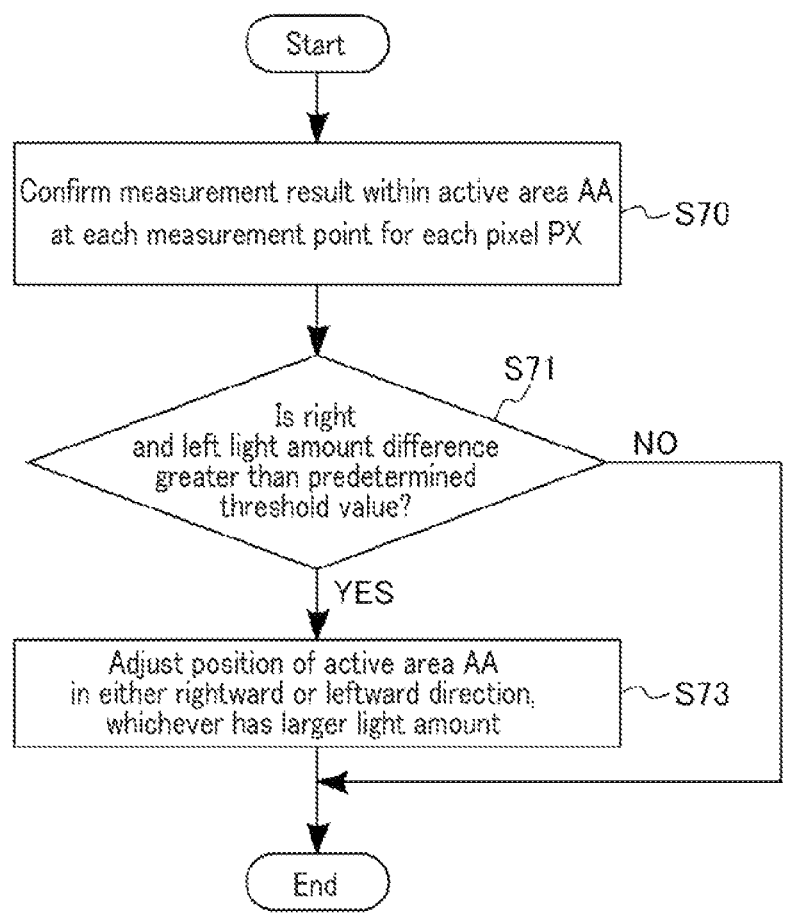
F I G. 31

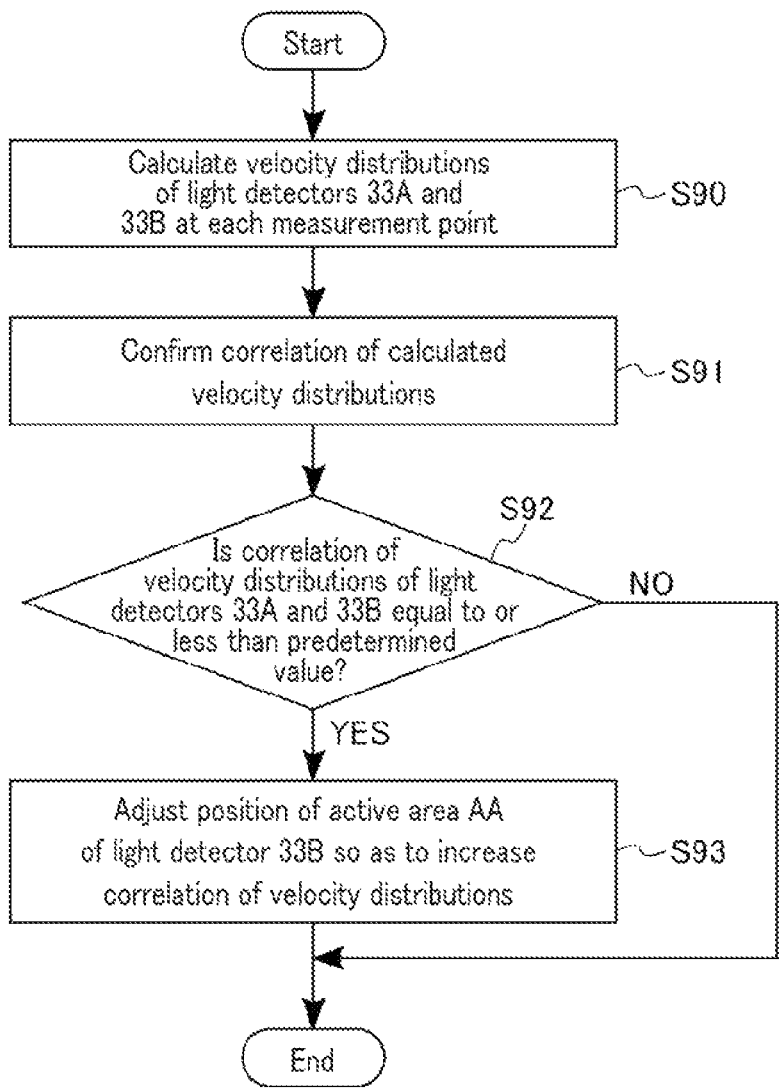
F I G. 35

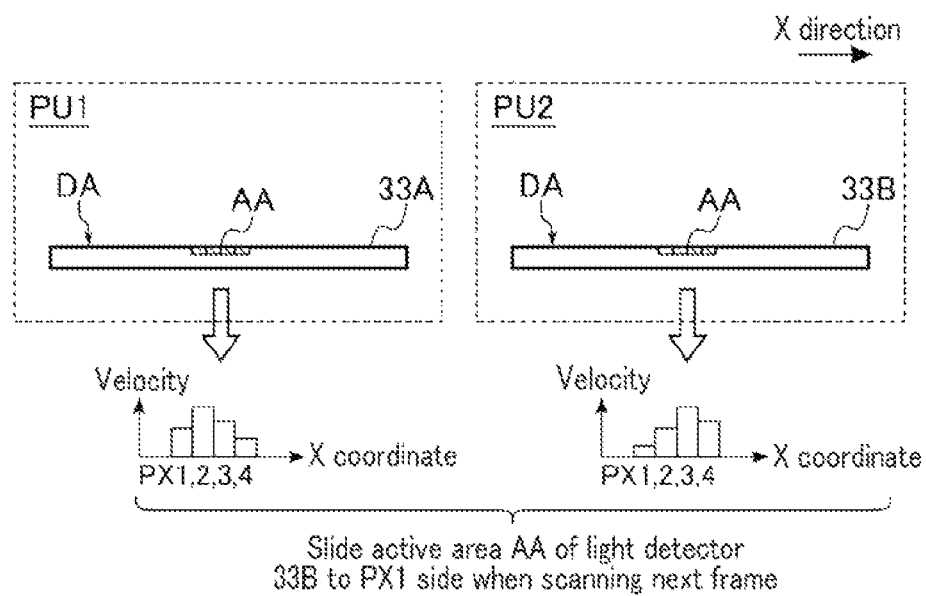
F I G. 36

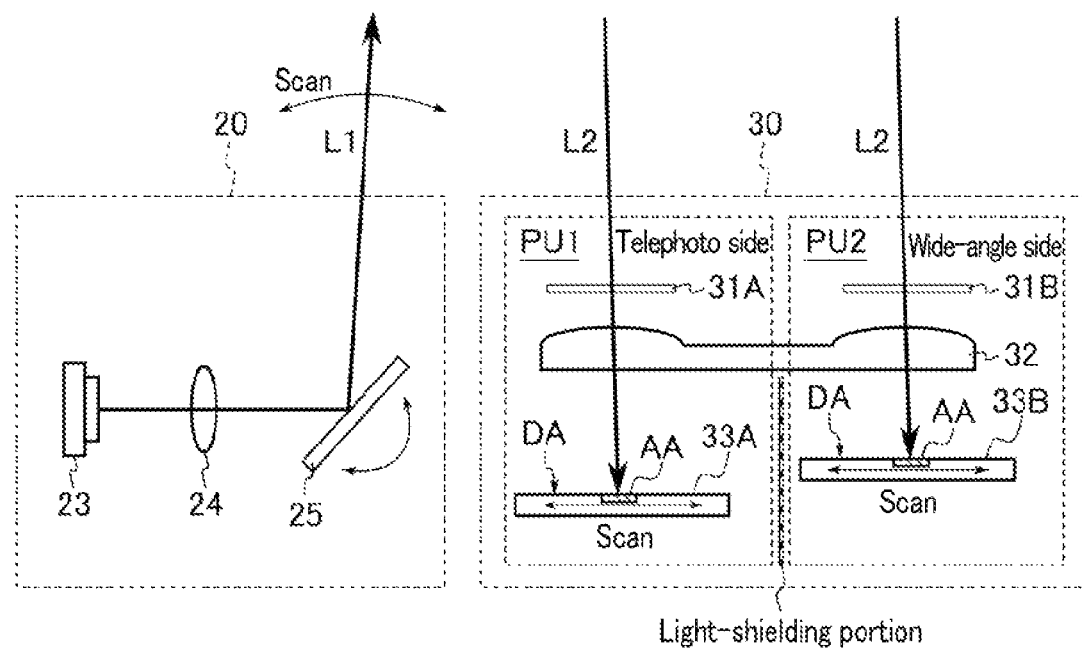
F I G. 45
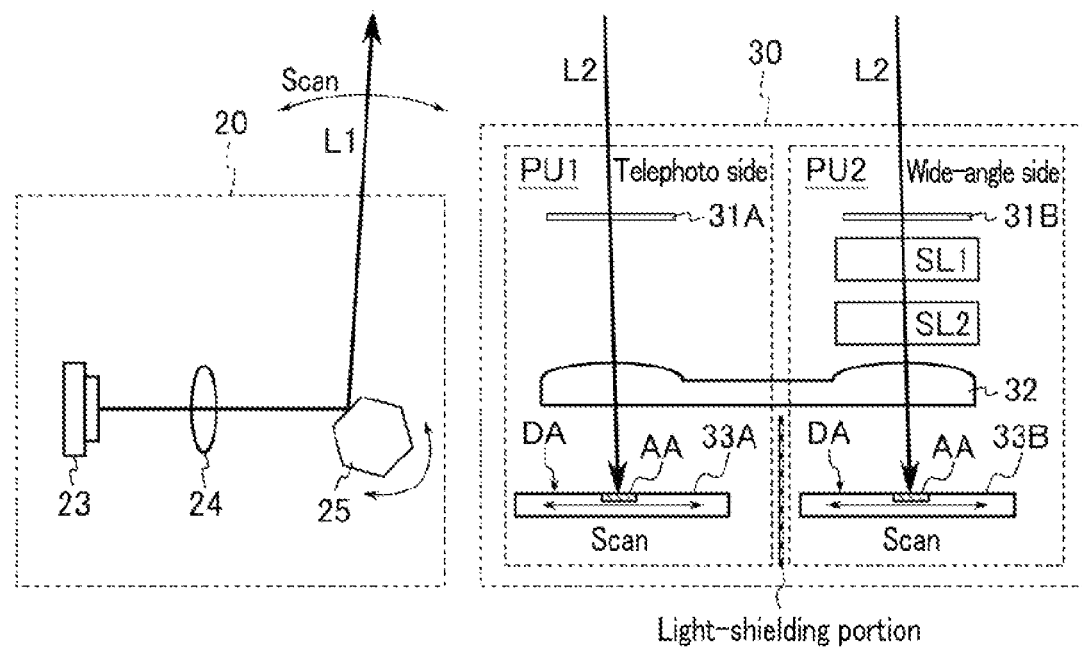
F I G. 46

DISTANCE MEASURING DEVICE

CROSS-REFERENCE TO RELATED APPLICATIONS

This application is based upon and claims the benefit of priority from Japanese Patent Application No. 2020-157625, filed Sep. 18, 2020, the entire contents of which are incorporated herein by reference.

FIELD

Embodiments described herein relate generally to a distance measuring device.

BACKGROUND

A distance measuring device called "LiDAR (Light Detection and Ranging)" is known. A LiDAR irradiates a target object with laser light, and detects the intensity of reflected light reflected from the target object by a sensor (light detector). Then, the LiDAR measures a distance from itself to the target object based on a light intensity signal output from the sensor. There are a number of sensors used in the LiDAR, but a two-dimensional sensor (2D sensor) comprising a plurality of silicon photomultipliers arrayed two-dimensionally is known to be a promising sensor for the future.

BRIEF DESCRIPTION OF THE DRAWINGS

FIG. 18 depicts a schematic diagram showing an example of a scanning method of an emission section in a distance measuring device according to a first modification of the first embodiment.

FIG. 19 depicts a schematic diagram showing an example of a scanning method of an emission section in a distance measuring device according to a second modification of the first embodiment.

FIG. 31 depicts a flowchart showing an example of an adjustment operation of a distance measuring device according to a second modification of the third embodiment.

FIG. 35 depicts a flowchart showing an example of an adjustment operation of a distance measuring device according to a fourth modification of the third embodiment.

FIG. 36 depicts a schematic diagram showing a specific example of the adjustment operation of the distance measuring device according to the fourth modification of the third embodiment.

FIG. 45 depicts a schematic diagram showing an example of configurations of two light detection units in a sixth configuration example of the light detection unit.

FIG. 46 depicts a schematic diagram showing an example of configurations of the two light detection units in the sixth configuration example of the light detection unit.

DETAILED DESCRIPTION

Figure 1:
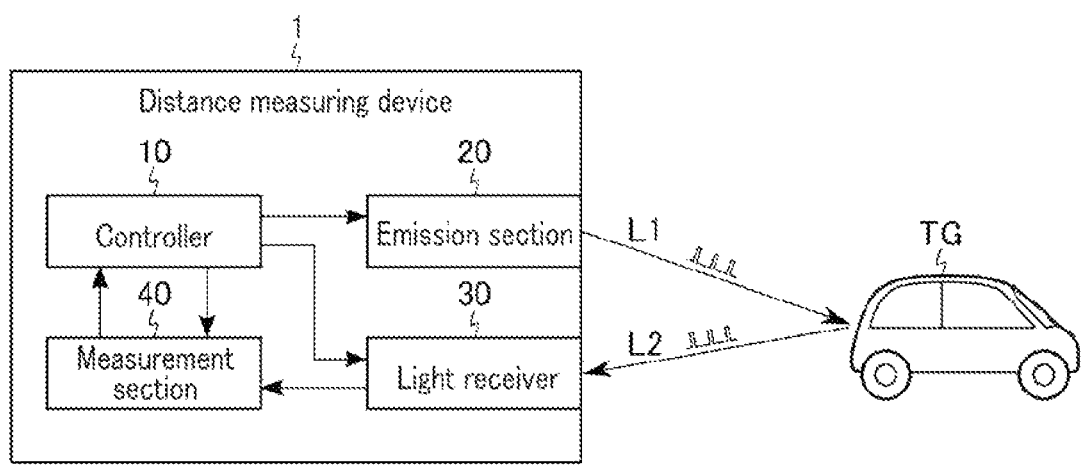
FIG. 1 depicts a schematic diagram showing an example of an overall configuration of a distance measuring device according to a first embodiment.

In general, according to one embodiment, a distance measuring device includes a light emitter, a first light receiver, a second light receiver, a measurement section, and a controller. The light emitter includes a light source and a mirror. The light source emits an optical signal. The mirror reflects the optical signal. The first light receiver includes a first sensor and a first optical system. The first sensor includes a plurality of first pixels arranged two-dimensionally on a first substrate. The first optical system is configured to guide a reflected light of the optical signal emitted from the light emitter to the first sensor. The second light receiver includes a second sensor and a second optical system. The second sensor includes a plurality of second pixels arranged two-dimensionally on a second substrate different from the first substrate. The second optical system is configured to guide the reflected light to the second sensor. A measurement section is configured to calculate a first distance value and a second distance value. The first distance value is calculated using a first time and a second time. The second distance value is calculated using the first time and a third time. The first time is a time at which the light source emits the optical signal. The second time is a time at which the first sensor detects the reflected light. The third time is a time at which the second sensor detects the reflected light. The controller is configured to cause the light source to emit the optical signal intermittently. The controller is configured to control the mirror to perform scanning using the optical signal. The controller is configured to set a first light-receiving area in which at least one first pixel among the first pixels is selectively turned on in the first sensor. The controller is configured to set a second light-receiving area in which at least one second pixel among the second pixels is selectively turned on in the second sensor, and determine a position of the first light-receiving area and a position of the second light-receiving area according to a state of the mirror when the optical signal is emitted.

Embodiments will be described below with reference to the accompanying drawings. Each embodiment exemplifies a device and a method for embodying a technical idea of the invention. The drawings are schematic or conceptual, and the dimensions and ratios, etc. in the drawings are not always the same as those of the actual products. In the drawings to be referred to below, an "X direction" and a "Y direction" correspond to directions intersecting each other. The technical idea of the present invention is not restricted by the shapes, structures, arrangements, etc., of the structural elements. In the following descriptions, structural elements having substantially the same function and configuration will be denoted by the same reference symbol. The numbers after the letters that make up the reference signs are used to distinguish between elements that are referenced by reference signs containing the same characters and that have a similar configuration.

[1] First Embodiment

A distance measuring device 1 according to a first embodiment is, for example, a type of LiDAR (Light Detection and Ranging) capable of measuring a distance between the distance measuring device 1 and a target object TG. The distance measuring device 1 according to the first embodiment will be described below.

[1-1] Configuration

[1-1-1] Overall Configuration of Distance Measuring Device 1

FIG. 1 depicts a schematic diagram showing an example of an overall configuration of the distance measuring device 1 according to the first embodiment. As shown in FIG. 1, in this example, a vehicle is located in front of the distance measuring device 1 as a ranging target object TG. Then, the distance measuring device 1 according to the first embodiment includes a controller 10, an emission section 20, a light receiver 30, and a measurement section 40.

The controller 10 controls an overall operation of the distance measuring device 1. The controller 10 includes, for example, a CPU (Central Processing Unit), a ROM (Read Only Memory), a RAM (Random Access Memory), and an oscillator, all of which are not shown. The ROM stores a program used for an operation of the distance measuring device 1, etc. The CPU controls the emission section 20, the light receiver 30, and the measurement section 40 according to the program stored in the ROM. The RAM is used as a working area of the CPU. The oscillator is used for generating an intermittent pulse signal. The controller 10 is also capable of executing various data processing and arithmetic processing.

The emission section 20 intermittently generates and emits laser light. The generated and emitted laser light is applied to the target object TG, and used for measuring a distance between the distance measuring device 1 and the target object TG. In the present specification, the laser light emitted from the emission section 20 is referred to as "outgoing light L1". The outgoing light L1 reflected by the target object TG is referred to as "reflected light L2". The emission section 20 may be referred to as a light emitter.

The light receiver 30 detects light incident on the distance measuring device 1, and transfers a light reception result to the measurement section 40. In other words, the light receiver 30 converts the light incident on the distance measuring device 1 into an electric signal, and transfers the converted electric signal to the measurement section 40. The light receiver 30 is used for detecting the reflected light L2 intermittently incident on the distance measuring device 1.

The measurement section 40 measures a time at which the light receiver 30 detects the reflected light L2 based on the light reception result transferred from the light receiver 30. Then, the measurement section 40 measures the distance between the distance measuring device 1 and the target object TG based on a time at which the outgoing light L1 is emitted from the emission section 20 and a time at which the light receiver 30 detects the reflected light L2. The time at which the outgoing light L1 is emitted from the emission section 20 is, for example, reported from the controller 10.

Figure 2:
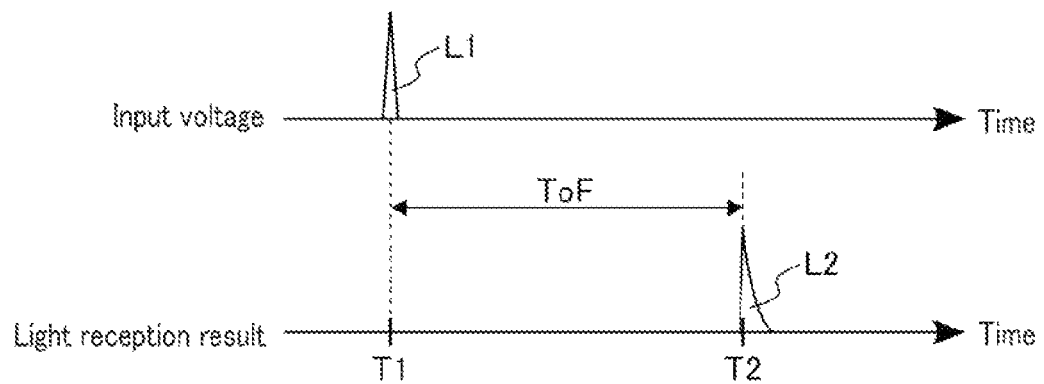
FIG. 2 depicts a schematic diagram that outlines a ranging method of the distance measuring device according to the first embodiment.

FIG. 2 depicts a schematic diagram that outlines a ranging method of the distance measuring device 1 according to the first embodiment. The waveform of an input voltage indicates a temporal change in voltage to be supplied to the light source included in the emission section 20. The waveform of a light reception result indicates a temporal change in intensity of an electric signal based on light detected by the light receiver 30. As shown in FIG. 2, when a pulse signal is supplied to the light source of the emission section 20, the outgoing light L1 is generated and emitted based on a rise of the pulse signal. Then, the outgoing light L1 is applied to the target object TG, and the light receiver 30 detects the reflected light L2 reflected from the target object TG.

The measurement section 40 calculates a time of flight (ToF) of the outgoing light L1 based on a difference between an emission time T1 at which the outgoing light L1 is emitted from the emission section 20 and a light-receiving time T2 at which the light receiver 30 detects the reflected light L2. Then, the measurement section 40 measures (ranges) the distance between the distance measuring device 1 and the target object TG based on the time of flight of the outgoing light L1 and the velocity of the laser light. Such a ranging method of the distance measuring device 1 may be called a "ToF method". The measurement section 40 outputs a ranging result for each set of the outgoing light L1 and the reflected light L2 that the distance measuring device 1 emits and receives.

The measurement section 40 may decide the emission time T1 based at least on a time relating to emission of the outgoing light L1, and decide the light-receiving time T2 based on a time relating to light reception of the reflected light L2. For example, the measurement section 40 may decide the emission time T1 and the light-receiving time T2 based on a rise time or a peak time of a signal. The controller 10 may be provided for each of the emission section 20, the light receiver 30, and the measurement section 40. Processing of the measurement section 40 may be performed by the controller 10. The distance measuring device 1 may include an image processor that generates an image based on a ranging result of the measurement section 40. Such an image is referred to by a control program of a vehicle, etc. equipped with the distance measuring device 1.

[1-1-2] Configuration of Emission Section 20

Figure 3:
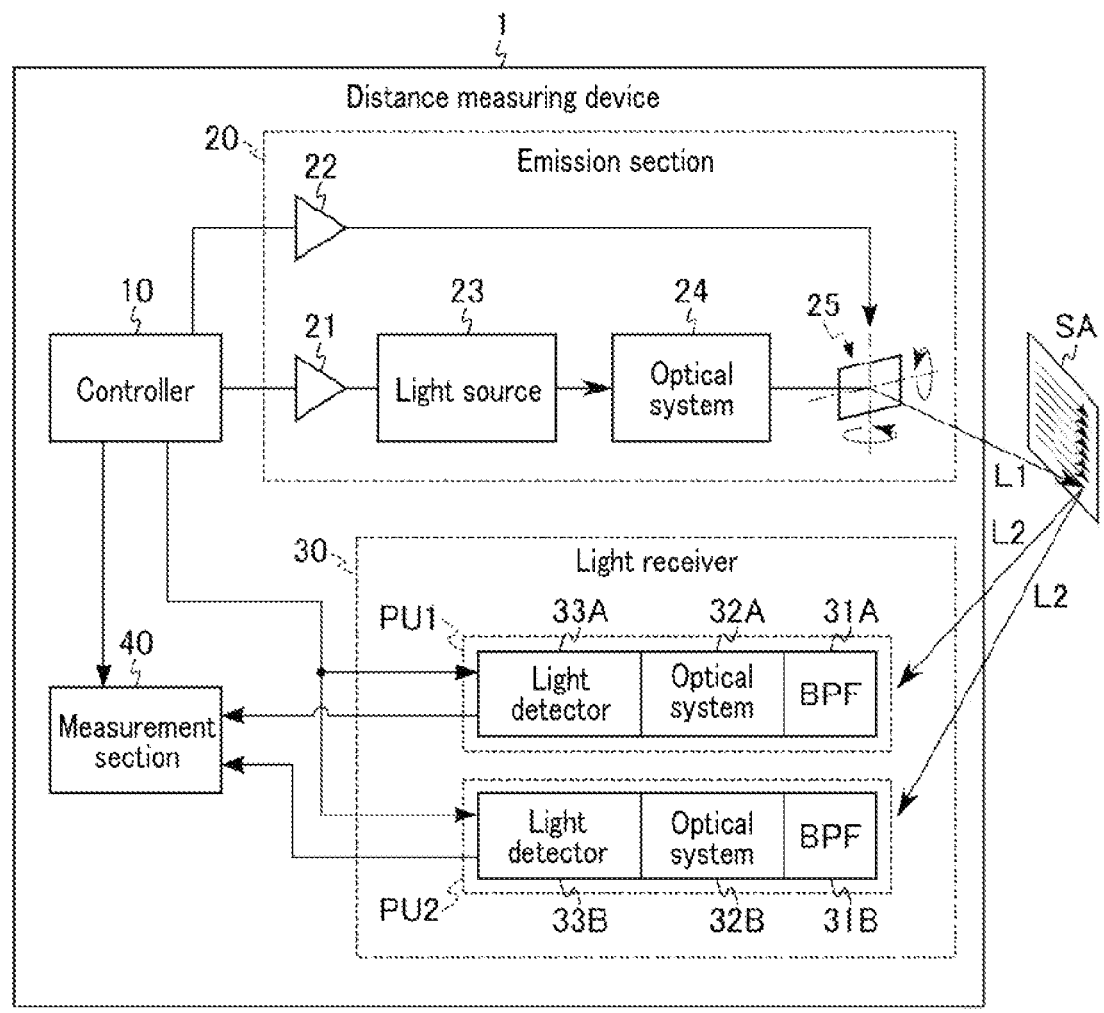
FIG. 3 depicts a schematic diagram showing an example of a configuration of an emission section and a light receiver included in the distance measuring device according to the first embodiment.

FIG. 3 depicts a schematic diagram showing an example of configurations of the emission section 20 and the light receiver 30 included in the distance measuring device 1 according to the first embodiment. As shown in FIG. 3, the emission section 20 in the first embodiment includes drivers 21 and 22, a light source 23, an optical system 24, and a mirror 25.

The driver 21 generates a drive current according to the pulse signal input from the oscillator of the controller 10. Then, the driver 21 supplies the generated drive current to the light source 23. That is, the driver 21 functions as a current supply source of the light source 23.

The driver 22 generates a drive current according to control performed by the controller 10. Then, the driver 22 supplies the generated drive current to the mirror 25. That is, the driver 22 functions as a power supply circuit of the mirror 25.

The light source 23 is a laser light source, such as a laser diode. The light source 23 intermittently emits laser light (outgoing light L1) based on the intermittent drive current (pulse signal) supplied from the driver 21. The laser light emitted by the light source 23 is incident on the optical system 24.

The optical system 24 can include a plurality of lenses and optical elements. The optical system 24 is arranged on an optical path of the outgoing light L1 emitted by the light source 23. For example, the optical system 24 collimates the incident outgoing light L1, and guides the collimated outgoing light L1 to the mirror 25. The optical system 24 may include a beam shaper, a beam splitter, etc.

The mirror 25 is driven based on the drive current supplied from the driver 22, and reflects the outgoing light L1 incident on the mirror 25. For example, a reflecting surface of the mirror 25 is formed to be rotatable or to swing around two axes intersecting each other. The outgoing light L1 reflected by the mirror 25 is applied to the target object TG outside the distance measuring device 1.

In the distance measuring device 1 according to the first embodiment, the controller 10 changes an emitting direction of the outgoing light L1 by controlling the mirror 25 so as to scan an area to be ranged. The emission section 20 may have a configuration capable of performing scanning using laser light, or may have other configurations. For example, the emission section 20 may further include an optical system arranged on an optical path of laser light reflected by the mirror 25.

In the present specification, an area that is ranged by the distance measuring device 1 is referred to as a "scanning area SA". The distance measuring device 1 performs a measurement operation of a plurality of points within the scanning area SA to measure distances from various target objects TG. In addition, a set of ranging results of a plurality of points corresponding to single scanning is referred to as a "frame". The distance measuring device 1 performs scanning continuously so that it can sequentially acquire a distance from a target object TG in front of itself.

[1-1-3] Configuration of Light Receiver 30

The configuration of the light receiver 30 in the first embodiment will be described still with reference to FIG. 3. As shown in FIG. 3, the light receiver 30 in the first embodiment includes two light detection units PU1 and PU2. Each of the light detection units PU1 and PU2 detects the reflected light L2 incident on the distance measuring device 1. The light detection unit PU1 includes a bandpass filter (BPF) 31A, an optical system 32A, and a light detector 33A. The light detection unit PU2 includes a BPF 31B, an optical system 32B, and a light detector 33B.

Each of the BPFs 31A and 31B is a filter through which a particular frequency band of light passing through the BPF passes. The reflected light L2 incident on the distance measuring device 1 passes through the BPF 31A and is incident on the optical system 32A. Similarly, the reflected light L2 incident on the distance measuring device 1 passes through the BPF 31B and is incident on the optical system 32B. The designs of the BPFs 31A and 31B may be the same or different from each other.

The optical system 32A can include a plurality of lenses. The optical system 32A collects the reflected light L2 passing through the BPF 31A in the light detector 33A. The design of the optical system 32A is optimized for a long-distance target object TG. For example, a focal distance of the optical system 32A is designed to be a long distance (infinity). In the present specification, the optical system 32A has a design that is similar to that of a telephoto lens. Thus, the light detection unit PU1 is also referred to as a "light detection unit PU on the telephoto side".

The optical system 32B can include a plurality of lenses. The optical system 32B collects the reflected light L2 passing through the BPF 31B in the light detector 33B. The design of the optical system 32B is optimized for a short-distance target object TG. For example, a focal distance of the optical system 32B is designed to be a shorter distance than that of the optical system 32A, and a viewing angle of the optical system 32B is designed to be wider than that of the optical system 32A. In the present specification, the optical system 32B has a design that is similar to that of a wide angle lens. Thus, the light detection unit PU2 is also referred to as a "light detection unit PU on the wide-angle side".

Each of the light detectors 33A and 33B includes, for example, a photomultiplier element using a semiconductor, and converts light incident on the light detector 33 into an electric signal. Light reception results of the light detectors 33A and 33B are output to the measurement section 40. The light detector 33A detects the reflected light L2 passing through the BPF 31A and the optical system 32A. The light detector 33B detects the reflected light L2 passing through the BPF 31B and the optical system 32B. The designs of the light detectors 33A and 33B may be the same or different from each other.

In the distance measuring device 1 according to the first embodiment, an optical axis of each of the optical systems 32A and 32B of the light receiver 30 is different from that of the optical system 24 of the emission section 20. That is, the distance measuring device 1 includes a non-coaxial optical system between the emission section 20 and the light receiver 30. The light receiver 30 may include at least two light detection units PU that are optimized for mutually different distances, or may have other configurations.

(Configuration of Light Detector 33)

Figure 4:
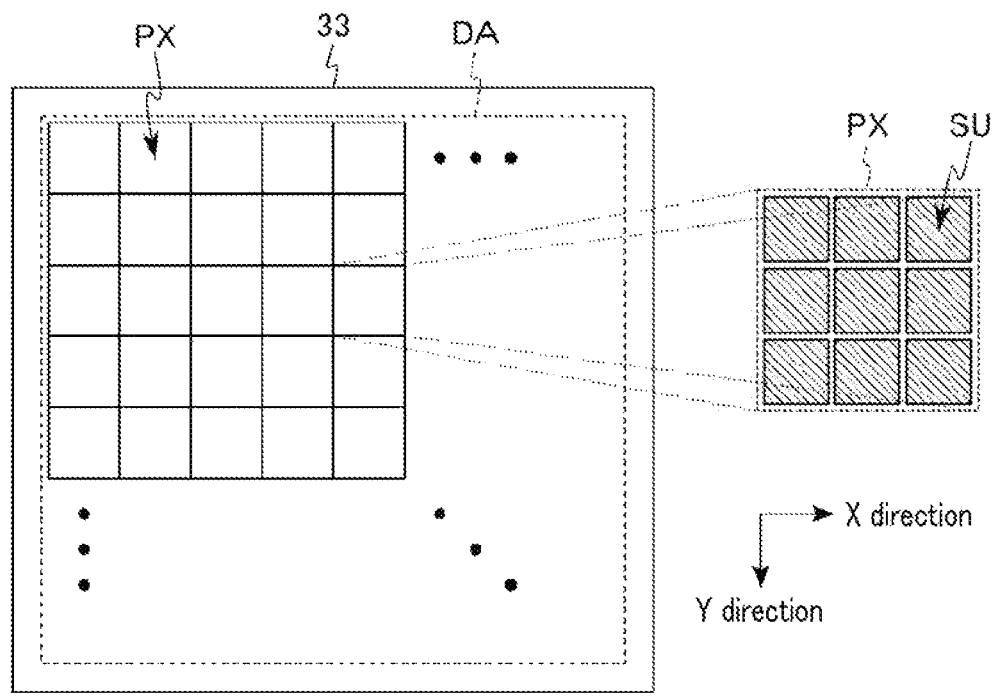
FIG. 4 depicts a plan view showing an example of a planar layout of a light detector in the distance measuring device according to the first embodiment.

FIG. 4 depicts a plan view showing an example of a planar layout of the light detector 33 in the distance measuring device 1 according to the first embodiment. As shown in FIG. 4, the light detector 33 according to the first embodiment is a 2D sensor, and includes a light-receiving area DA.

The light-receiving area DA is an area used for detecting light incident on the distance measuring device 1. The light-receiving area DA includes a plurality of pixels PX. The pixel PX corresponds to the minimum unit of a light reception result output from the light detector 33. The plurality of pixels PX are, for example, arranged two-dimensionally on a semiconductor substrate; in other words, the pixels PX are arranged in a matrix along an XY plane on the semiconductor substrate. The XY plane is a plane formed by an X direction and a Y direction, and is parallel to a surface of the substrate on which the light-receiving area DA of the light detector 33 is formed. A coordinate corresponding to the X direction and a coordinate corresponding to the Y direction are assigned to each of the pixels PX.

Each of the pixels PX includes at least one SPAD unit SU. The SPAD unit SU includes a photomultiplier element. As the photomultiplier element, for example, a single-photon avalanche diode (SPAD) is used. In a case where the pixel PX includes a plurality of SPAD units SU, the plurality of SPAD units SU are arranged, for example, in a matrix along the XY plane. The pixel PX including a plurality of SPADs is also referred to as a "silicon photomultiplier (SiPM)".

The size (sensor size) of the light-receiving area DA of the light detector 33A and that of the light-receiving area DA of the light detector 33B may be the same or different from each other. Each of the number of pixels PX included in the light detector 33 and the number of the SPAD units SU included in the pixel PX can be freely designed. Each of the shape of the pixel PX and the shape of the SPAD unit SU can be freely designed. Each of the shape of the pixel PX and the shape of the SPAD unit SU may not necessarily be a single shape. In the pixel PX, the number of SPAD units SU aligned in the X direction and that of SPAD units SU aligned in the Y direction may be different. The shape of the pixel PX can be designed according to the number, arrangement, etc. of SPAD units SU included in the pixel PX.

(Circuit Configuration of SPAD Unit SU)

Figure 5:
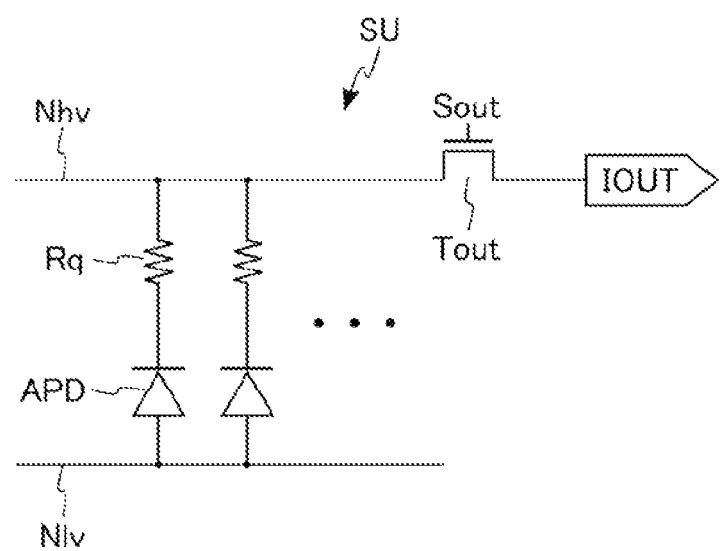
FIG. 5 depicts a circuit diagram showing an example of a circuit configuration of a SPAD unit included in the distance measuring device according to the first embodiment.

FIG. 5 depicts a circuit diagram showing an example of a circuit configuration of a SPAD unit SU included in the distance measuring device 1 according to the first embodiment. As shown in FIG. 5, the SPAD unit SU in the first embodiment includes a set of at least one avalanche photodiode APD and a quench resistor Rq, a high voltage node Nhv, a low voltage node Nlv, and a P-type transistor Tout. The number of sets of avalanche photodiode APD and quench resistor Rq corresponds to the number of SPADs included in the SPAD unit SU.

The set of avalanche photodiode APD and quench resistor Rq is coupled in series between the high voltage node Nhv and the low voltage node Nlv. Specifically, the anode of the avalanche photodiode APD is coupled to the low voltage node Nlv. The cathode of the avalanche photodiode APD is coupled to one end of the quench resistor Rq. The other end of the quench resistor Rq is coupled to the high voltage node Nhv. In the measurement operation of the distance measuring device 1, a voltage applied to the high voltage node Nhv is higher than a voltage applied to the low voltage node Nlv. That is, a reverse bias is applied to the avalanche photodiode APD.

The high voltage node Nhv corresponds to an output node of the SPAD unit SU. The drain of the P-type transistor Tout is coupled to the high voltage node Nhv. A control signal Sout is input to the gate of the P-type transistor Tout. In a case where a voltage of the control signal Sout is a level "L", an output signal IOUT based on the voltage of the high voltage node Nhv is output from the source of the P-type transistor Tout. The output signal IOUT corresponds to a light reception result of the SPAD unit SU. In a case where a voltage of the control signal Sout is a level "H", the P-type transistor Tout cuts off the output of the light reception result by the SPAD unit SU. The controller 10 can control the control signal Sout per a plurality of pixels PX.

The SPAD unit SU may have other circuit configurations. For example, the drain of an N-type transistor may be coupled to the high voltage node Nhv, the control signal Sout may be coupled to the gate thereof, and the source thereof may be coupled to an appropriate low voltage. Then, in a case where the output of the output signal IOUT by the P-type transistor Tout is cut off, the current may be discharged through the N-type transistor. For example, the quench resistor Rq may be replaced with a transistor. A transistor used for quenching which is different from the quench resistor Rq may be coupled to the high voltage node Nhv. The arrangement of the high voltage node Nhv (output node) may be other arrangements as long as it is capable of outputting a light reception result by the avalanche photodiode APD. The P-type transistor Tout may be formed by a plurality of transistors coupled in series. The transistor Tout may be an N-type transistor. The transistor Tout may be other switch elements as long as it is capable of selectively outputting the output signal IOUT. In a case where a pixel PX includes a plurality of SPAD units SU, an output signal of the pixel PX, for example, corresponds to a sum of output signals IOUT of the SPAD units SU belonging to the pixel PX.

(Structure of Avalanche Photodiode APD)

Figure 6:
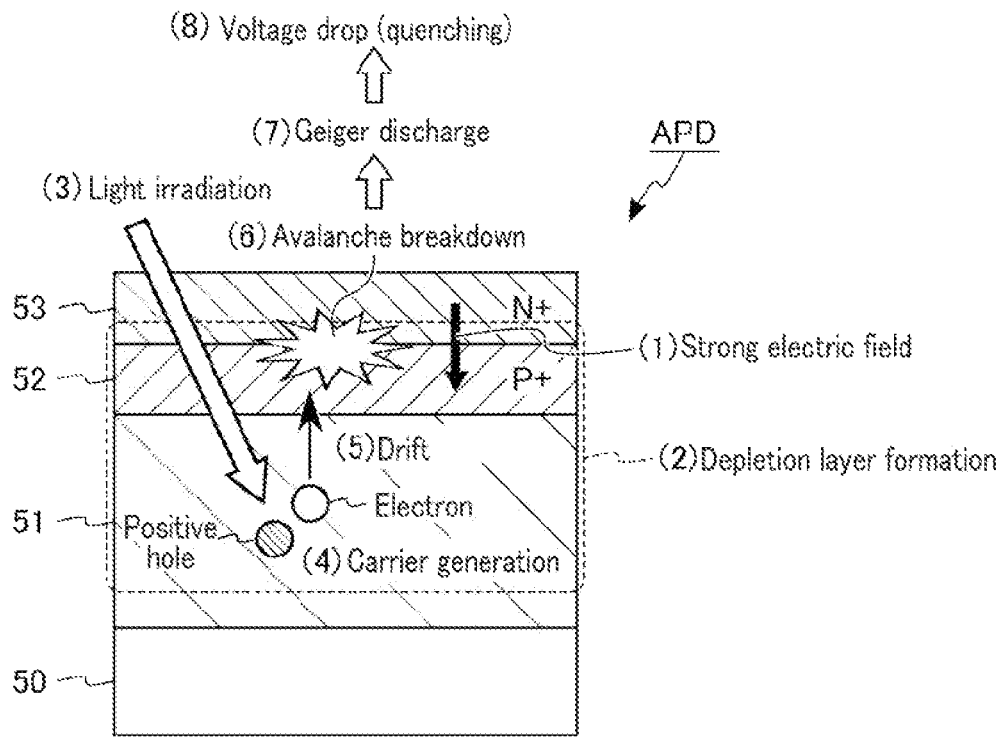
FIG. 6 depicts a schematic diagram showing an example of a structure of an avalanche photodiode and an operation principle of a single-photon avalanche diode in the distance measuring device according to the first embodiment.

FIG. 6 depicts a schematic diagram showing an example of a structure of an avalanche photodiode APD and an operation principle of a single-photon avalanche diode SPAD in the distance measuring device 1 according to the first embodiment. As shown in FIG. 6, the avalanche photodiode APD according to the first embodiment includes a substrate 50, P-type semiconductor layers 51 and 52, and an N-type semiconductor layer 53.

The substrate 50 is, for example, a P-type semiconductor substrate. On the substrate 50, the P-type semiconductor layer 51, P-type semiconductor layer 52, and N-type semiconductor layer 53 are stacked in this order. For example, the P-type semiconductor layer 51 is formed thicker than the P-type semiconductor layer 52. The concentration of P-type impurities doped in the P-type semiconductor layer 52 is higher than that of P-type impurities doped in the P-type semiconductor layer 51. A PN junction is formed at a contact portion between the P-type semiconductor layer 52 and the N-type semiconductor layer 53. Thereby, the P-type semiconductor layer 52 and the N-type semiconductor layer 53 are used as an anode and a cathode of the avalanche photodiode APD, respectively, The avalanche photodiode APD in the first embodiment is used in a Geiger mode. Then, a SPAD using the avalanche photodiode APD detects light in units of photons, and converts the light into an electric signal. In the following, an operation principle of the SPAD using the avalanche photodiode APD shown in FIG. 6 will be described. In this example, the substrate 50 side corresponds to the low voltage node Nlv of the SPAD unit SU. The N-type semiconductor layer 53 side corresponds to the high voltage node Nhv of the SPAD unit SU.

When a high reverse bias is applied to the avalanche photodiode APD, a strong electric field is generated between the P-type semiconductor layer 52 and the N-type semiconductor layer 53 (FIG. 6 (1)). Accordingly, a depletion layer is formed over an area from the PN junction between the P-type semiconductor layer 52 and the N-type semiconductor layer 53 to the P-type semiconductor layer 51 (FIG. 6 (2)). At this time, the avalanche photodiode APD enters a state (hereinafter, referred to as an active state) capable of detecting light. When the avalanche photodiode APD in the active state is irradiated with light, some energy of the light reaches the depletion layer (FIG. 6 (3)). As a result, a pair of an electron and a positive hole, i.e., a carrier, is generated in the depletion layer (FIG. 6 (4)). The carrier generated in the depletion layer drifts due to a strong electric field in the vicinity of the PN junction (FIG. 6 (5)). Specifically, the positive hole of the generated carrier is accelerated toward the substrate 50 side, and the electron of the generated carrier is accelerated toward the N-type semiconductor layer 53 side.

The electron accelerated toward the N-type semiconductor layer 53 side collides with an atom under the strong electric field in the vicinity of the PN junction. As a result, the electron that collided with the atom ionizes the atom, and generates a new pair of an electron and a positive hole. Such generation of a pair of an electron and a positive hole is repeated if a voltage of a reverse bias applied to the avalanche photodiode APD exceeds a breakdown voltage of the avalanche photodiode APD (FIG. 6 (6) Avalanche breakdown). When the avalanche breakdown occurs, the avalanche photodiode APD discharges an electric current (FIG. 6 (7) Geiger discharge).

The electric current output from the avalanche photodiode APD, for example, flows in the quench resistor Rq. As a result, a voltage drop occurs in the output node of the SPAD unit SU (FIG. 6 (8) Quenching). By quenching, when the voltage of the reverse bias applied to the avalanche photodiode APD drops below the breakdown voltage, the Geiger discharge is stopped. Then, a recovery current flows into the avalanche photodiode APD, and charging of the capacity at the PN junction is performed. Some time after the Geiger discharge is stopped, the avalanche photodiode APD returns to a state capable of detecting light.

The avalanche photodiode APD included in the SPAD unit SU may have other configurations. For example, the P-type semiconductor layer 52 may be omitted. The thickness of each of the P-type semiconductor layer 51, P-type semiconductor layer 52, and N-type semiconductor layer 53 can be changed according to the design of the avalanche photodiode APD. The PN junction of the avalanche photodiode APD may be formed at a contact portion between the substrate 50 and the semiconductor layer on the substrate 50. The avalanche photodiode APD may have a structure in which the P-type semiconductor layer and the N-type semiconductor layer shown in FIG. 6 are switched with each other.

(Active Area AA of Light Detector 33)

The reflected light L2 incident on the distance measuring device 1 according to the first embodiment is, for example, applied to a part of the light-receiving area DA based on a scanning position of the outgoing light L1 and a design of the optical system 32. Then, the controller 10 sets the SPAD unit SU included in each pixel PX to an active state or an inactive state based on an irradiation position of the reflected light L2.

In the present specification, a pixel PX including a SPAD unit SU controlled to be in a state capable of detecting light is referred to as a pixel PX in an ON state. A pixel PX including a SPAD unit SU controlled to be in a state incapable of detecting light is referred to as a pixel PX in an OFF state. An area including at least one pixel PX in an ON state that the controller 10 sets in the light-receiving area DA is referred to as an "active area AA".

Figure 7:
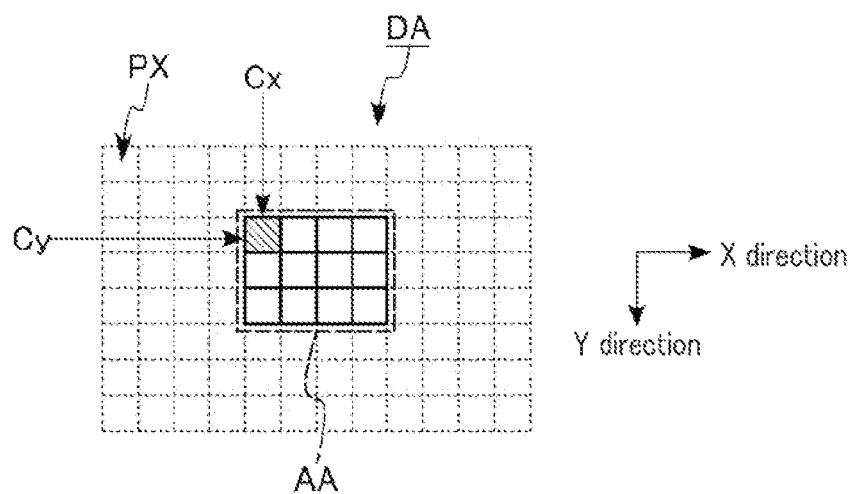
FIG. 7 depicts a plan view showing an example of an active area set in a light-receiving area of a light detector in the distance measuring device according to the first embodiment.

FIG. 7 depicts a plan view showing an example of an active area AA set in the light-receiving area DA of the light detector 33 in the distance measuring device 1 according to the first embodiment. As shown in FIG. 7, in the measurement operation of the distance measuring device 1, the controller 10 notifies the light detector 33 of an X coordinate Cx and a Y coordinate Cy of the light-receiving area DA for each beam of outgoing light L1. Then, the light detector 33 sets the active area AA within the light-receiving area DA based on the X coordinate Cx and the Y coordinate Cy designated by the controller 10.

The X coordinate Cx and the Y coordinate Cy are, for example, associated with an inclination of the mirror 25 at a timing at which the outgoing light L1 is emitted, and indicate coordinates of an upper-left pixel PX of the active area AA. The active area AA is, for example, set to an area having an expanse of four pixels by three pixels in the X direction and the Y direction, respectively, with the X coordinate Cx and the Y coordinate Cy as a reference. In other words, in this example, the active area AA is set to a rectangular area including 4×3 pixels. As described above, when the active area AA is set within the light-receiving area DA, only a pixel PX of an area estimated to be irradiated with the reflected light L2 outputs a light reception result.

Thereby, noise from a pixel PX outside the active area AA is canceled from a light reception result of the light detector 33, and an S/N ratio (signal-to-noise ratio) of the light reception result increases. In addition, application of a voltage to the pixel PX outside the active area AA is appropriately omitted so that power consumption of the light detector 33 is suppressed. Note that the position of the active area AA may be set based at least on coordinates designated by the controller 10. The shape of the active area AA may be changed according to the coordinates designated by the controller 10.

(Output Part of Light Detector 33)

Figure 8:
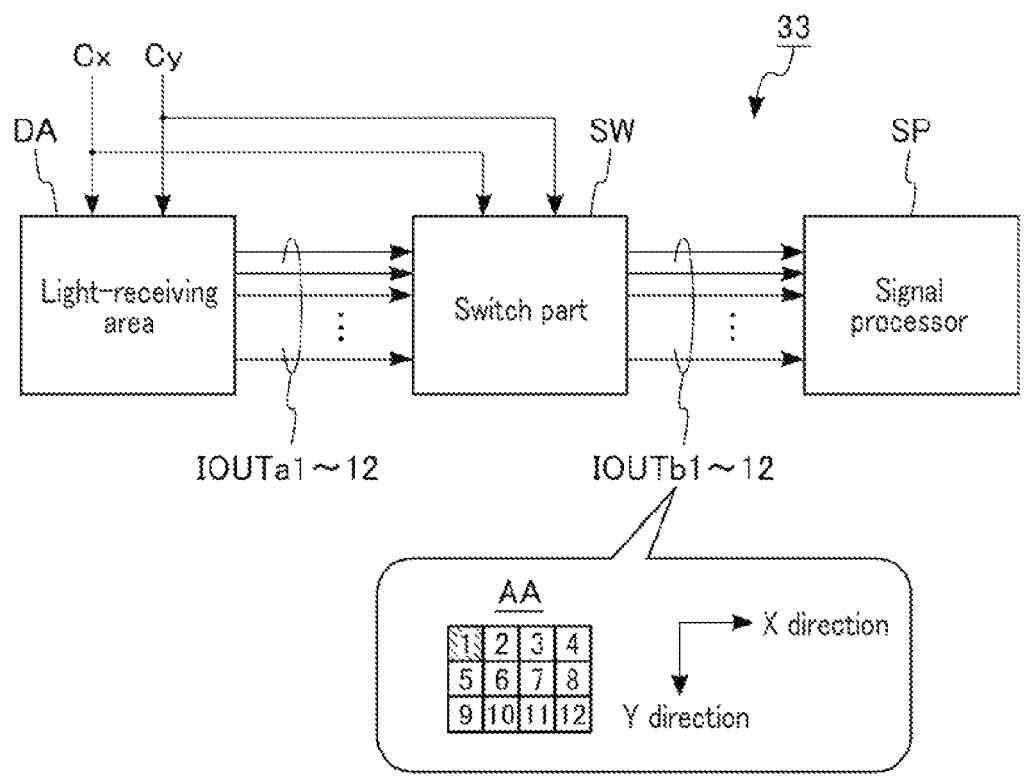
FIG. 8 depicts a block diagram showing an example of a configuration of an output part of the light detector in the distance measuring device according to the first embodiment.

FIG. 8 depicts a block diagram showing an example of a configuration of an output part of the light detector 33 in the distance measuring device 1 according to the first embodiment. As shown in FIG. 8, in the distance measuring device 1 according to the first embodiment, the light detector 33 includes an output part that performs, prior to transferring light reception results (output signals IOUT) acquired from a plurality of pixels PX within the active area AA to the measurement section 40, predetermined signal processing for the output signals IOUT. For example, the output part of the light detector 33 includes a switch part SW and a signal processor SP.

The switch part SW includes a plurality of switch circuits. The switch part SW appropriately re-couples a plurality of switch circuits based on the X coordinate Cx and the Y coordinate Cy indicating the position of the active area AA. By virtue of such a switch part SW, the number of signal lines used for output of the pixels PX in the light detector 33 can be reduced. The switch part SW aligns the order of a plurality of output signals IOUT output from the light-receiving area DA. For example, in a case where output signals IOUTa1 to IOUTa12 corresponding to twelve pixels PX within the active area AA are output from the light-receiving area DA, the switch part SW aligns the input output signals IOUTa1 to IOUTa12 and outputs the aligned output signals IOUTb1 to IOUTb12 to the signal processor SP. The output order of each pixel PX within the active area AA is changed to, for example, the order shown in the lower portion of FIG. 8.

The signal processor SP performs various signal processing by using the plurality of output signals IOUT that are input from the switch part SW. The signal processor SP can include, for example, an analog circuit like an amplifier circuit, an analog-to-digital converter (ADC), a time-to-digital converter (TDC), and a logic circuit like an adder. For example, the signal processor SP performs analog-to-digital conversion to each of the output signals IOUTb1 to IOUTb12 that are input, and generates a digital signal based on a light reception result of the light detector 33. Then, the signal processor SP transfers the digital signal based on the light reception result to the measurement section 40. As described above, the output signals IOUTb1 to IOUTb12 aligned by the switch part SW are input so that the signal processor SP can perform the signal processing without changing the order of relative positions within the active area AA.

Note that the light-receiving area DA, the switch part SW, and the signal processor SP may be formed on respectively different substrates. The switch part SW and the signal processor SP may be provided integrally. The signal processor SP may include both an ADC and a TDC. When the signal processor SP includes an ADC and a TDC, a plurality of pixels PX within the active area AA may be classified into a group of pixels PX to be converted into digital signals by the ADC and a group of pixels PX to be converted into digital signals by the TDC. Output signals of the pixels PX within the active area AA may be integrated according to the arrangement of the pixels within the active area AA.

[1-1-4] Configuration of Measurement Section 40

Figure 9:
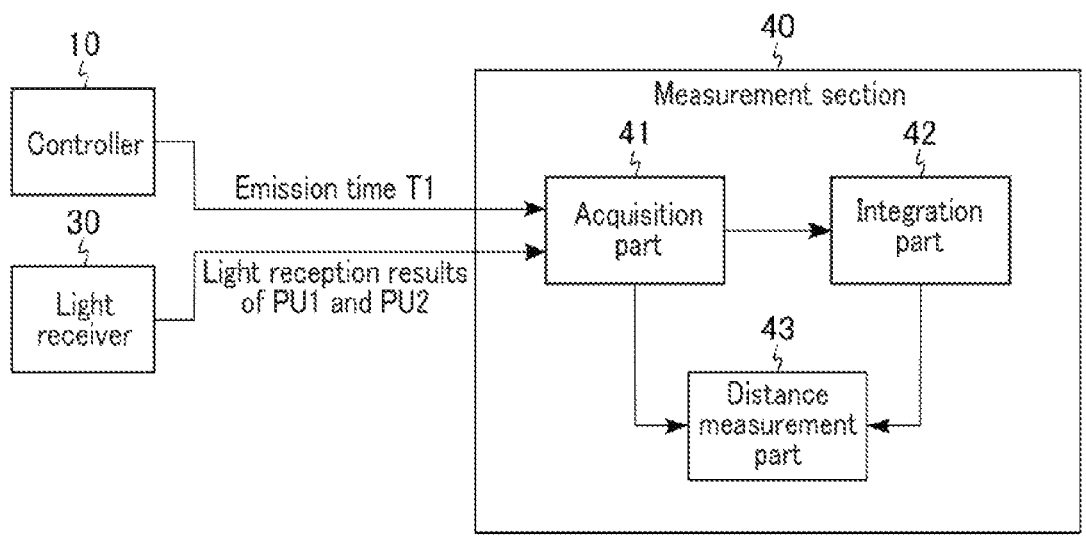
FIG. 9 depicts a block diagram showing an example of a configuration of a measurement section in the distance measuring device according to the first embodiment.

FIG. 9 depicts a block diagram showing an example of a configuration of the measurement section 40 in the distance measuring device 1 according to the first embodiment. As shown in FIG. 9, the measurement section 40 in the first embodiment includes, for example, an acquisition part 41, an integration part 42, and a distance measurement part 43.

The acquisition part 41 acquires data relating to ranging from the controller 10 and the light receiver 30, and temporally stores the acquired data. Specifically, the acquisition part 41 acquires data relating to the emission time T1 of the outgoing light L1 from the controller 10, and acquires data relating to a light reception result of each of the light detection units PU1 and PU2 from the light receiver 30. Then, the acquisition part 41 transfers the data relating to the emission time T1 to the distance measurement part 43, and transfers the data relating to the light reception result of each of the light detection units PU1 and PU2 to the integration part 42.

The integration part 42 performs integration processing of the data relating to the light reception results. Specifically, the integration part 42 integrates light reception results of a plurality of pixels PX transferred from the light detection unit PU1 so as to generate first integration data, and integrates light reception results of a plurality of pixels PX transferred from the light detection unit PU2 so as to generate second integration data. Then, the integration part 42 transfers each of the first integration data and the second integration data to the distance measurement part 43.

The distance measurement part 43 measures a distance based on the data transferred from the acquisition part 41 and the integration part 42. Specifically, the distance measurement part 43 calculates the light-receiving time T2 of the reflected light L2 in each of the light detection units PU1 and PU2 based on the first and second integration data transferred from the integration part 42. Then, the distance measurement part 43 measures a distance based on a ToF method for each light detection unit PU by using the emission time T1 and the light-receiving time T2 of each of the light detection units PU1 and PU2. Measurement results are, for example, transferred to an image processor. The measurement results may be referred to by the controller 10.

[1-2] Operation

[1-2-1] Summary of Measurement Operation

Figure 10:
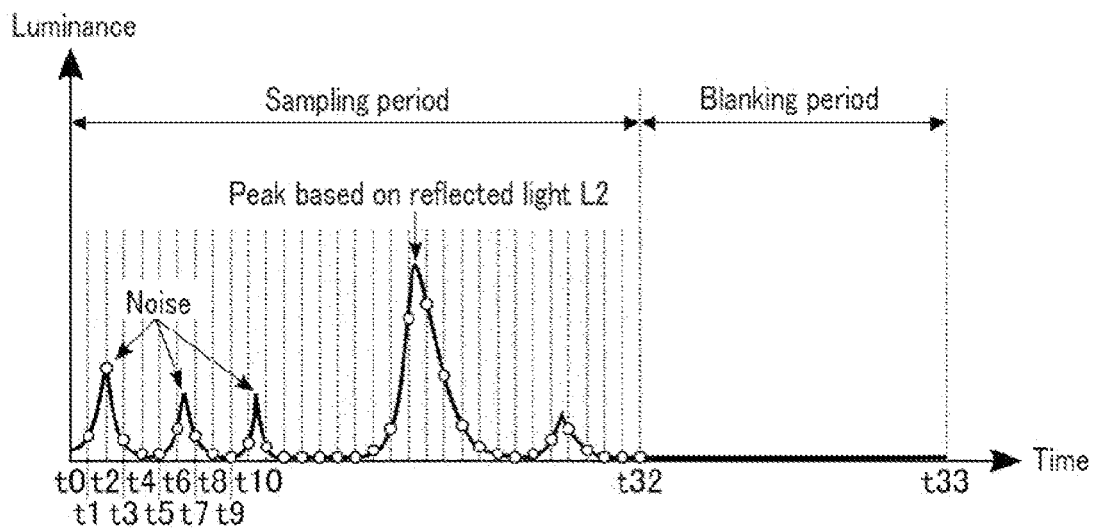
FIG. 10 depicts a time chart showing an example of a light reception result of the light receiver in the distance measuring device according to the first embodiment.

FIG. 10 depicts a time chart showing an example of a light reception result of the light receiver 30 in the distance measuring device 1 according to the first embodiment. An ordinate axis of the time chart of FIG. 10 represents luminance based on an output signal of a pixel PX. As shown in FIG. 10, each measurement operation performed by the distance measuring device 1 for each beam of outgoing light L1 includes, for example, a sampling period and a blanking period.

The sampling period is a period during which the signal processor SP of the light detector 33 performs signal processing for a light reception result. During the sampling period, the signal processor SP converts an electric signal output from the light-receiving area DA into a digital signal at a predetermined sampling interval. In this example, times t0 to t32 correspond to the sampling period, and the signal processor SP converts the electric signal output from the light-receiving area DA into a digital signal at each of times t1 to t32. Note that the sampling period and the length of the sampling interval may be freely set.

The blanking period is a period set between a sampling period for current outgoing light L1 and a sampling period for next outgoing light L1. During the blanking period, for example, signal processing by the signal processor SP is omitted. In this example, a period from time t32 to time t33 corresponds to the blanking period. In the measurement operation of the distance measuring device 1, the blanking period may be omitted as appropriate. In addition, in a case where the positions of the active areas AA set for respective beams of outgoing light L1 do not overlap each other, sampling periods of consecutive beams of outgoing light L1 may overlap each other.

Figure 11:
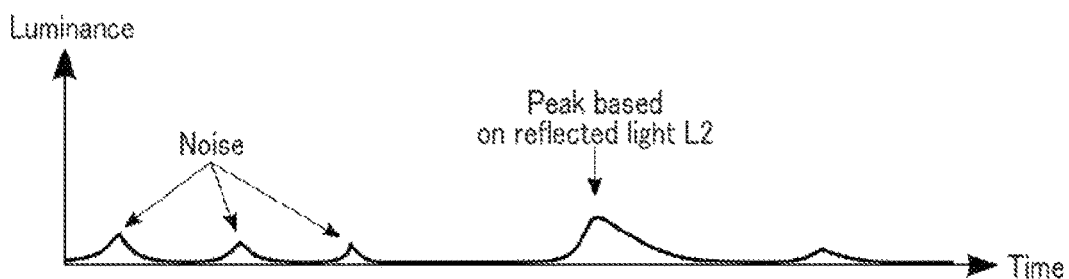
FIG. 11 depicts time charts showing an example of integration processing of the measurement section in the distance measuring device according to the first embodiment.
Figure 11:
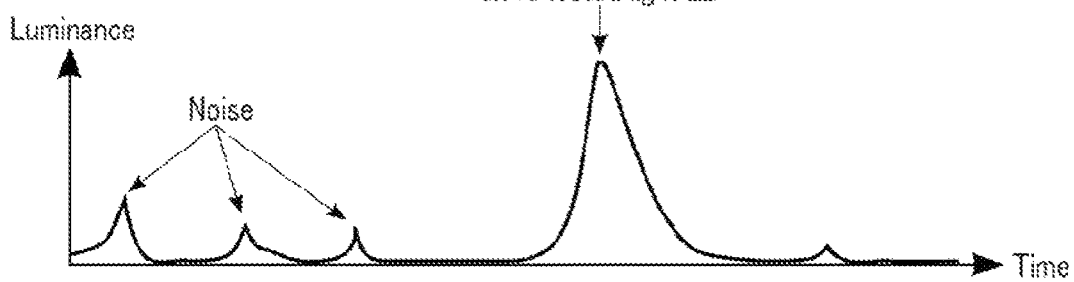

FIG. 11 depicts time charts showing an example of integration processing of the measurement section 40 in the distance measuring device 1 according to the first embodiment. Ordinate axes of the two time charts shown in FIG. 11 represent luminance of a digital signal based on a light reception result. FIG. 11 (1) shows an example of an output (light reception result) of each pixel PX within the active area AA. FIG. 11 (2) shows an example of an integration result of outputs of a plurality of pixels PX within the active area AA.

As shown in FIG. 11 (1), the output of each pixel PX includes a peak portion based on the reflected light L2 and noise. Ambient light, such as sunlight scattered by a certain object, may be incident on the distance measuring device 1, and the ambient light would appear as random noise in a light reception result. That is, the location where noise is generated varies from pixel PX to pixel PX. On the other hand, the peak portion based on the reflected light L2 usually has a luminance higher than that of noise. Since the output for each pixel PX has a narrow dynamic range, a difference between the noise and the peak portion based on the reflected light L2 is small.

As shown in FIG. 11 (2), when integration processing is performed for the outputs of the plurality of pixels PX within the active area AA, a characteristic portion of each output is emphasized. Specifically, the reflected light L2 from the target object TG is sampled at almost the same timing. Thus, intensity of a signal of a portion at which the reflected light L2 is detected increases by the integration processing. On the other hand, random noise does not have reproducibility. That is, it is difficult for the random noise to be emphasized by the integration processing.

As a result, in a light reception result through the integration processing, the random noise is relatively reduced with respect to the reflected light L2 from the target object TG. In other words, an S/N ratio of a digital signal in the light reception result of the reflected light L2 is improved by the integration processing. Then, the distance measurement part 43 measures the light-receiving time T2 of the reflected light L2 based on the digital signal with the improved S/N ratio. As a result, the distance measuring device 1 can improve measurement accuracy of the light-receiving time T2.

[1-2-2] Scanning Method

Figure 12:
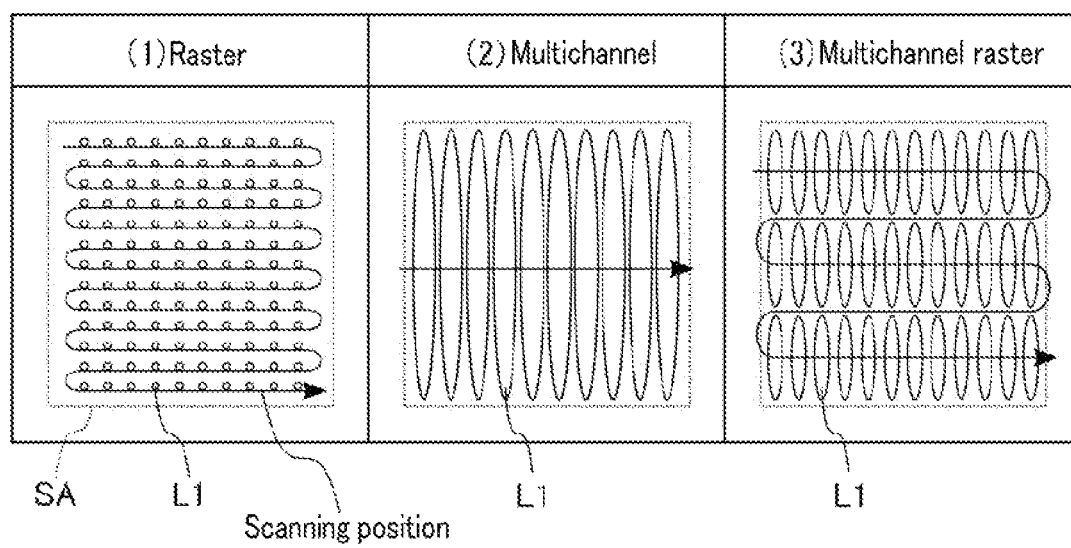
FIG. 12 depicts a table showing an example of a scanning method of the emission section in the distance measuring device according to the first embodiment.

FIG. 12 depicts a table showing an example of a scanning method of the distance measuring device 1 according to the first embodiment. The table shown in FIG. 12 indicates three types of combinations of a name and a specific example of a scanning method. In FIG. 12, reference sign "L1" indicates the shape and the emission timing of the outgoing light L1 in the associated scanning method. The arrow "scanning position" schematically indicates a path in which a plurality of beams of outgoing light L1 are emitted in sequence, within the scanning area SA. "Leftward direction" and "rightward direction" refer to the leftward direction and the rightward direction on the page, respectively.

In the scanning method shown in FIG. 12 (1), for example, the outgoing light L1 having a dot-shaped irradiation surface is used. Then, the distance measuring device 1 performs scanning in the rightward and leftward directions repeatedly. Specifically, the distance measuring device 1 scans in the rightward direction and then turns back to scan in the leftward direction, and after scanning in the rightward direction again, turns back again to scan in the leftward direction. Such a scanning method is referred to as "raster scanning". As a means for realizing the raster scanning, it is conceivable to use, for example, a biaxial mirror as the mirror 25.

In the scanning method shown in FIG. 12 (2), the outgoing light L1 having an irradiation surface elongated in the longitudinal direction is used. In this case, the emission section 20 includes, for example, a collimator lens and a cylindrical lens. Then, the distance measuring device 1 irradiates a plurality of pixels PX in a longitudinal line at the same time, and scans in the rightward direction. Such a scanning method is referred to as "multichannel scanning". As a means for realizing the multichannel scanning, it is conceivable to use a polygon mirror, a revolving mirror, or a single-axis MEMS mirror, as the mirror 25. The multichannel scanning may be realized by rotating the distance measuring device 1 itself without using the mirror 25. The multichannel scanning can irradiate a plurality of pixels PX at the same time in a single laser emission. Thus, use of the multichannel scanning enables higher resolution and/or a higher frame rate than the raster scanning.

In the scanning method shown in FIG. 12 (3), the outgoing light L1 having an irradiation surface elongated in the longitudinal direction is used. In this case, the emission section 20 includes, for example, an anisotropic aspherical collimator lens. Then, the distance measuring device 1 irradiates a plurality of pixels PX in a longitudinal line at the same time and scans in the rightward direction, and then repeatedly performs scanning shifted in the perpendicular direction. Such a scanning method is referred to as "multichannel raster scanning". As a means for realizing the multichannel raster scanning, it is conceivable to use a polygon mirror having different tilt angles, a revolving mirror, a biaxial mirror, etc., as the mirror 25. As another means for realizing the multichannel raster scanning, a configuration shown in FIG. 13 is conceivable.

Figure 13:
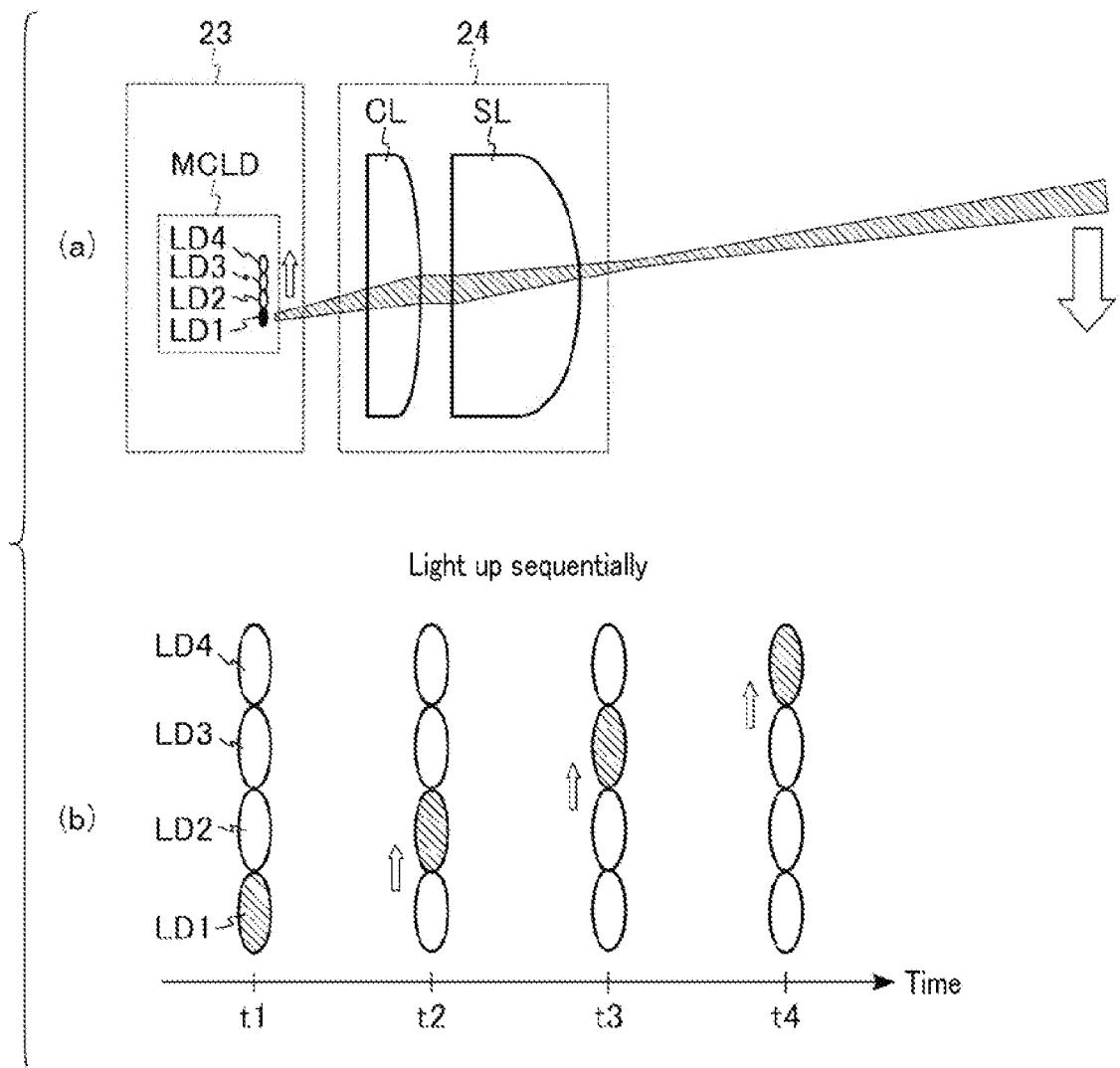
FIG. 13 depicts a schematic diagram showing an example of a scanning method of the emission section in the distance measuring device according to the first embodiment.

FIG. 13 depicts a schematic diagram showing an example of a scanning method of the emission section 20 in the distance measuring device 1 according to the first embodiment. As shown in FIG. 13 (a), in this example, the light source 23 includes a multichannel laser diode MCLD, and the optical system 24 includes a collimator lens CL and a cylindrical lens SL. For example, the multichannel laser diode MCLD includes laser diodes LD1 to LD4 aligned in one direction (longitudinal direction). The laser diodes LD1 to LD4 can be controlled independently. The laser light emitted from each of the laser diodes LD1 to LD4 passes through the collimator lens CL and the cylindrical lens SL in this order.

Then, the controller 10 lights up the laser diodes LD1 to LD4 sequentially at the time of multichannel raster scanning. In other words, the controller 10 lights up the multichannel laser diode MCLD while changing the channel in sequence. Specifically, as shown in FIG. 13 (b), the controller 10 lights up the laser diodes LD1 to LD4 at times t1 to t4, respectively. Then, the controller repeatedly performs the same control at times t1 to t4 in the multichannel raster scanning. Such multichannel raster scanning can also irradiate a plurality of pixels PX at the same time in a single laser emission, and thus can enable higher resolution and/or a higher frame rate than the raster scanning. Conversely, in order to obtain a certain degree of high resolution and high frame rate, it is preferable that the raster scanning or the multichannel raster scanning be used.

The above-described scanning methods are only examples. The scanning methods shown in FIGS. 12 (1) to (3) correspond to mechanical methods. The distance measuring device 1 may use an OPA (Optical Phased Array) method as another scanning method. The number of straight-line paths and the scanning direction in single scanning may be other settings. The operation and effect provided by the distance measuring device 1 according to the first embodiment do not depend on the scanning method of the outgoing light L1. Thus, the distance measuring device 1 according to the first embodiment may perform scanning by using any one of the mechanical methods and the OPA method. In the following, a case of using a multichannel raster using a plurality of channels of laser diodes will be described.

Figure 14:
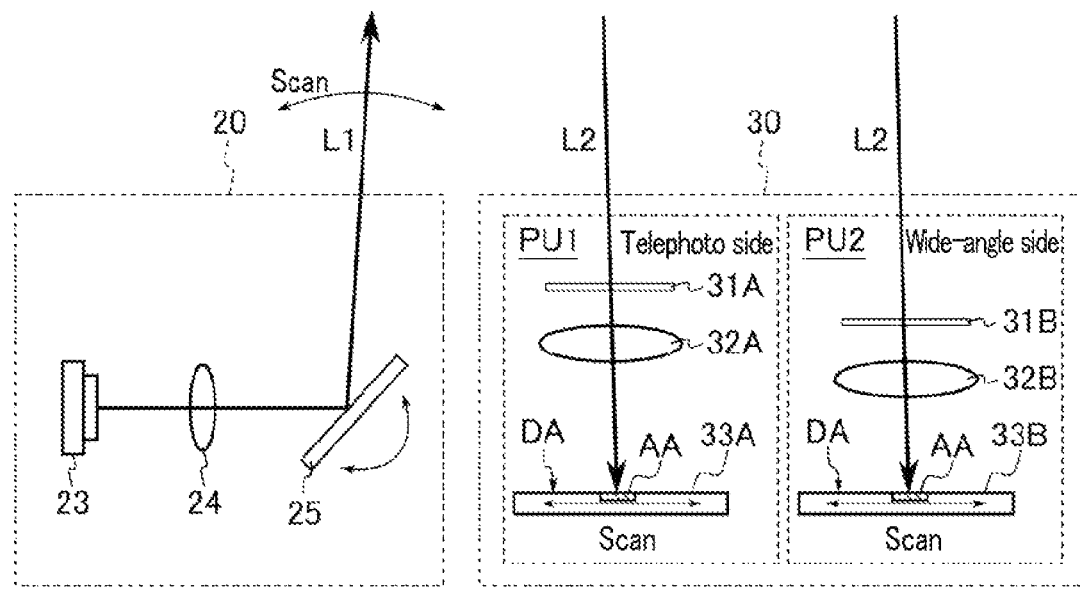
FIG. 14 depicts a schematic diagram showing an example of an operation of the light receiver in the distance measuring device according to the first embodiment.

FIG. 14 depicts a schematic diagram showing an example of an operation of the light receiver 30 in the distance measuring device 1 according to the first embodiment. In FIG. 14, the light source 23, the optical system 24, and the mirror 25 included in the emission section 20, and the light detection units PU1 and PU2 included in the light receiver 30 are simplified.

As shown on the left side of FIG. 14, the emission section 20 changes the angle of the mirror 25 and emits the outgoing light L1 so as to scan a desired area. That is, in the emission section 20, the outgoing light L1 emitted from the light source 23 passes through the optical system 24 and is applied to the mirror 25. Then, the outgoing light L1 applied to the mirror 25 is reflected in a direction according to the angle of the mirror 25. The controller 10 controls the mirror 25 such that the incident angle changes for each beam of outgoing light L1 emitted intermittently.

As shown on the right side of FIG. 14, in the light receiver 30, the reflected light L2 from the target object TG, illustration of which is omitted, is incident on each of the light detection units PU1 and PU2.

The reflected light L2 incident on the light detection unit PU1 on the telephoto side passes through the BPF 31A and the optical system 32A, and is applied to the light-receiving area DA of the light detector 33A. The active area AA set in the light-receiving area DA of the light detector 33A moves (i.e., scans) within the light-receiving area DA in synchronization with the state of the mirror 25. The position of the active area AA of the light detector 33A is set according to the design of the optical system 32A and the scanning position of the emission section 20. Thus, the active area AA of the light detector 33A is appropriately set to a position where the reflected light L2 can be received.

The reflected light L2 incident on the light detection unit PU2 on the wide-angle side passes through the BPF 31B and the optical system 32B, and is applied to the light-receiving area DA of the light detector 33B. The active area AA set in the light-receiving area DA of the light detector 33B moves (i.e., scans) within the light-receiving area DA in synchronization with the state of the mirror 25. The position of the active area AA of the light detector 33B is set according to the design of the optical system 32B and the scanning position of the emission section 20. Thus, the active area AA of the light detector 33B is appropriately set to a position where the reflected light L2 can be received.

A scan setting of the active area AA in the light detection unit PU1 on the telephoto side and a scan setting of the active area AA in the light detection unit PU2 on the wide-angle side may be the same or different. The scan setting of the active area AA may be at least set in accordance with the associated optical system 32.

[1-2-3] Specific Example of Measurement Operation

The shape and position of the reflected light L2 applied to each light-receiving area DA can change according to the position of the target object TG irradiated with the outgoing light L1. In the following, variations of the state of the reflected light L2 that the distance measuring device 1 receives from the target object TG and an example of a measurement operation corresponding to the state will be described using FIGS. 15, 16, and 17. Each of FIGS. 15, 16, and 17 depicts a schematic diagram showing an example of the light-receiving area DA and the reflected light L2 applied to the light detector 33 in the distance measuring device 1 according to the first embodiment.

Figure 15:
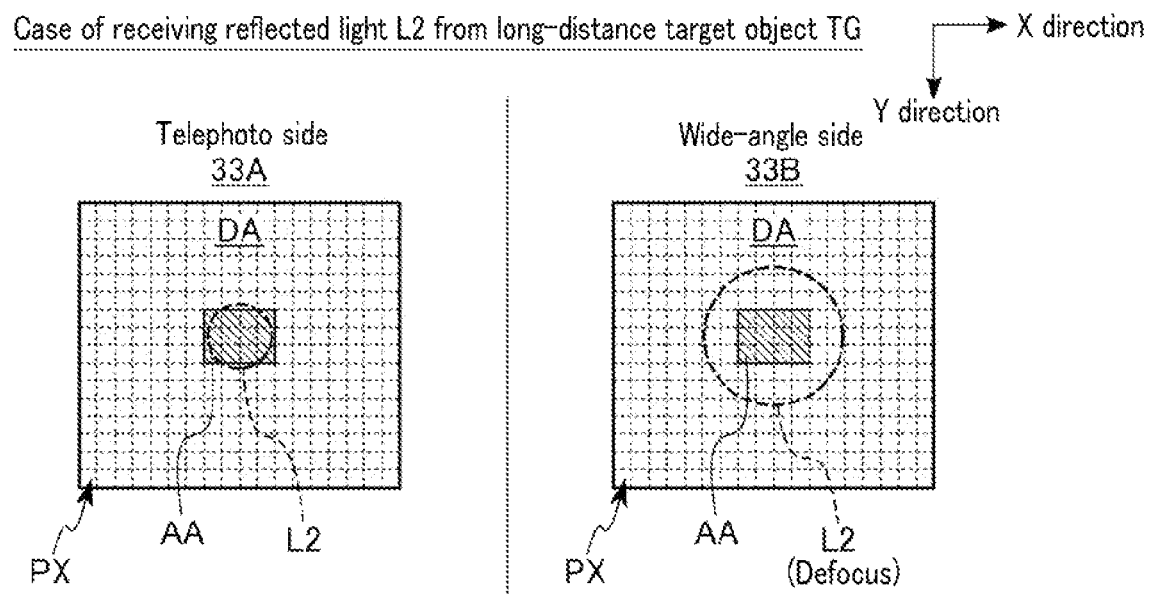
FIG. 15 depicts a schematic diagram showing an example of light-receiving areas and reflected light applied to the light detector in the distance measuring device according to the first embodiment.

FIG. 15 corresponds to a state in which the distance measuring device 1 receives the reflected light L2 from a long-distance target object TG. As shown in FIG. 15, the reflected light L2 from the long-distance target object TG enters an in-focus state in the light detector 33A on the telephoto side, and enters a state of being out of focus (a defocused state) in the light detector 33B on the wide-angle side. When a defocus occurs, an irradiation area of the reflected light L2 with respect to the light-receiving area DA expands. The light intensity per unit area in the defocused state is lower than that in a case of being in focus.

In this state, the reflected light L2 can be detected in both the light detector 33A on the telephoto side and the light detector 33B on the wide-angle side. However, since a defocus occurs in the light detector 33B on the wide-angle side, detection accuracy of a peak of the light intensity corresponding to the reflected light L2 is reduced. Thus, in a case where the light receiver 30 receives the reflected light L2 from the long-distance target object TG, reliability of a ranging result based on a light reception result of the light detector 33A on the telephoto side is higher than that of a ranging result based on a light reception result of the light detector 33B on the wide-angle side. For example, when a ranging result that is longer than a predetermined distance is measured in each of the light detector 33A on the telephoto side and the light detector 33B on the wide-angle side, the distance measuring device 1 may prioritize the ranging result corresponding to the light detector 33A on the telephoto side.

Figure 16:
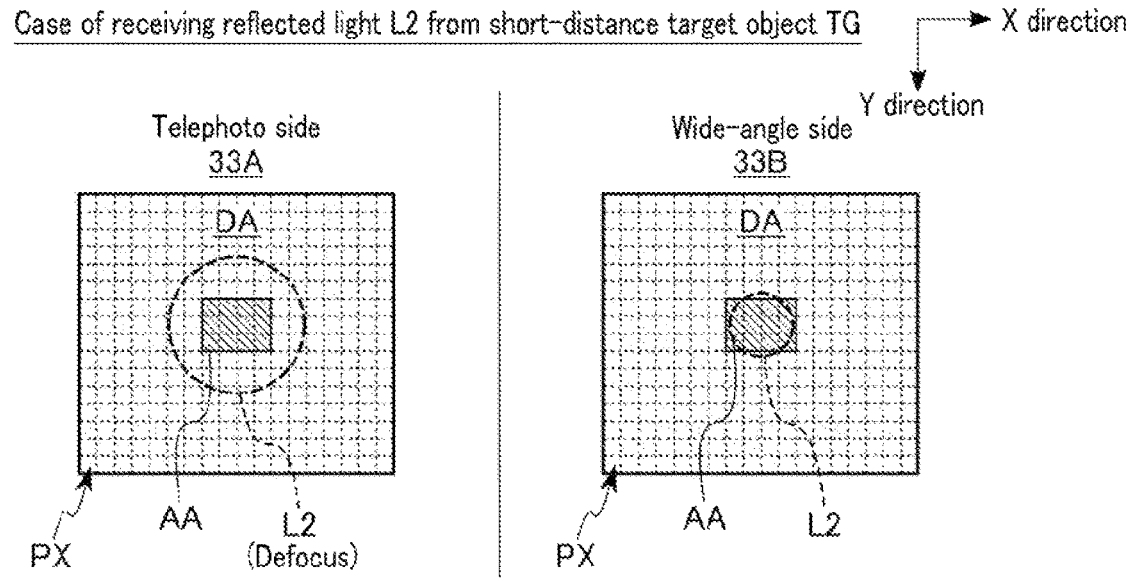
FIG. 16 depicts a schematic diagram showing an example of the light-receiving areas and reflected light applied to the light detector in the distance measuring device according to the first embodiment.
Figure 17:
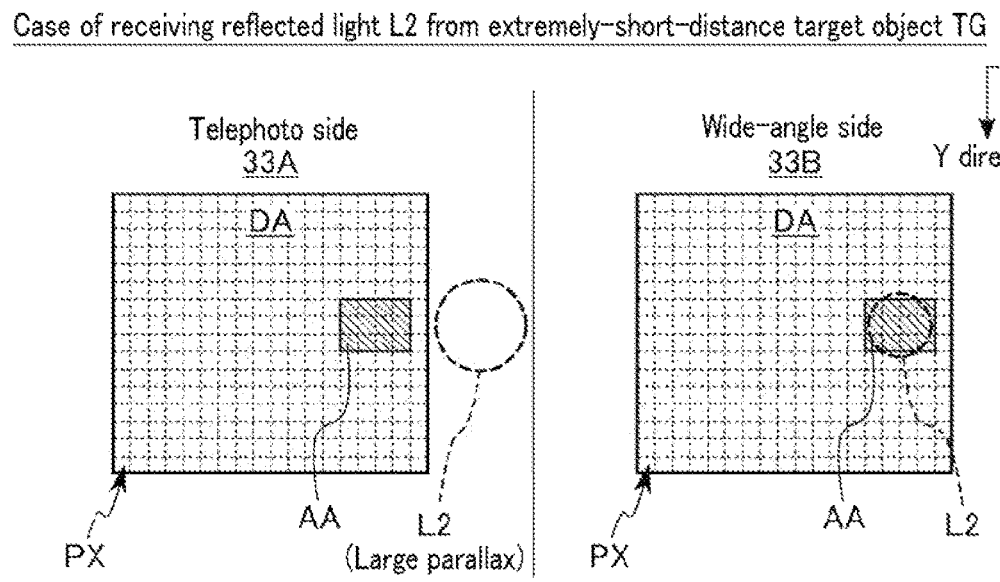
FIG. 17 depicts a schematic diagram showing an example of the light-receiving areas and reflected light applied to the light detector in the distance measuring device according to the first embodiment.

FIG. 16 corresponds to a state where the distance measuring device 1 receives the reflected light L2 from a short-distance target object TG. As shown in FIG. 16, the reflected light L2 from the short-distance target object TG enters an in-focus state at the light detector 33B on the wide-angle side, and enters a defocused state at the light detector 33A on the telephoto side.

In this state, the reflected light L2 can be detected in both the light detector 33A on the telephoto side and the light detector 33B on the wide-angle side. However, since a defocus occurs in the light detector 33A on the telephoto side, detection accuracy of a peak of light intensity corresponding to the reflected light L2 is reduced. Thus, in a case where the light receiver 30 receives the reflected light L2 from the short-distance target object TG, reliability of a ranging result based on a light reception result of the light detector 33B on the telephoto side is higher than that of a ranging result based on a light reception result of the light detector 33A on the telephoto side. For example, in a case where a ranging result that is shorter than a predetermined distance is measured in each of the light detector 33A on the telephoto side and the light detector 33B on the wide-angle side, the distance measuring device 1 may prioritize the ranging result corresponding to the light detector 33B on the wide-angle side.

FIG. 17 corresponds to a state where the distance measuring device 1 receives the reflected light L2 from an extremely-short-distance target object TG. As shown in FIG. 17, the reflected light L2 from the extremely-short-distance target object TG enters an in-focus state at the light detector 33B on the wide-angle side, and enters a defocused state at the light detector 33A on the telephoto side. In addition, in a case where the light receiver 30 receives the reflected light L2 from the extremely-short-distance target object TG, a parallax generated due to the non-coaxial optical system tends to increase. In the light detector 33B on the wide-angle side, a parallax is suppressed since the optical system 32B optimized for a short-distance target object TG is used. In the light detector 33A on the telephoto side, on the other hand, a parallax is large since the optical system 32A optimized for a long-distance target object TG is used.

In this state, the reflected light L2 is applied to the active area AA in the light detector 33B on the wide-angle side. On the other hand, in the light detector 33A on the telephoto side, the reflected light L2 may deviate from the light-receiving area DA. At this time, the distance measuring device 1 cannot detect a peak of light intensity corresponding to the reflected light L2 in the light detector 33A on the telephoto side. However, in the light detector 33B on the wide-angle side, the distance measuring device 1 can detect a peak of light intensity corresponding to the reflected light L2. In such a case, the distance measuring device 1 may add a ranging result corresponding to the light detector 33B on the wide-angle side to a ranging result corresponding to the light detector 33A on the telephoto side. In other words, in a case where a ranging result cannot be obtained in one light detector 33, the distance measuring device 1 may handle a ranging result in the other light detector 33 as the ranging result in the one light detector 33.

[1-3] Effect of First Embodiment

According to the above-described distance measuring device 1 according to the first embodiment, a highly reliable ranging result can be obtained over a range from an extremely short distance to a long distance. In the following, details of an effect of the first embodiment will be described together with a problem of a distance measuring device. A distance measuring device using a 2D sensor has, for example, the following problems (a) to (d).

(a) In a distance measuring device using a conventional 2D sensor, it has been difficult to realize both of ranging of a target located at a long distance and widening of a horizontal direction field of view FoVH. For ranging of a long-distance object, it is necessary to increase an effective aperture D of a light-receiving optical system (e.g., 20 mm). However, there is a trade-off relationship between the effective aperture D and the horizontal direction field of view FoVH. When it is assumed that a horizontal direction sensor size is "DAX" and an f-number of the light-receiving optical system is "fn", this trade-off relationship is "FoVH≈DAX/(D*fn) [rad]". Regarding the DAX, there is a limitation on the size that can be tolerated due to manufacturing or cost constraints (e.g., 20 mm). In addition, the f-number fn cannot usually be made too small (e.g., fn≥1.4). Accordingly, in a case where, for example, "FoVH≤~1/1.4[rad] ≈41°" and the effective aperture is "D≥20 mm", the horizontal direction field of view FoVH does not increase any further. In contrast, when the FoVH is increased, the effective aperture D cannot be increased, which makes long-distance ranging difficult.

Furthermore, since an object located at a long distance looks small, it is necessary to reduce a horizontal angle resolution AoVH (e.g., ≤0.05°). When it is assumed that a horizontal direction pixel size is "PX", the FoVH is "FoVH=AoVH*DAX/PX". In the present circumstances, the horizontal pixel size "PX" cannot be made too small in order to obtain a sufficient dynamic range of the "PX" (e.g., ≥30 um). For this reason, for example, the constraint "FoVH≤~33°" can occur.

A focal distance f of the optical system that receives the reflected light L2 has the relationship "PX=f*tan(AoVH)" between the horizontal direction angle resolution AoVH and the horizontal direction pixel size "PX". In addition, the effective aperture D has the relationship "f=D*fn" with respect to the focal distance f and the f-number fn. From these relationships, "PX=D*fn*tan(AoVH)" is derived, and from this equation and "FoVH=AoVH*DAX/PX", the above-described equation "FoVH=AoVH*DAX/(D*fn*tan(AoVH)) DAX/(D*fn) [rad]" is derived (approximation of "tan(AoVH) AoVH" holds when the AoVH is small).

It is preferable that ranging for a traveling direction of a vehicle have a fine angle resolution and can detect a long-distance target object TG. On the other hand, in order to suppress costs of the distance measuring device, it is preferable that a sufficient FoVH be secured in a single distance measuring device.

(b) In a case where a focal distance of an optical system that receives the reflected light L2 is set to infinity, a strong defocus can occur when receiving the reflected light L2 from a short-distance target object TG. When such a strong defocus occurs, the reflected light from the target object TG can be incident on a plurality of pixels PX at the same time. In a case of multichannel scanning or multichannel raster scanning, a plurality of pixels are ranged at the same time, and a luminance value of reflected light of a point (referred to as "A") among the plurality of pixels is often higher than that of the others (referred to as "B"). In general, distance measurement of a pixel is performed based on luminance data with the highest luminance in time-series luminance data obtained by the pixel. Thus, ranging of the pixel B is performed based on reflected light from a position of the pixel A, and erroneous ranging can thus occur and a value can be almost the same as that of the pixel A. As a result, in the longitudinal direction, distance values of a plurality of pixels may be almost equal, and even ranging results may be output and a sense of resolution may be deteriorated. In this case, the distance measuring device has difficulty in detecting a peak of a light reception result of the pixel B, and does not know an accurate light-receiving time T2. That is, occurrence of a defocus can be a cause of erroneous ranging and deterioration of resolution in measurement by ToF.

(c) It is preferable that the optical system that receives the reflected light L2 be designed to be bright in order to increase an uptake amount of light energy of the reflected light L2. However, in a case where an aperture value (f-number) of the optical system is designed to be small, there is a concern that a defocus may occur in the reflected light L2 from a short-distance target object TG and ranging accuracy of the short-distance target object TG may be reduced. On the other hand, in a case where the f-number of the optical system is designed to be large, there is a concern that the light amount of the reflected light L2 may become insufficient and ranging of a long-distance target object TG may be difficult. As such, the optical system that receives the reflected light L2 has difficulty in securing high reliability in ranging at both a long distance and a short distance.

(d) The cost of the distance measuring device can be suppressed since the size of the mirror can be decreased as compared to a coaxial optical system by designing the emission section and the light receiver of laser light with a non-coaxial optical system and using a 2D sensor. However, a parallax of the reflected light L2 of the non-coaxial optical system depends on the position of the target object TG. The parallax in the non-coaxial optical system has a tendency to increase as a distance from the target object TG decreases. Thus, in a case where a large parallax occurs, there is a concern that the distance measuring device cannot detect the target object TG due to the reflected light L2 deviating from the light-receiving area. This problem is significant when the field of view angle FoV in the parallax direction is small, and can be improved by increasing the FoV; however, the field of view angle cannot be increased for performing long-distance ranging as indicated in (a). In contrast, it is preferable that a sensor size and a light-receiving area taking a parallax into consideration be set, but such a setting leads to increase in cost and power consumption of the light detector. Furthermore, when the distance is to some extent short, such a setting itself becomes difficult.

For the above-described problems (a) to (d), the distance measuring device 1 according to the first embodiment includes the emission section 20 including one light emitter system, and the light receiver 30 including a plurality of light detection units PU1 and PU2 optimized for ranging of mutually different target objects TG. In the distance measuring device 1 according to the first embodiment, both of the light detection units PU1 and PU2 receive the reflected light L2 based on the outgoing light L1 emitted from a common emission section 20. Then, the distance measuring device 1 respectively performs ranging based on a light reception result of the light detection unit PU1 and ranging based on a light reception result of the light detection unit PU2.

More specifically, the light detection unit PU1 includes the optical system 32A optimized for ranging of a long-distance target object TG and the light detector 33A capable of changing the position of the active area AA in accordance with scanning of the emission section 20. A set of the optical system 32A and the light detector 33A is designed to have a narrow FoV and a large effective aperture D on the assumption of ranging of a target object TG on the telephoto side. On the other hand, the light detection unit PU2 includes the optical system 32B optimized for ranging of a short-distance target object TG, and the light detector 33B capable of changing the position of the active area AA in accordance with scanning of the emission section 20. A set of the optical system 32B and the light detector 33B is designed to have a wide FoV on the assumption of ranging of a target object TG on the wide-angle side. In general, in an observation system that travels like a vehicle, long-distance ranging is required for a narrow horizontal field of view angle that is close to a traveling direction, and a necessity of long-distance ranging is relatively low for directions outside thereof. The set of the optical system 32A and the light detector 33A provides a long-distance ranging function for the narrow field of view angle that is close to the traveling direction, and the set of the optical system 32B and the light detector 33B provides a wide angle ranging function for directions outside thereof. That is, the distance measuring device 1 according to the first embodiment has solved problem (a) in regard to the horizontal direction.

Since a common light emitter system is used, an angle resolution of the light detection unit PU1 having a narrow FoV is higher (smaller) than that of the light detection unit PU2 having a wide FoV. In addition, the optical system 32A of the light detection unit PU1 on the telephoto side can be designed to have a large focal distance and a small f-number. Thus, the light detection unit PU1 can improve measurement accuracy of a long-distance target object TG. On the other hand, the optical system 32B of the light detection unit PU2 on the wide-angle side can be designed to have a wide FoV and a small parallax. Thus, the distance measuring device 1 according to the first embodiment has addressed problem (d). In addition, the optical system 32B of the light detection unit PU2 can be designed to have a small focal distance and a large f-number. Thus, the light detection unit PU2 can reduce a defocus of a short-distance target object TG to reduce erroneous ranging or resolution problems caused by the defocus. As a result, the distance measuring device 1 according to the first embodiment has addressed problem (b). In addition, the optical system 32A of the light detection unit PU1 on the telephoto side can be designed to have a small f-number, and the optical system 32B of the light detection unit PU2 can be designed to have a large f-number. Thus, the distance measuring device 1 according to the first embodiment has addressed problem (c).

Furthermore, also in a case where problem (b) due to the influence of the defocus occurs in the light detection unit PU1 on the telephoto side, the distance measuring device 1 according to the first embodiment can complement a ranging result of the light detection unit PU1 by a ranging result by the light detection unit PU2 on the wide-angle side. In other words, the distance measuring device 1 according to the first embodiment can avoid employing an erroneous ranging result by another pixel PX that is caused by the defocus. Then, the distance measuring device 1 can complement the ranging results of the light detection unit PU1 and the light detection unit PU2 with each other according to the distance of the target object TG.

As described above, the distance measuring device 1 according to the first embodiment can realize both a fine resolution required on the telephoto side and a wide field of view angle required on the wide-angle side, and obtain a highly reliable ranging result over a range from an extremely short distance to a long distance. In addition, since the distance measuring device 1 according to the first embodiment uses a common emission section 20 for a plurality of light detection units PU1 and PU2, the cost of the distance measuring device 1 can be reduced.

Note that the distance measuring device 1 according to the first embodiment may output the ranging result of the light detection unit PU1 and the ranging result of the light detection unit PU2 together. In other words, the distance measuring device 1 may integrate ranging results of the light detection units PU1 and PU2 based on single scanning within the scanning area SA based on a predetermined condition and output it. For example, the distance measuring device 1 can select a ranging result in a measurement operation of the frame from a ranging result of any one of the light detection units PU1 and PU2 based on reliability to be described later.

[1-3] Modification of First Embodiment

The distance measuring device 1 according to the first embodiment can be modified in various ways. In the following, points different from the first embodiment will be described regarding first and second modifications of the first embodiment.

First Modification of First Embodiment

FIG. 18 depicts a schematic diagram showing an example of a scanning method of an emission section 20 in a distance measuring device 1A according to the first modification of the first embodiment. In the first modification of the first embodiment, scanning of a multichannel raster in which a plurality of channels of laser diodes are vertically arranged is performed in the same manner as the first embodiment. However, in the first modification of the first embodiment, a plurality of channels at a time may be lit up as indicated at times t1 and t4 shown in FIG. 18 (b).

Herein, a controller 10 in the first modification of the first embodiment performs scanning by changing the position in a horizontal direction (a direction intersecting a direction in which laser diodes LD1 to LD4 are aligned) without changing the longitudinal position in a state of each of times t1 to t4. For example, the controller 10 performs scanning from left to right of a scanning area of the distance measuring device 1. Then, after single scanning in the horizontal direction is completed, the controller 10 changes the position in the horizontal direction and performs scanning in a state of the next time. Specifically, the controller 10 scans in the horizontal direction in a state of time t1, and after the scanning in the state of time t1 is completed, scans in the horizontal direction in a state of time t2. Similarly, the controller 10 performs scanning in a state of each of times t3 and t4 in order, and after the scanning of time t4 is completed, returns to the state of time t1 to perform the same scanning.

For example, emission of a channel (laser diode LD) has a vertical emission angle of 4°. Laser emission by the laser diodes LD2 and LD3 indicated by heavy-line hatching in FIG. 18 (b) forms one cycle by a set of times t1 and t2 and a set of times t3 and t4. Specifically, the laser diode LD3 emits the laser light at times t1 and t3, and the laser diode LD2 emits the laser light at times t2 and t4. A vertical emission angle by the set of laser diodes LD2 and LD3 is, for example, 8°. This vertical emission angle 8° corresponds to a vertical field of view angle FoVV (VA1) on the telephoto side, and the above-described one cycle (e.g., times t1 to t2) corresponds to a frame rate on the telephoto side.

On the other hand, emission of the laser diode LD indicated by thin-line hatching in FIG. 18 (b) forms a different cycle. Specifically, one cycle is formed by times t1 to t4, and the laser diodes LD1 to LD4 emit laser light at times t1 to t4, respectively. That is, emission of laser light of the laser diode LD2 at time t2 is used on both the telephoto side and the wide-angle side. A vertical emission angle by the set of laser diodes LD1 to LD4 is, for example, 16°. This vertical emission angle 16° corresponds to a vertical field of view angle FoVV (VA2) on the wide-angle side, and the above-described cycle of times t1 to t4 corresponds to a frame rate on the wide-angle side. The vertical field of view angle on the wide-angle side is double the vertical field of view angle on the telephoto side, and the frame rate on the telephoto side is double the frame rate on the wide-angle side. Then, the light detection unit PU1 on the telephoto side is adjusted such that its vertical field of view angle matches a corresponding vertical emission angle. In addition, the light detection unit PU2 on the wide-angle side is adjusted such that its vertical field of view angle matches a corresponding vertical emission angle.

Note that, in the first modification of the first embodiment, multichannel laser diodes MCLD include at least one first laser diode LD that emits optical signals in order in a first cycle (frame rate on the telephoto side), and at least one second laser diode that emits optical signals in order in a second cycle (frame rate on the wide-angle side) longer than the first cycle. Parts of the first laser diode and the second laser diode may overlap each other. In addition, the controller 10 sets a first light-receiving area (active area AA) in the light detector 33A in accordance with a plurality of optical signals emitted in order by at least one first laser diode in the first cycle, and sets a second light-receiving area (active area AA) in the light detector 33B in accordance with a plurality of optical signals emitted in order by at least one second laser diode in the second cycle.

Next, an effect of the first modification of the first embodiment will be described. In a case where scanning in the vertical direction is performed by means of a polygon mirror having different tilt angles, since the vertical field of view angles FoVV on the telephoto side and the wide-angle side are determined by a tilt angle, the FoVV must be the same. In a case where the light detection units PU1 and PU2 have isotropic optical systems, a vertical size of the sensor of the light detection unit PU1 needs to have, for example, a double aspect ratio, and thus is large. For example, in a case where a focal distance on the telephoto side is double that on the wide-angle side, and a field of view angle on the wide-angle side is double that on the telephoto side, a horizontal size of the sensor of the light detection unit PU1 is equal to that of the sensor of the light detection unit PU2.

Then, the vertical size of the sensor of the light detection unit PU1 is double that of the sensor of the light detection unit PU2, resulting in an increase in cost of the sensor of the light detection unit PU1. The light detection unit PU1 or PU2 has an anisotropic optical system so that the cost of the sensor can be reduced. However, it is necessary to take measures such as adding a cylindrical lens to achieve anisotropy, resulting in an increase in such costs and size of the light detection unit, and an increase in assembly man-hours. Regardless of a polygon mirror having a different tilt angle, the same problem occurs in all methods (e.g., a biaxial mirror) for performing vertical scanning by a mirror.

In contrast, in the first modification of the first embodiment, it is possible to set the vertical field of view angles FoVV on the telephoto side and the wide-angle side independently. For example, the vertical field of view angle on the wide-angle side is set to be double that on the telephoto side so that even if the optical system of the light detection unit is isotropic, the vertical size of the sensor of the light detection unit PU1 on the telephoto side can be made equal to that of the sensor of the light detection unit PU2 on the wide-angle side, and the cost and the size of the device can be suppressed to be small. In addition, within the field of view angle on the telephoto side (in a direction close to the traveling direction), a target object is assumed to move rapidly, but since a frame rate on the telephoto side is high, the distance measuring device 1A has an advantage that it can acquire the target object in a short time. In FIG. 18, the number of laser channels (laser diodes LD) is assumed to be four, but is not limited thereto. The number of channels may be more or less than four. The number of channels to scan on the telephoto side is two in FIG. 18, but the number of channels used for scanning on the telephoto side may be more than two, or one (not scan).

In addition, in the case of the first modification of the first embodiment, vertical scanning by a mirror is unnecessary, e.g., a tilt structure of a polygon mirror and a biaxial mirror are unnecessary. The tilt structure raises manufacturing costs of the polygon mirror, and is expensive since the number of suppliers who provide it is also limited. A biaxial MEMS mirror is difficult to manufacture especially for in-vehicle application. The first modification of the first embodiment can solve such cost and sourcing problems. In a non-coaxial optical system, strict scanning accuracy is required for a scanning system such as a mirror as compared to a coaxial optical system; therefore, the lack of necessity of the vertical scanning can greatly mitigate these sourcing problems.

Second Modification of First Embodiment

FIG. 19 depicts a schematic diagram showing an example of a scanning method of an emission section 20 in a distance measuring device 1B according to a second modification of the first embodiment. In the second modification of the first embodiment, scanning of a multichannel raster in which a plurality of channels of laser diodes are vertically arranged is performed in the same manner as in the first embodiment. As shown in FIG. 19, in the second modification of the first embodiment, a plurality of laser diodes corresponding to the telephoto side and the wide-angle side are provided in the light source 23 of the emission section. Specifically, a laser diode LD2 of a multichannel laser diode MCLD includes a plurality of laser diodes LD2a, LD2b, LD2c, and LD2d aligned in a longitudinal direction. A set of laser diodes LD1 to LD4 is used for the wide-angle side, and a set of the laser diodes LD2a to LD2d is used for the telephoto side.

For example, a vertical emission angle of each channel (laser diodes LD2a to LD2d) on the telephoto side is 1 degree, and a vertical emission angle of each channel (laser diodes LD1 to LD4) on the wide-angle side is 4 degrees. Furthermore, an emission angle of the first channel (laser diode LD2) from the bottom on the wide-angle side and all the vertical emission angles (laser diodes LD2a to LD2d) on the telephoto side are designed to be matched. The black LDs in FIG. 19 represent vertical scanning on the telephoto side, and the shaded LDs represent scanning on the wide-angle side. Here, at time t2, all the channels (laser diodes LD2a to LD2d) on the telephoto side are lit up to cover a vertical field of view angle on the wide-angle side. In the second modification of the first embodiment, the frame rates on the telephoto side and the wide-angle side are the same. Note that the second channel (laser diode LD2b) from the bottom on the wide-angle side may be lit up at all the time bands.

Next, an effect of the second modification of the first embodiment will be described. Firstly, the distance measuring device 1B according to the second modification of the first embodiment can make a vertical field of view angle of each channel on the telephoto side smaller than, e.g., a quarter of, that in the first modification of the first embodiment. Accordingly, in the second modification of the first embodiment, optical noise N can be made a quarter and optical SN can be made a half of that in the first modification of the first embodiment. Furthermore, in the second modification of the first embodiment, the second channel from the bottom on the wide-angle side is lit up so that a signal S on the telephoto side can be made larger, e.g., by a quarter, and the optical SN can be made two-fifths in conjunction with the previous effect. These facts mean that the ranging distance and accuracy on the telephoto side can be greatly improved.

In addition, in the second modification of the first embodiment, the overall vertical field of view angle on the telephoto side can be made smaller than, e.g., half of, that in the first modification of the first embodiment. This overall vertical field of view angle on the telephoto side, for example, corresponds to a quarter of the vertical field of view angle on the wide-angle side. In a case where the light detection units PU1 and PU2 have isotropic optical systems and have the same sensor size, the second modification of the first embodiment can also make a horizontal field of view angle on the wide-angle side larger than, e.g., quadruple, that on the telephoto side. Therefore, in the second modification of the first embodiment, long distance performance on the telephoto side can be improved or FoV on the wide-angle side can be increased, thereby making the effect of the first embodiment more remarkable. Note that in the distance measuring device 1 of the first embodiment, a scanning system such as a polygon mirror, which is important in terms of size and cost, is common on the telephoto side and the wide-angle side, and thus has an advantage in respect of size and cost.

[2] Second Embodiment

A distance measuring device 2 according to a second embodiment includes a measurement section 40 different from that of the distance measuring device 1 according to the first embodiment. The other configurations of the distance measuring device 2 according to the second embodiment are the same as those of the distance measuring device 1 according to the first embodiment. Then, the distance measuring device 2 according to the second embodiment confirms a ranging result of each of the light detection units PU1 and PU2 based on reliability. Here, the reliability is, when selecting from a plurality of ranging results, a numerical value based on which the selection is decided. For example, when selecting two ranging results, the two with the highest reliability are selected. In the following, points different from the distance measuring device 1 according to the first embodiment will be described regarding the distance measuring device 2 according to the second embodiment.

An example of the reliability in a case of not performing averaging processing is luminance of ranging data itself (which is referred to as "R0"). For example, the luminance is a peak position of time-series data after AD conversion, and is the height of the peak when ranging an arrival time of reflected light from a target object. When not performing averaging processing, this luminance R0 represents the magnitude of the signal S, indicating certainty of the result. Note that the noise N due to ambient light is also added to simple luminance. Thus, an average value of ambient light is determined, and luminance from which the average value of the ambient light is subtracted is more accurate as an index of reliability. Accordingly, to be precise, simple luminance minus ambient light average value is the luminance R0.

When performing averaging processing, the luminance R0 of a pixel does not correctly represent certainty. This is because luminance data of other pixels are also added due to averaging. Therefore, an easy method for determining reliability that also takes into consideration luminance of other pixels to be added will be described in detail below.

[2-1] Configuration of Measurement Section 40

Figure 20:
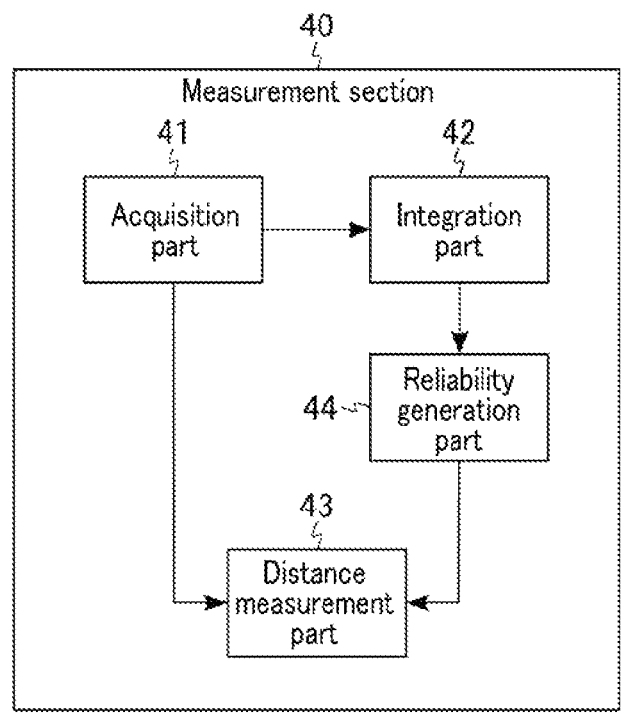
FIG. 20 depicts a block diagram showing an example of a configuration of a measurement section in a distance measuring device according to a second embodiment.

FIG. 20 depicts a block diagram showing an example of a configuration of a measurement section 40 in the distance measuring device 2 according to the second embodiment. As shown in FIG. 20, the measurement section 40 in the second embodiment includes, for example, an acquisition part 41, an integration part 42, a distance measurement part 43, and a reliability generation part 44. That is, the measurement section 40 according to the second embodiment has a configuration in which the reliability generation part 44 is added to the measurement section 40 in the first embodiment.

The reliability generation part 44 stores an integration result transferred from the integration part 42. Based on certainty of integration data based on the reflected light L2 of the outgoing light L1 emitted in the first irradiation direction, the reliability generation part 44 generates or acquires a weight value of the integration data. In the present specification, a "weight value" corresponds to reliability.

In addition, the integration part 42 transfers first integration data and second integration data to the distance measurement part 43. The distance measurement part 43 acquires third integration data by accumulating the weighted second integration data on the first integration data. The distance measurement part 43 measures a distance from a target object TG for each light detection unit PU by using a light-receiving time T2 calculated based on the third integration data, an emission time T1 received from the acquisition part 41, and reliability generated by the reliability generation part 44.

[2-2] Method for Averaging, and Methods for Calculating and Using Reliability

In the following, methods for calculating and using reliability in the distance measuring device 2 according to the second embodiment will be described. Note that the methods for calculating and using the reliability to be described below are only examples. The distance measuring device 2 may calculate reliability based on a certain algorithm, and utilize the calculated reliability.

[2-2-1] Areas Used for Averaging and Reliability Calculation

Figure 21:
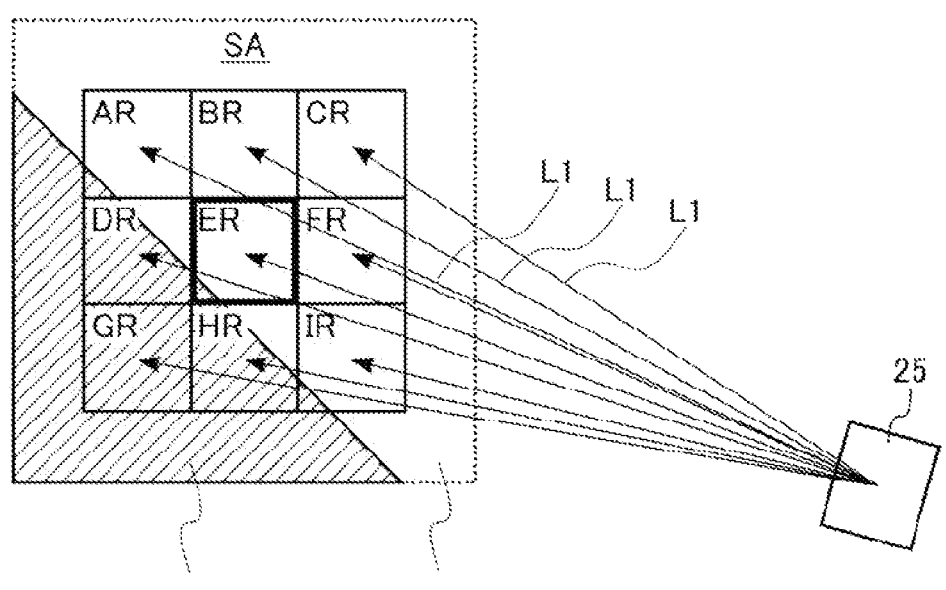
FIG. 21 depicts a schematic diagram showing an example of an area used for calculating reliability within a scanning area of the distance measuring device according to the second embodiment.

FIG. 21 depicts a schematic diagram showing an example of an area used for calculating reliability within a scanning area SA of the distance measuring device 2 according to the second embodiment. As shown in FIG. 21, the scanning area SA includes regions AR to IR. Each of the regions AR to IR corresponds to a region irradiated with the outgoing light L1. In the following, an area in which a single ranging result can be obtained by the outgoing light L1 being applied is also referred to as a "measurement point".

In addition, target objects TG1 and TG2 in different positions are included in the scanning area SA. Specifically, the regions AR, BR, CR, ER, FR, and IR mainly include the target object TG1. The regions DR, GR, and HR mainly include the target object TG2. For example, when raster scanning is performed, the regions AR to IR are respectively irradiated with different outgoing light L1. When multichannel scanning is performed, a plurality of regions (e.g., the regions AR, DR, and GR) aligned longitudinally are irradiated with single outgoing light L1 at the same time.

When averaging and reliability generation are performed on a light reception result of the reflected light L2 from the region ER, the region ER is associated with the regions AR, BR, CR, DR, FR, GR, HR, and IR, for example, as targets for performing integration. In this case, the distance measurement part 43 accumulates integration data of each of the weighted regions AR, BR, CR, DR, FR, GR, HR, and IR on integration data corresponding to the region ER.

In this example, similarity with the integration data acquired from the region ER is high in the integration data of each of the regions AR, BR, CR, ER, and IR, and low in the integration data acquired from each of the regions DR, GR, and HR. In this case, the reliability generation part 44 increases weighting of the integration data acquired from each of the regions AR, BR, CR, ER, and IR, and decreases weighting of the integration data acquired from each of the regions DR, GR, and HR, to the integration data acquired from the region ER. Then, the distance measurement part 43 accumulates integration data acquired from other regions within the area, if its weight exceeds a threshold value, on the integration data acquired from the region ER.

[2-2-2] Averaging and Reliability Estimation

An averaging algorithm selectively accumulates integration data by recognizing reflection data of a target by using intensity of a signal and background light information. In the following, an example of averaging based on an averaging algorithm and a subsequent calculation flow of reliability will be described.

Figure 22:
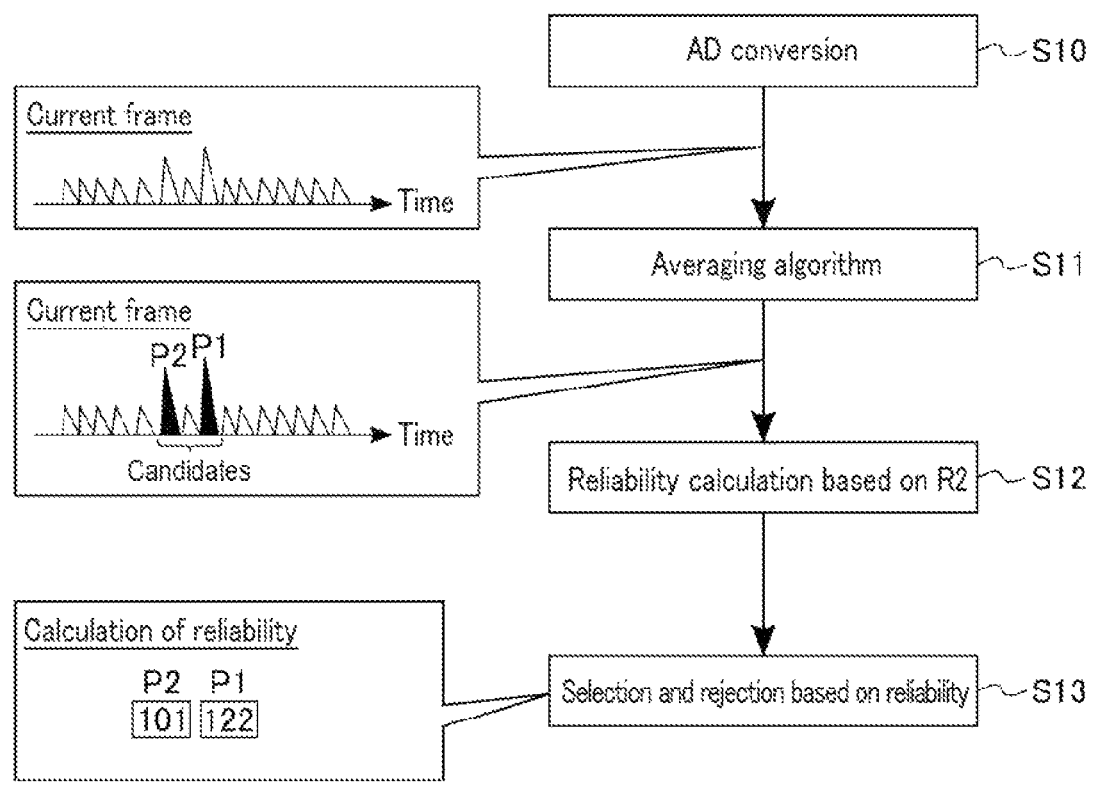
FIG. 22 depicts a schematic diagram showing an example of a calculation flow of reliability based on a first averaging algorithm of the distance measuring device according to the second embodiment.

FIG. 22 depicts a schematic diagram showing an example of averaging and a calculation flow of reliability of the distance measuring device 2 according to the second embodiment. As shown in FIG. 22, when the light receiver 30 receives the reflected light L2, the signal processor SP performs AD conversion (S10). Digital data obtained by the AD conversion is transferred to the measurement section 40, and the integration part 42 outputs integration data for each measurement point. Then, the reliability generation part 44 performs averaging processing based on an averaging algorithm (S11).

In the averaging algorithm, the integration part 42 extracts a candidate of a peak from integration data of a current frame. In this example, the integration part 42 selects two peaks P1 and P2 as output candidates of accumulated results of the current frame. Then, the reliability generation part 44 calculates reliability R2 based on reliability R2 to be described later for integration data through the averaging algorithm (S12). Then, the distance measurement part 43 selects or rejects the peak of the output candidate based on the reliability R2 added to the integration data (S13).

Formulae related to the reliability will be described below.

[Formula 1]

$$p(i,j): |D_j - D_i| \leq k \tag{1}$$

Formula (1) is a function for determining whether distance data of two points are the same by using a threshold k. "i" indicates an identifier (ID) of a measurement point of a target to be ranged. "j" indicates an ID of a measurement point other than the target within the area. p(i, j) indicates, for example, "1" if a distance between a distance value Di and a distance value Dj is equal to or less than "k", and "0" if it is greater than "k". The distance value Di corresponds to a ranging result of the measurement point of the target. The distance value Dj corresponds to a ranging result of the measurement point other than the target within a cluster. "k" is a numerical value exceeding 0, e.g., 2 meters.

[Formula 2]

$$N_i = \Sigma_{j \in A} p(i,j) \tag{2}$$

Formula (2) is a function indicating the size of a cluster. Ni indicates the number of measurement points having the distance value Dj, and a difference from the distance value Di of the measurement point of the target is equal to or less than a predetermined "k", among measurement points within a predetermined range A from the measurement point of the target.

[Formula 3]

$$R2_i = [\Sigma_{j \in A} L_j^2 \times p(i,j)]^{1/2} \tag{3}$$

Formula (3) is a function that gives reliability R2. Reliability R2i is a value based on a square mean of a signal value Lj of a measurement point considered to have a distance equal to that of the measurement point of the target among other measurement points within the predetermined range A from the measurement point of the target. The signal value Lj corresponds to a measurement point having the distance value Dj, and a difference from the distance value Di of the measurement point of the target is equal to or less than the threshold value k.

Based on the formulae (1) to (3) described above, the reliability generation part 44 calculates the reliability R2 at the measurement point of the target. In this example, the reliability R2 of the peak P1 is "122", and the reliability R2 of the peak P2 is "101". In this case, the distance measurement part 43 adapts the peak P1 with the higher reliability R2 than that of the peak P2 for measurement of the light-receiving time T2. The distance measuring device 2 according to the second embodiment can calculate such a reliability R2 for a light reception result of each of the light detection units PU1 and PU2.

[2-2-3] Inter-Frame Averaging Algorithm

An inter-frame averaging algorithm defines a search window according to a distance and movement measured in the previous frame, and selects an additional output candidate from a return value (peak) detected within a window of a current frame. Then, in the inter-frame averaging algorithm, a peak is selected according to reliability R3 expanded to include information from the previous frame. In the following, an example of a calculation flow of reliability based on the inter-frame averaging algorithm will be described.

Figure 23:
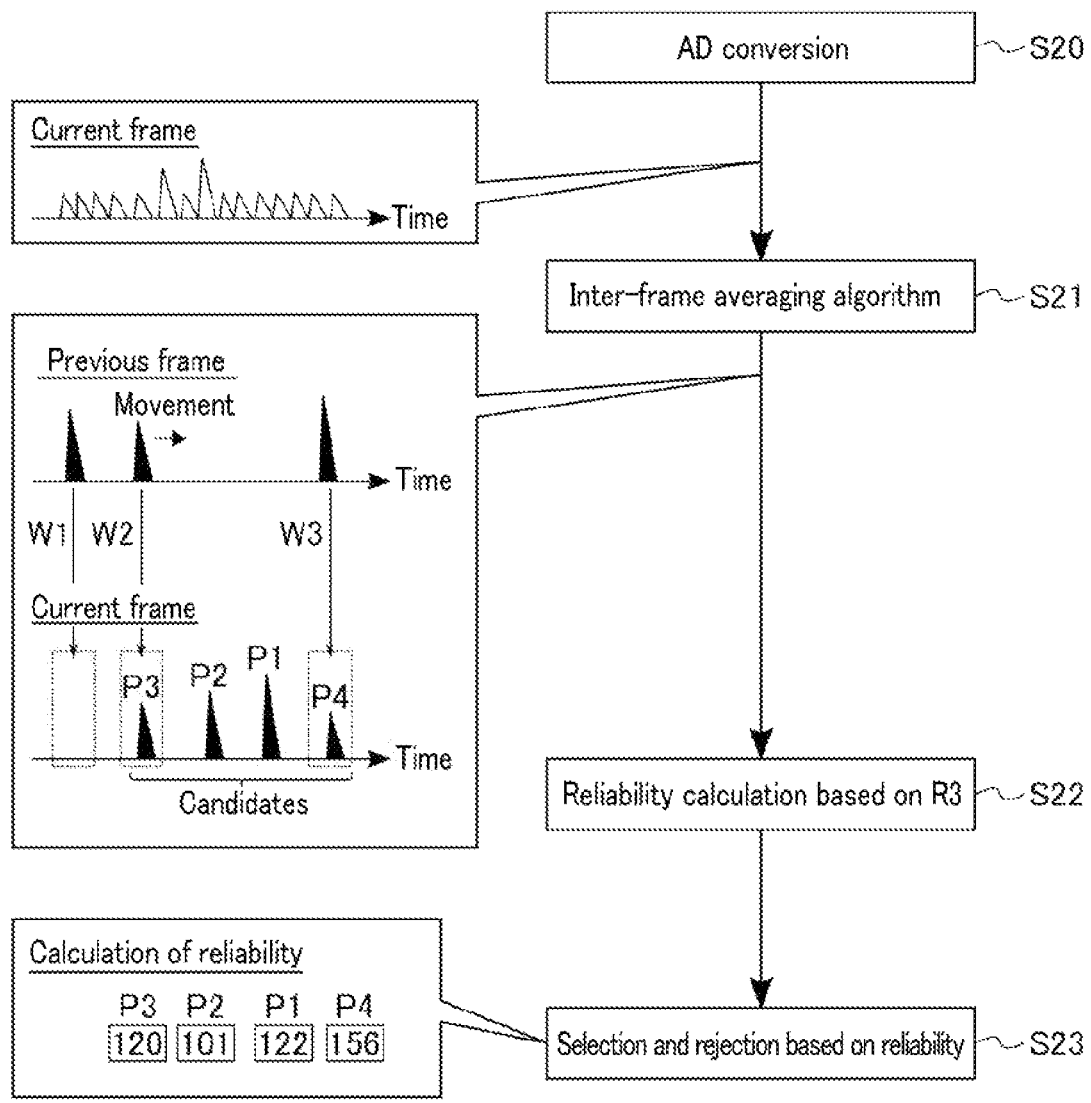
FIG. 23 depicts a schematic diagram showing an example of a calculation flow of reliability based on a second averaging algorithm of the distance measuring device according to the second embodiment.

FIG. 23 depicts a schematic diagram showing an example of a calculation flow of reliability based on an inter-frame averaging algorithm of the distance measuring device 2 according to the second embodiment. As shown in FIG. 23, when the light receiver 30 receives the reflected light L2, the signal processor SP performs AD conversion (S20). Digital data obtained by the AD conversion is transferred to the measurement section 40, and the integration part 42 stores integration data for each measurement point for a plurality of frames. Then, the reliability generation part 44 performs averaging processing based on an inter-frame averaging algorithm (S21).

In the inter-frame averaging algorithm, the distance measurement part 43 extracts candidates of peaks from integration data of a current frame in the same manner as the previous averaging algorithm. In this example, the distance measurement part 43 selects two peaks P1 and P2 as output candidates of accumulated results of the current frame. Furthermore, the distance measurement part 43 defines search windows W1 to W3 based on the peaks detected in the previous frame.

For example, the distance measurement part 43 adds peaks P3 and P4 detected within the search windows W1 to W3 in the current frame. Then, the reliability generation part 44 calculates reliability based on R3 to be described later for integration data through the inter-frame averaging algorithm (S22). After that, the distance measurement part 43 selects or rejects distance data based on the reliability added to the integration data and a threshold value (S23).

Formulae related to the inter-frame averaging algorithm will be described below.

[Formula 4]

$$R3_{i,a} = \sqrt{R2_{i,a}^2 + RP_{i,a}^2} \tag{4}$$

Formula (4) is a function for calculating the reliability R3. "i" indicates an ID of a measurement point of a target. "a" indicates an ID of a peak extracted in a current frame. $R2_{i,a}^2$ corresponds to the reliability R2 in a first averaging algorithm. That is, $R2_{i,a}^2$ indicates a pure weight value that a ranging result of the current frame gives to the reliability. $RP_{i,a}^2$ indicates a weight value added based on a ranging result of the previous frame.

[Formula 5]

$$P_s(D_1, D_2): |D_1 - D_2| \leq k_s(D_1) \tag{5}$$

Formula (5) is a function for determining whether two distance values are the same. "$k_s(D_1)$" corresponds to a threshold value in the inter-frame averaging algorithm, and is a function of $D_1$. $P_s(D_1, D_2)$ indicates, for example, "1" if a distance between the distance value $D_1$ and the distance value $D_2$ is equal to or less than "$k_s(D_1)$", and "0" if greater than "$k_s(D_1)$".

[Formula 6]

$$R2_{i,a} = [\Sigma_{j \in A, b \in Ss(j)} L(j,b,N)^2 + Ps(D(i,a,N), D(j,b,N))]^{1/2} \tag{6}$$

Formula (6) is a function for calculating the reliability R2 in the inter-frame averaging algorithm. "N" indicates an ID of a current frame. That is, "N−1" indicates an ID of the previous frame, and "N−2" indicates an ID of a frame before the previous frame. "Ss(j)" indicates a set of peaks extracted in the current frame. "b" indicates an ID of a peak extracted in the previous frame.

That is, L(j,b,N) indicates luminance of an ID of a peak extracted in the previous frame, in the current frame. "D(i,a,N)" indicates a distance value corresponding to a measurement point of a target among peaks extracted in the current frame. "D(j,b,N)" indicates a distance value of a peak with high reliability in the previous frame among the peaks extracted in the current frame.

[Formula 7]

$$P_p(D_1,D_2,\Delta D_2):|D_1-D_2-\Delta D_2|\le k_p(D_1,\Delta D_2) \quad (7)$$

Formula (7) is a function for defining a search window. The search window is determined by a change amount ΔD of distance values acquired in two consecutive frames. For example, ΔD represents a difference in distance value between the previous frame and a frame before the previous frame. That is, ΔD represents movement (speed) of a target object TG. The lower the speed, the narrower the search window, thereby suppressing an influence of ambient light.

[Formula 8]

$$k_p(D_1,\Delta D_2)=k_s(D_1)+C1\times\Delta D_2 \quad (8)$$

Formula (8) is a function indicating a setting condition of a search window. $k_s(D_1)$ is a threshold value calculated based on a distance value at a measurement point of a target. $C1\times\Delta D_2$ is a numerical value obtained by multiplying a distance value at another measurement point within an area by a predetermined constant C1.

[Formula 9]

$$RP_{i,a}=[\Sigma_{j\in R}L(j,b,N-1)^2\times P_p(D(i,a,N),D(i,b,N-1),\Delta D)\times \{1+P_p(D(j,b,N-1),D(j,b',N-2),\Delta D)\}]^{1/2} \quad (9)$$

Formula (9) is a function for calculating a weight value added based on a ranging result of the previous frame. "B" indicates a plurality of measurement points within an area in the previous frame. b' indicates an ID of a peak with high reliability extracted in a frame before the previous frame. That is, "D(j,b',N−2)" indicates a distance value of a peak with high reliability among peaks extracted in a frame before the previous frame.

Based on the formulae (4) to (9) described above, the reliability generation part 44 calculates the reliability R3 at the measurement point of the target. In this example, the reliabilities R3 of the peaks P1 to P4 are "122", "101", "120", and "156", respectively. In this case, the distance measurement part 43 adapts the peak P4 with the higher reliability R2 than that of the other peaks for measurement of the light-receiving time T2. The distance measuring device 2 according to the second embodiment can calculate such reliability R3 for a light reception result of each of the light detection units PU1 and PU2.

[2-2-4] Measurement Operation Using Reliability

Figure 24:
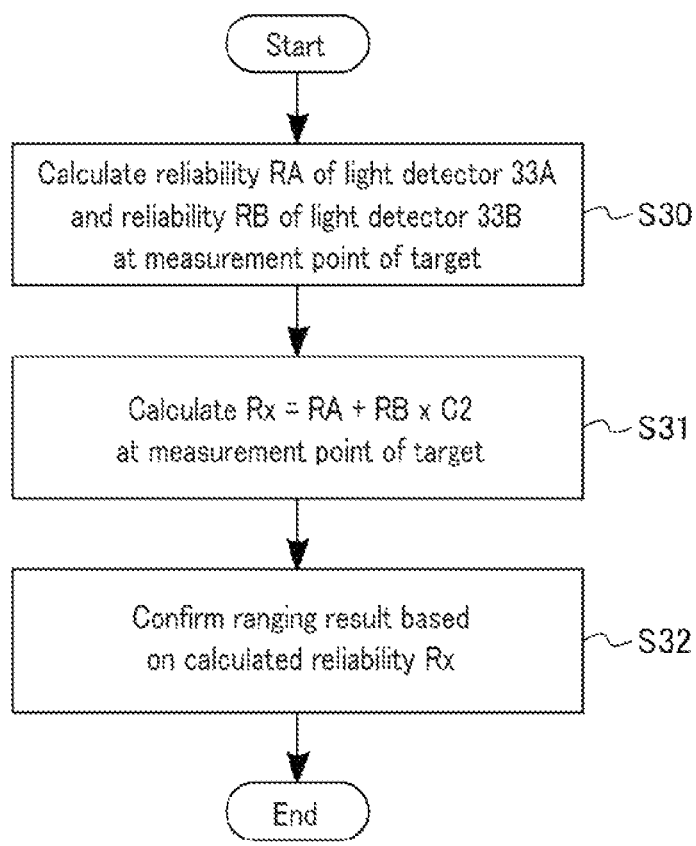
FIG. 24 depicts a flowchart showing an example of a measurement operation of the distance measuring device according to the second embodiment.

FIG. 24 depicts a flowchart showing an example of a measurement operation of the distance measuring device 2 according to the second embodiment. As shown in FIG. 24, the distance measuring device 2 according to the second embodiment performs continuous scanning (measurement operation) (Start).

When the measurement operation is started, the reliability generation part 44 calculates reliability RA of the light detector 33A at the measurement point of the target and reliability RB of the light detector 33B (S30). The reliability RA is reliability calculated based on a light reception result by the light detector 33A. The reliability RB is reliability calculated based on a light reception result by the light detector 33B.

Next, the reliability generation part 44 calculates "Rx=RA+RB×C2" at the measurement point of the target (S31). Rx is reliability integrated in the light detection units PU1 and PU2. C2 is a predetermined constant. In other words, the reliability generation part 44 multiplies the reliability RB of the light detection unit PU2 by a constant and adds to the reliability RA of the light detection unit PU1.

Then, the distance measurement part 43 confirms a ranging result of the target based on the calculated reliability Rx (S32). For example, the distance measurement part 43 adapts a peak with the highest reliability Rx from a plurality of peaks extracted from integration data of each of the light detection units PU1 and PU2. The distance measurement part 43 measures the light-receiving time T2 based on the adapted peak, and confirms the ranging result.

Note that the constant C2 used in this example is set according to a setting of the light detection unit PU1 and a setting of the light detection unit PU2. For example, in a case where the reliability of the light detection unit PU2 is higher than that of the light detection unit PU1, the constant C2 is set to a numerical value exceeding 1. In addition, in a case where detection of a short-distance target object TG is more important than that of a long-distance target object TG, the constant C2 is set to a large numerical value so as to increase weighting by the reliability of the light detection unit PU2 on the wide-angle side.

[2-3] Effect of Second Embodiment

As described above, the distance measuring device 2 according to the second embodiment adds reliability to integration data obtained from a light reception result. Then, the distance measuring device 2 confirms a ranging result based on the reliability. By the reliability being used, an S/N is correctly considered quantitatively and data is selected and rejected from among a plurality of distance data obtained from the telephoto side and the wide-angle side.

As a result, the distance measuring device 2 according to the second embodiment can suppress selecting an erroneous peak for measurement of the light-receiving time T2. Accordingly, the distance measuring device 2 can increase a success rate of ranging and improve ranging accuracy. In addition, ranging of a long-distance target object TG is greatly affected by noise such as ambient light. Therefore, the distance measuring device 2 can extend the distance that can be ranged by ranging based on the reliability.

Further, when there is a difference in parameters such as a difference in amplification factor between the light detection units PU1 and PU2, it may not be possible to compare luminance data of output data thereof as they are. However, in that case, by using the constant C2 of the present embodiment, the luminance is corrected and can be compared correctly. As a result, the distance measuring device 2 can also compare the reliability. This enables the distance measuring device 2 to improve the ranging performance, such as increasing the ranging success rate.

Furthermore, the distance measuring device 2 according to the second embodiment can integrate a ranging result corresponding to the light detection unit PU1 and a ranging result corresponding to the light detection unit PU2 based on their respective reliabilities. Thereby, the distance measuring device 2 according to the second embodiment can reduce the amount of data handled as compared to the first embodiment. For example, reducing the amount of data can reduce the capacity of the RAM, etc. included in the distance measuring device 2, and is effective in reducing the cost of the distance measuring device 2. Further, the integration of the ranging results in the light detection units PU1 and PU2 can suppress a load on a device that handles the ranging results of the distance measuring device 2.

[2-4] Modification of Second Embodiment

The distance measuring device 2 according to the second embodiment can be modified in various ways. In the following, points different from the second embodiment will be described regarding first and second modifications of the second embodiment.

First Modification of Second Embodiment

Figure 25:
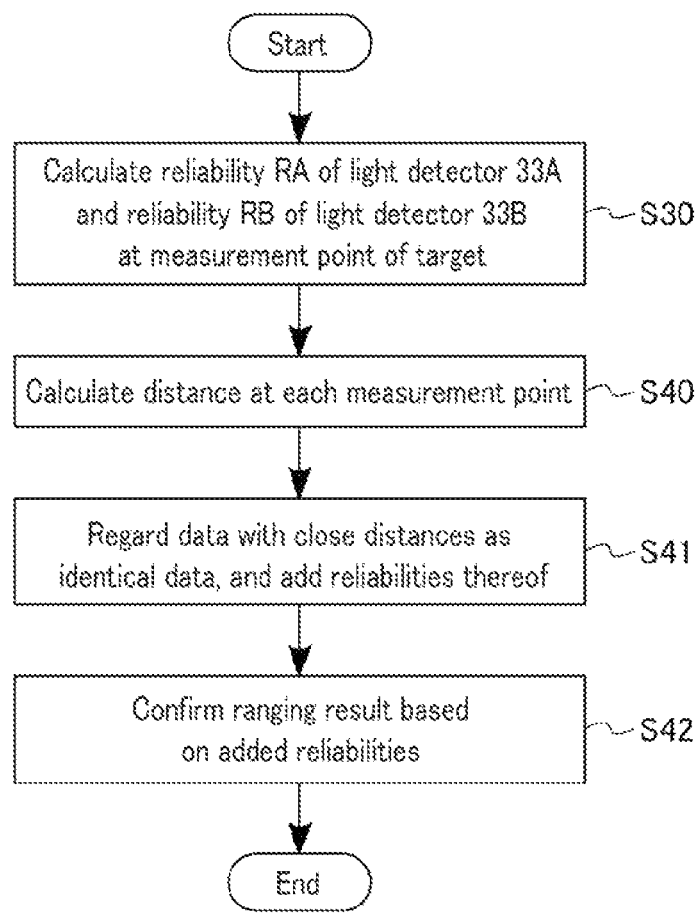
FIG. 25 depicts a flowchart showing an example of a measurement operation of a distance measuring device according to a first modification of the second embodiment.

FIG. 25 depicts a flowchart showing an example of a measurement operation of a distance measuring device 2A according to the first modification of the second embodiment. As shown in FIG. 25, the distance measuring device 2A according to the first modification of the second embodiment performs a continuous measurement operation (Start).

When the measurement operation is started, the reliability generation part 44 calculates the reliability RA of the light detector 33A and the reliability RB of the light detector 33B at the measurement point of the target (S30). Next, the distance measurement part 43 calculates a distance at each measurement point (S40). Then, in a case where approximately identical distance data is included in the light detectors 33A and 33B, the distance measurement part 43 adds the reliabilities thereof (S41). Then, the distance measurement part 43 confirms a ranging result based on the added reliabilities (S42). When these processes are completed (End), the distance measuring device 2A performs the same processes at a subsequent measurement point.

It is unlikely that the light detectors 33A and 33B will make the same erroneous detection, and it is highly likely that the fact that approximately the same distance data is measured by the light detectors 33A and 33B may indicate accurate ranging results. Therefore, the distance measuring device 2A according to the first modification of the second embodiment updates the reliability of the distance data based on tentatively measured ranging data. For example, the distance measuring device 2A according to the first modification of the second embodiment regards data with close distances to be identical and adds reliabilities thereof.

As a result, the distance measuring device 2A according to the first modification of the second embodiment can improve reliability of a ranging result. In the first modification of the second embodiment, the addition of reliabilities may be performed when the averaging algorithm and the inter-frame averaging algorithm are used.

Second Modification of Second Embodiment

Figure 26:
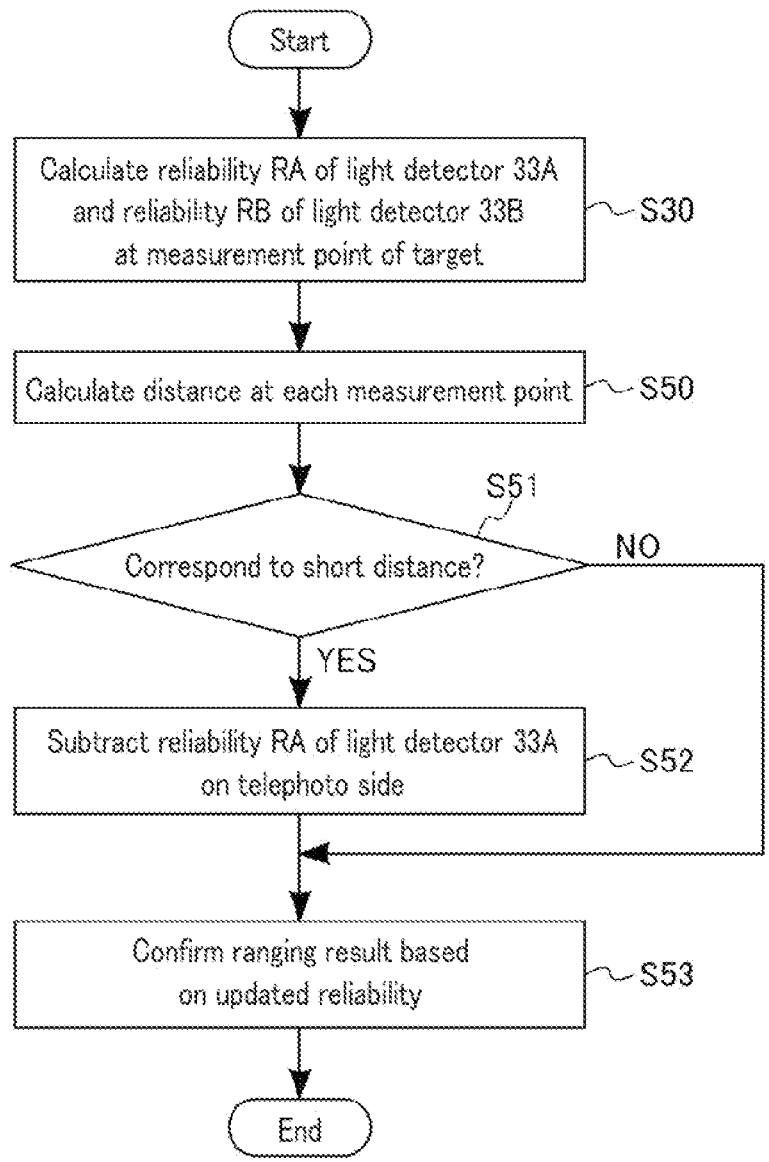
FIG. 26 depicts a flowchart showing an example of a measurement operation of a distance measuring device according to a second modification of the second embodiment.

FIG. 26 depicts a flowchart showing an example of a measurement operation of a distance measuring device 2B according to the second modification of the second embodiment. As shown in FIG. 26, the distance measuring device 2B according to the second modification of the second embodiment performs a continuous measurement operation (Start).

When the measurement operation is started, the reliability generation part 44 calculates the reliability RA of the light detector 33A and the reliability RB of the light detector 33B at the measurement point of the target (S30). Next, the distance measurement part 43 calculates a distance at each measurement point (S50).

Then, the distance measurement part 43 confirms whether or not the calculated ranging data corresponds to a short distance (S51). If it corresponds to the short distance (S51, YES), the distance measurement part 43 multiplies the reliability RA of the light detector 33A on the telephoto side by a constant C2 smaller than 1, or subtracts the constant (S52), and proceeds to the process of S53. On the other hand, if it does not correspond to the short distance (S51, NO), the distance measurement part 43 proceeds to the process of S53 without performing the process of S52. In this way, the reliability RA can be updated based on a ranging result. In the process of S53, the distance measurement part 43 confirms the ranging result based on the appropriately updated reliability (S53). When these processes are completed (End), the distance measuring device 2B performs the same processing at a subsequent measurement point.

When a short-distance ranging result is obtained in either the light detector 33A or 33B, a defocus may occur in the light detection unit PU1 on the telephoto side. That is, in such a case, the certainty of the ranging result by the light detection unit PU1 is relatively lower than that of the ranging result by the light detection unit PU2.

Accordingly, the distance measuring device 2B according to the second modification of the second embodiment updates reliability of distance data based on tentatively measured ranging data. For example, the distance measuring device 2B lowers reliability of ranging data by the light detection unit PU1 on the telephoto side when short-distance ranging data is obtained. Then, based on the updated reliability, the distance measuring device 2B performs integration of the ranging data of the light detection unit PU1 on the telephoto side and the ranging data of the light detection unit PU2 on the wide-angle side.

Thereby, the distance measuring device 2B can improve reliability of a ranging result for a short-distance target object TG. Note that in the second modification of the second embodiment, update of reliability may be performed when the averaging algorithm is used.

[3] Third Embodiment

A distance measuring device 3 according to a third embodiment has the same configuration as that of the distance measuring device 1 according to the first embodiment. The distance measuring device 3 according to the third embodiment adjusts a position of an active area AA based on a light reception result. In the following, points different from the distance measuring device 1 according to the first embodiment will be described regarding the distance measuring device 3 according to the third embodiment.

[3-1] Adjustment Operation of Distance Measuring Device 3

Figure 27:
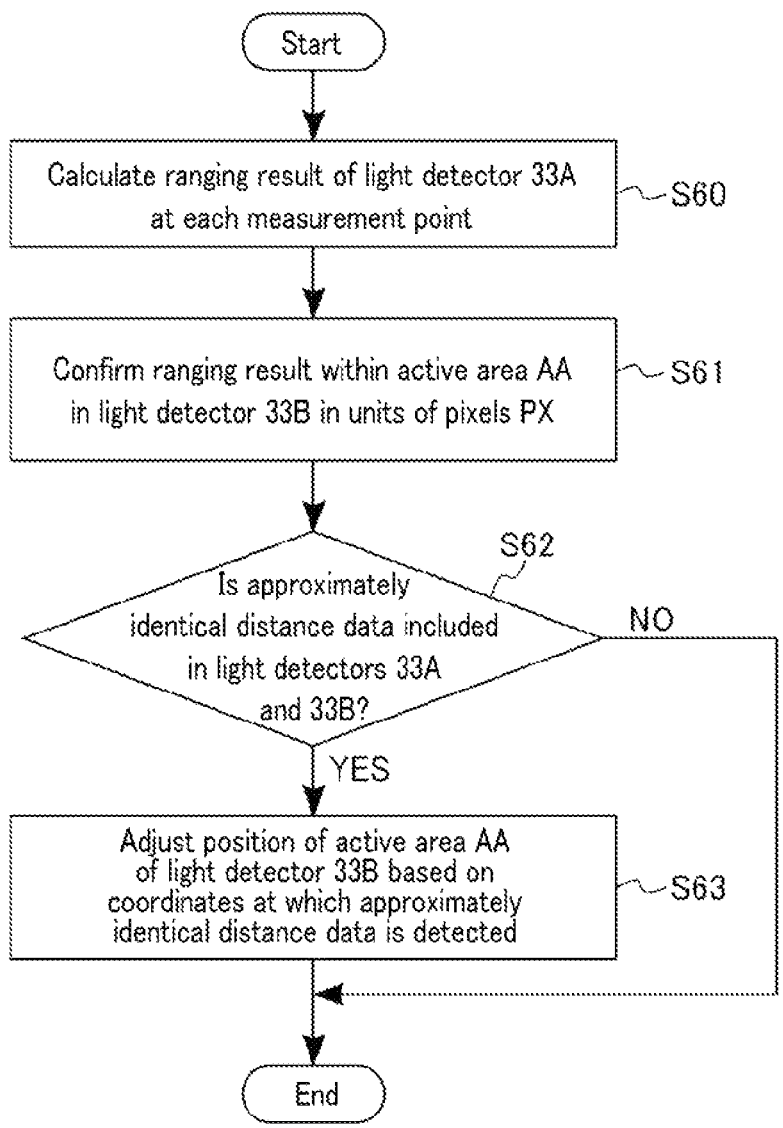
FIG. 27 depicts a flowchart showing an example of an adjustment operation of a distance measuring device according to a third embodiment.

FIG. 27 depicts a flowchart showing an example of an adjustment operation of the distance measuring device 3 according to the third embodiment. As shown in FIG. 27, the distance measuring device 3 according to the third embodiment periodically performs an adjustment operation when performing continuous scanning (measurement operation) (Start).

When the adjustment operation is started, the distance measurement part 43 calculates a measurement result of the light detector 33A at each measurement point (S60). In addition, the distance measurement part 43 calculates a ranging result of the light detector 33B, and confirms the ranging result of the light detector 33B in units of pixels PX (S61). Then, the controller 10 confirms whether or not approximately identical distance data is included in the light detectors 33A and 33B (S62). In the confirmation of the distance data in S62, for example, a ranging result within the same frame and based on the same outgoing light L1 is used.

If the approximately identical distance data is included (S62, YES), the controller 10 adjusts a position of an active area AA of the light detector 33B to be set in subsequent scanning based on coordinates at which the approximately identical distance data is detected. On the other hand, if the approximately identical data is not included (S62, NO), or the process of S63 is completed, the distance measuring device 3 finishes the adjustment operation (End). Note that a trigger for the adjustment operation to be performed may be other settings. For example, the distance measuring device 3 may perform the adjustment operation at the time of activation or based on an instruction from other devices.

Figure 28:
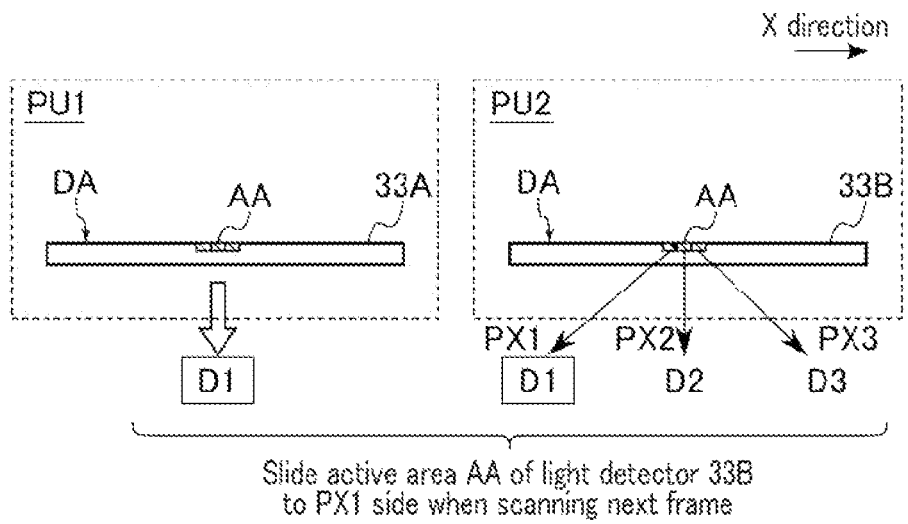
FIG. 28 depicts a schematic diagram showing a specific example of the adjustment operation of the distance measuring device according to the third embodiment.

FIG. 28 depicts a schematic diagram showing a specific example of the adjustment operation of the distance measuring device 3 according to the third embodiment. As shown in FIG. 28, a distance value D1 is measured in an active area AA set in the light detector 33A of the light detection unit PU1. On the other hand, in the active area AA set in the light detector 33B of the light detection unit PU2, distance values D1, D2, and D3 are measured corresponding to pixels PX1, PX2, and PX3 aligned in the X direction, respectively. That is, the distance measured in the pixel PX1 of the light detector 33B coincides with the distance measured by the light detector 33A. In this case, the controller 10 slides the active area AA of the light detector 33B toward the pixel PX1 side when scanning the next frame.

In other words, in the adjustment operation of the distance measuring device 3 according to the third embodiment, the controller 10 compares the plurality of distance data calculated based on respective outputs of the plurality of pixels PX included in the active area AA of the light detector 33B and the distance value calculated based on an output of the active area AA of the light detector 33A. Then, the controller 10 adjusts the position of the active area AA of the light detector 33B in the subsequent scanning so that the position of a pixel PX associated with distance data having approximately the same numerical value as the distance value of the light detector 33B among the plurality of distance data corresponding to the light detector 33B becomes closer to the center of the active area AA of the light detector 33B.

In the adjustment operation described above, the processing content is simplified in order to make the idea easier to understand. The actual adjustment operation can be performed as follows.

The light-receiving positions of the light detection units PU1 and PU2 are each subjected to fixed periodic scanning. The periodic scanning is, for example, a constant speed movement when the emission system is a rotation mirror, and a movement based on a sine function when the emission system is a device such as MEMS. A parameter to be adjusted is its time offset. Further, in order to stabilize the operation, sharp adjustment is not desirable. Therefore, the light-receiving positions of the light detection units PU1 and PU2 are corrected based on results of long-term observation. For example, the number of pixels PX1 of the light detection unit PU2 that match and pixels PX2 that do not match is counted by performing confirmation in units of pixels PX for each measurement as described above continuously for one frame. Only if the number is equal to or greater than a predetermined threshold value, the time offset is set smaller by one pixel. Similarly, also in a modification of the third embodiment to be described later, correction is actually performed if a predetermined threshold value is exceeded as a result of long-term observation, but the description thereof will be omitted.

[3-2] Effect of Third Embodiment

As described above, in the distance measuring device 3 according to the third embodiment, the position of the active area AA in the light detector 33B is adjusted so as to increase a correlation with the ranging result detected by the light detector 33A. As a result, in the distance measuring device 3 according to the third embodiment, a correspondence between a pixel PX included in the active area AA of the light detector 33A and a pixel PX included in the active area AA of the light detector 33B is periodically calibrated.

Thereby, the distance measuring device 3 according to the third embodiment can improve the light-receiving accuracy of the reflected light L2 in the light detection unit PU1 and the light-receiving accuracy of the reflected light L2 in the light detection unit PU2, and ranging results based on respective outputs of the light detection units PU1 and PU2 can be brought close to each other. As a result, the distance measuring device 3 according to the third embodiment can handle the ranging result in the light detection unit PU1 and the ranging result in the light detection unit PU2 as single data. That is, the distance measuring device 3 can easily integrate the ranging results of the light detection units PU1 and PU2. In other words, the light detection units PU1 and PU2 always face the same direction, and the pixels have a corresponding relationship. Thus, the distance measuring device 3 can process the results of both the light detection units PU1 and PU2 in real time (e.g., addition, comparison, and time series integration) without storing the results. In addition, the distance measuring device 3 can complement the respective ranging results of the light detection units PU1 and PU2 with each other.

[3-3] Modification of Third Embodiment

The distance measuring device 3 according to the third embodiment can be modified in various ways. In the following, points different from the third embodiment will be described regarding first to fourth modifications of the third embodiment. In the following descriptions, "right and left" correspond to one side and the other side along the X direction, respectively. "Upper and lower" correspond to one side and the other side along the Y direction, respectively.

First Modification of Third Embodiment

Figure 29:
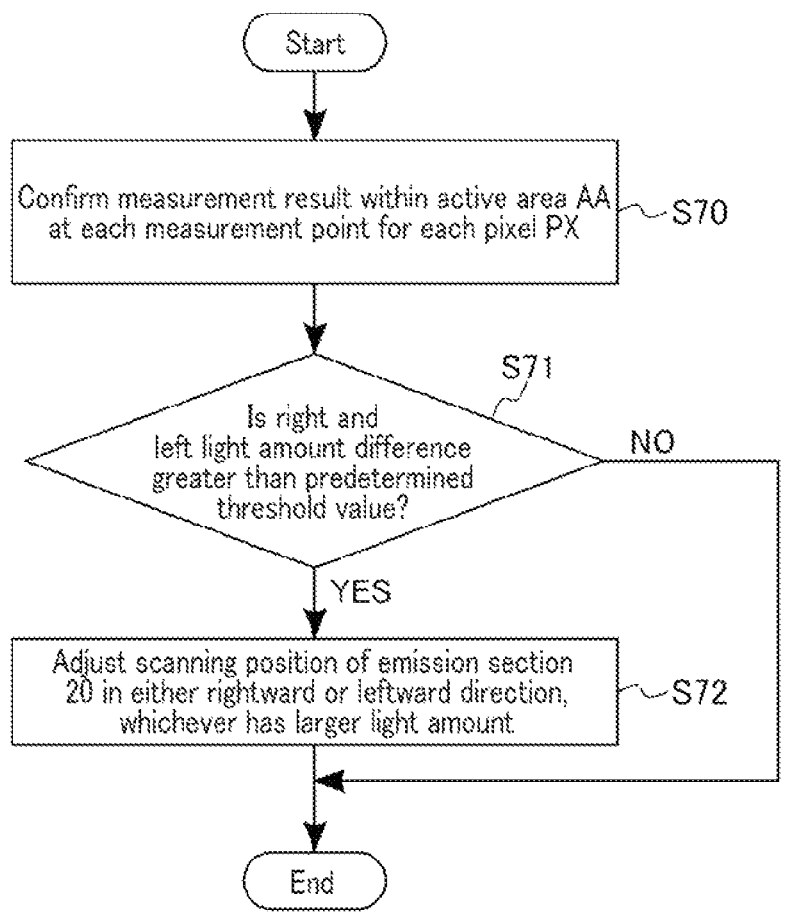
FIG. 29 depicts a flowchart showing an example of an adjustment operation of a distance measuring device according to a first modification of the third embodiment.

FIG. 29 depicts a flowchart showing an example of an adjustment operation of a distance measuring device 3A according to the first modification of the third embodiment. As shown in FIG. 29, the distance measuring device 3A according to the first modification of the third embodiment periodically performs an adjustment operation when, for example, continuous scanning (measurement operation) is performed (Start).

When the adjustment operation is started, the controller 10 confirms measurement results in the respective active areas AA of the light detectors 33A and 33B at each measurement point in units of pixels PX (S70). Then, the controller 10 confirms whether or not a right and left light amount difference is greater than a predetermined threshold value in the respective active areas AA of the light detectors 33A and 33B (S71). In the process of S71, for example, an amount of light in the pixel PX provided on the left side in the active area AA is compared with an amount of light in the pixel PX provided on the right side in the active area AA.

When the right and left light amount difference is equal to or less than the predetermined threshold value (S71, NO), the controller 10 finishes the adjustment operation (End). On the other hand, when the right and left light amount difference is greater than the predetermined threshold value (S71, YES), the controller 10 adjusts a scanning position of the emission section 20 to be set in subsequent scanning in either the rightward or leftward direction, whichever has a larger light amount. When the process of S72 is completed, the distance measuring device 3A finishes the adjustment operation (End). A timing at which the scanning position is changed may be at least after the adjustment operation.

Figure 30:
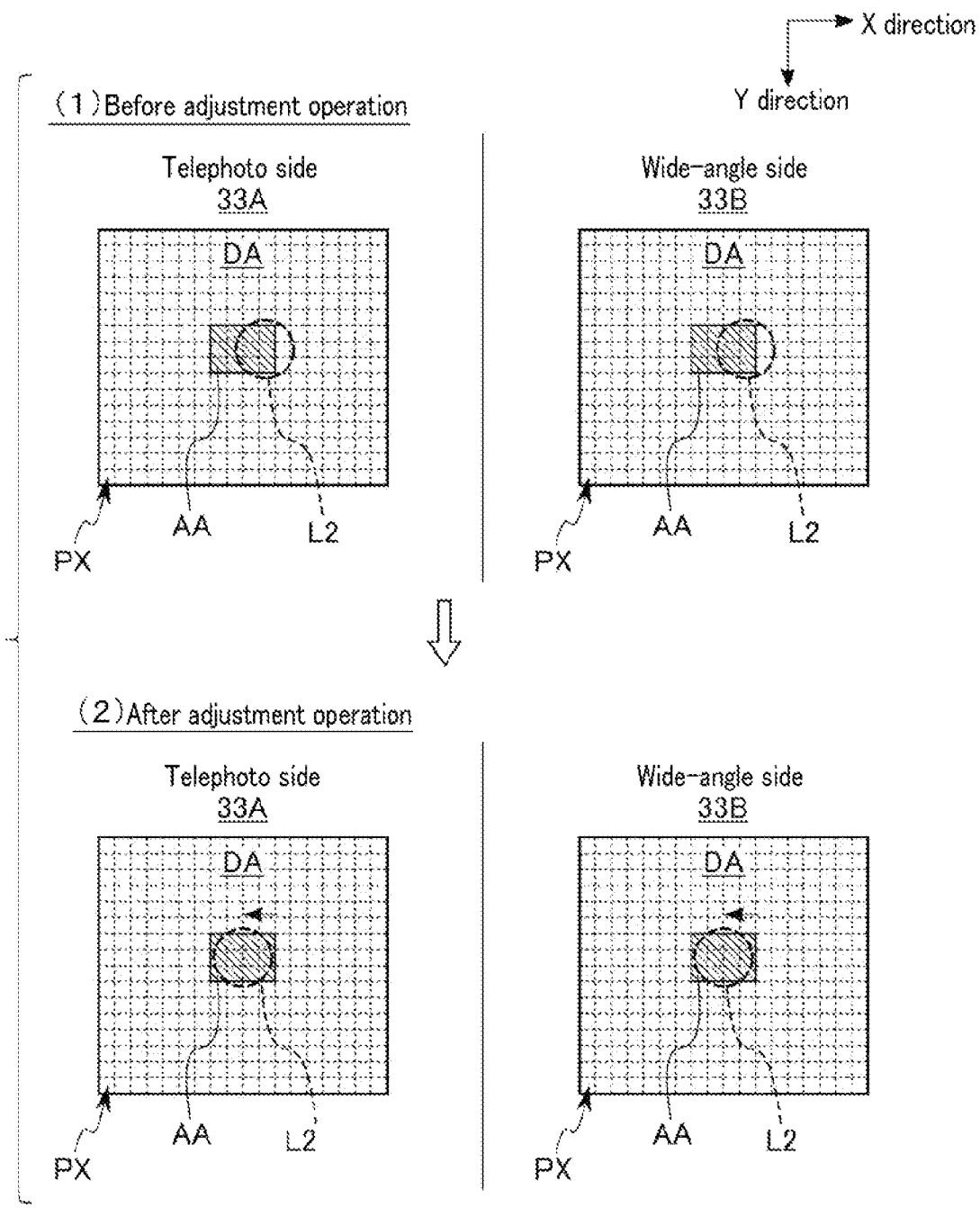
FIG. 30 depicts a schematic diagram showing a specific example of the adjustment operation of the distance measuring device according to the first modification of the third embodiment.

FIG. 30 depicts a schematic diagram showing a specific example of the adjustment operation of the distance measuring device 3A according to the first modification of the third embodiment. FIG. 30 (1) shows positions of the reflected light L2 incident on each light-receiving area DA and the active areas AA before an adjustment operation. FIG. 30 (2) shows positions of the reflected light L2 incident on each light-receiving area DA and the active areas AA after the adjustment operation.

As shown in FIG. 30 (1), before the adjustment operation, the reflected light L2 applied to the active area AA of the light detector 33A and the reflected light L2 applied to the active area AA of the light detector 33B are each offset to the right side of the page. In this case, the active area AA receives a large amount of light on the right side of the page, and a small amount of light on the left side of the page.

As shown in FIG. 30 (2), after the adjustment operation in the first modification of the third embodiment, an incident position of the reflected light L2 is adjusted by, for example, the angle of the mirror 25 of the emission section 20 being adjusted. In this example, the reflected light L2 applied to the active area AA of the light detector 33A and the reflected light L2 applied to the active area AA of the light detector 33B are each shifted to the left side of the page as compared with those before the adjustment operation. As a result, the amount of the reflected light L2 on the right and left in the active area AA of the light detector 33A is uniform, and the amount of the reflected light L2 on the right and left in the active area AA of the light detector 33A is uniform.

Thereby, the distance measuring device 3A according to the first modification of the third embodiment can receive the reflected light L2 near the center of the active area AA, and can improve the light-receiving accuracy of the reflected light L2. Accordingly, the distance measuring device 3A can improve reliability of a ranging result.

In the first modification of the third embodiment, an adjustment amount of the scanning position may be changed according to the magnitude of the right and left light amount difference. Further, the scanning position of the emission section 20 may be adjusted based on an upper and lower light amount difference. In this case, the controller 10 of the distance measuring device 3A compares the upper and lower light amount difference with a predetermined threshold value, and adjusts the scanning position of the emission section 20 in either the upper or lower direction, whichever has a larger light amount. The controller 10 may perform the upper-lower position adjustment of the scanning position and the right-left position adjustment of the scanning position collectively or individually.

Second Modification of Third Embodiment

FIG. 31 depicts a flowchart showing an example of an adjustment operation of a distance measuring device 3B according to a second modification of the third embodiment. As shown in FIG. 31, the distance measuring device 3B according to the second modification of the third embodiment periodically performs the adjustment operation when, for example, continuous scanning (measurement operation) is performed (Start). The adjustment operation in the second modification of the third embodiment has a configuration in which the process of S72 is replaced with that of S73 in the first modification of the third embodiment.

That is, if the right and left light amount difference is greater than the predetermined threshold value (S71, YES), the distance measuring device 3B performs the process of S72. In the process of S72, the controller 10 adjusts the positions of the active areas AA of the light detectors 33A and 33B in either the rightward or leftward direction, whichever has a larger light amount. If the right and left light amount difference is equal to or less than the predetermined threshold value (S71, NO) or if the process of S73 is completed, the distance measuring device 3B finishes the adjustment operation (End).

Figure 32:
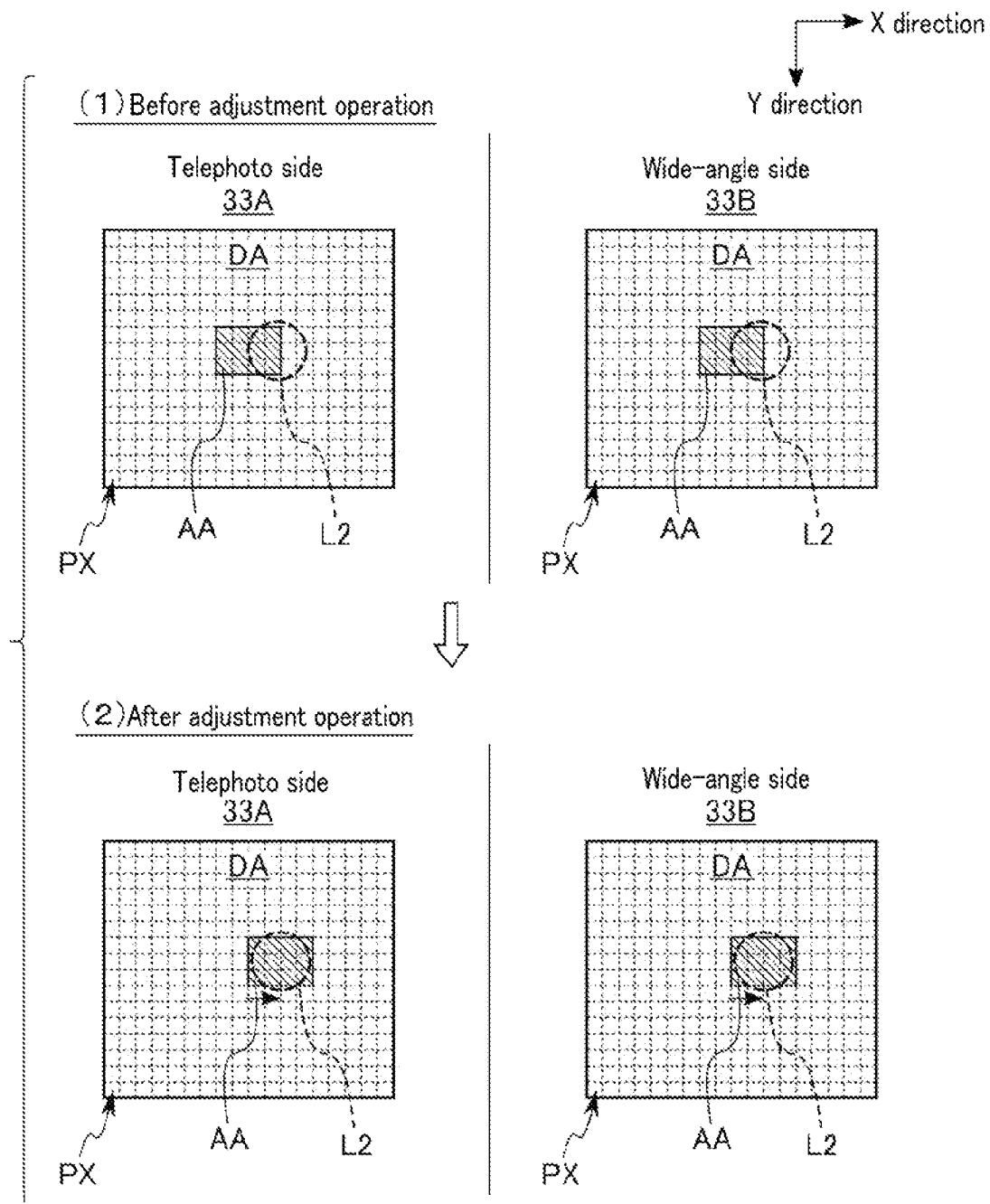
FIG. 32 depicts a schematic diagram showing a specific example of the adjustment operation of the distance measuring device according to the second modification of the third embodiment.

FIG. 32 depicts a schematic diagram showing a specific example of the adjustment operation of the distance measuring device 3B according to the second modification of the third embodiment. As shown in FIG. 32, FIG. 32 (1) shows positions of the reflected light L2 incident on each light-receiving area DA and the active areas AA before an adjustment operation. FIG. 32 (2) shows positions of the reflected light L2 incident on each light-receiving area DA and the active areas AA after the adjustment operation.

As shown in FIG. 32 (1), before the adjustment operation, the reflected light L2 applied to the active area AA of the light detector 33A and the reflected light L2 applied to the active area AA of the light detector 33B are each offset to the right side of the page. In this case, the active area AA receives a large amount of light on the right side of the page, and a small amount of light on the left side of the page.

As shown in FIG. 32 (2), after the adjustment operation in the second modification of the third embodiment, the positions of the respective active areas AA of the light detectors 33A and 33B are adjusted by the controller 10. In this example, the position of the active area AA of the light detector 33A and the position of the active area AA of the light detector 33B are shifted to the right side of the page as compared with those before the adjustment operation. As a result, the amount of the reflected light L2 on the right and left in the active area AA of the light detector 33A is uniform, and the amount of the reflected light L2 on the right and left in the active area AA of the light detector 33B is uniform.

Thereby, the distance measuring device 3B according to the second modification of the third embodiment can receive the reflected light L2 near the center of the active area AA, and improve the light-receiving accuracy of the reflected light L2. That is, the distance measuring device 3B can improve reliability of a ranging result.

In the second modification of the third embodiment, an adjustment amount of the position of the active area AA may be changed according to the magnitude of the right and left light amount difference. Further, the positions of the active areas AA of the light detectors 33A and 33B may be adjusted based on an upper and lower light amount difference. In this case, the controller 10 of the distance measuring device 3B compares the upper and lower light amount difference with a predetermined threshold value, and adjusts the positions of the respective active areas AA of the light detectors 33A and 33B in either the upper or lower direction, whichever has a larger light amount. The controller 10 may perform the upper-lower position adjustment of the active area AA and the right-left position adjustment of the active area AA collectively or individually.

Third Modification of Third Embodiment

Figure 33:
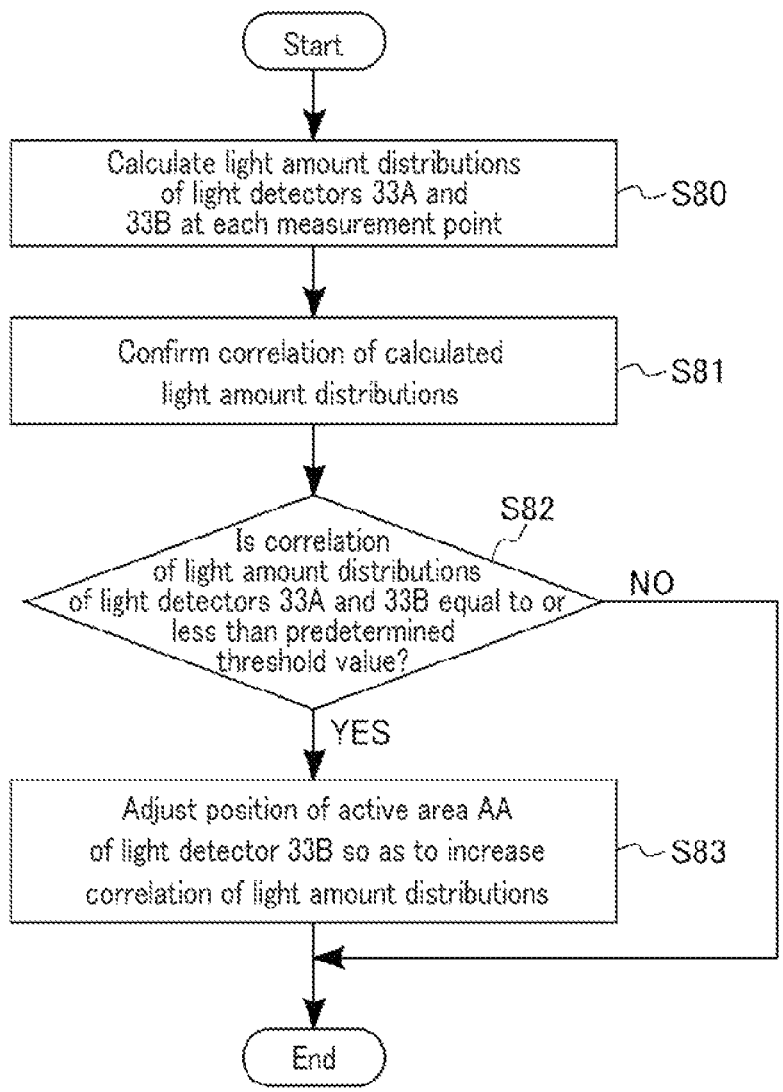
FIG. 33 depicts a flowchart showing an example of an adjustment operation of a distance measuring device according to a third modification of the third embodiment.

FIG. 33 depicts a flowchart showing an example of an adjustment operation of a distance measuring device 3C according to a third modification of the third embodiment. As shown in FIG. 33, the distance measuring device 3C according to the third modification of the third embodiment periodically performs an adjustment operation when, for example, continuous scanning (measurement operation) is performed (Start).

When the adjustment operation is started, the controller 10 calculates distribution of the light amounts of each of the light detectors 33A and 33B at each measurement point (S80). Then, the controller 10 confirms a correlation of the calculated light amount distributions (S81). In the process of S81, for example, distribution of light amounts of pixels PX that pass through the center in the active area AA and are aligned in the X direction is confirmed. Then, the controller 10 confirms a correlation between distribution of light amounts of pixels PX in the light detector 33A and distribution of light amounts of pixels PX in the light detector 33B.

If the correlation of the light amount distributions of the light detectors 33A and 33B is greater than a predetermined value (S83, NO), the distance measuring device 3C finishes the adjustment operation (End). On the other hand, if the correlation of the light amount distributions of the light detectors 33A and 33B is equal to or less than the predetermined value (S82, YES), the controller 10 adjusts a position of an active area AA of the light detector 33B to be set in subsequent scanning so as to increase the correlation of the light amount distributions between the light detectors 33A and 33B (S83). If the process of S83 is completed, the distance measuring device 3C finishes the adjustment operation (End).

Figure 34:
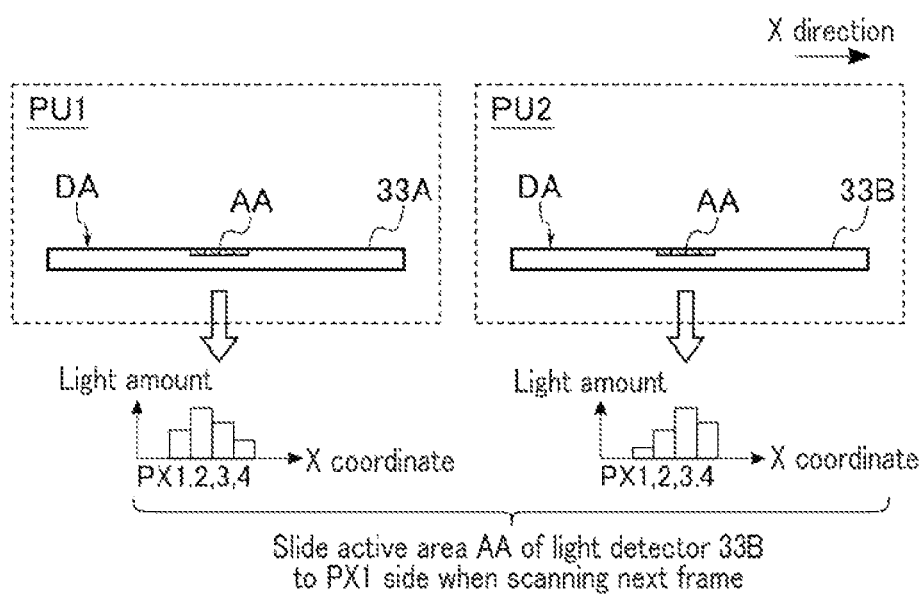
FIG. 34 depicts a schematic diagram showing a specific example of the adjustment operation of the distance measuring device according to the third modification of the third embodiment.

FIG. 34 depicts a schematic diagram showing a specific example of the adjustment operation of the distance measuring device 3C according to the third modification of the third embodiment. FIG. 34 shows a schematic diagram of the light detectors 33A and 33B, and an example of a light amount distribution based on a ranging result of each active area AA.

As shown in FIG. 34, in the third modification of the third embodiment, the controller 10 calculates a light amount distribution in the active area AA, for example, along the X direction. In this example, a light amount distribution in the active area AA of the light detector 33A has a peak in the pixel PX2, and a light amount distribution in the active area AA of the light detector 33B has a peak in the pixel PX3. In this case, the controller 10 slides the active area AA of the light detector 33B toward the pixel PX1 side when scanning the next frame.

Thereby, the distance measuring device 3C according to the third modification of the third embodiment can receive the reflected light L2 near the center of the active area AA, and improve the light-receiving accuracy of the reflected light L2. That is, the distance measuring device 3C can improve reliability of a ranging result. In the third modification of the third embodiment, various functions can be used to calculate the correlation of the light amount distributions. In the third modification of the third embodiment, a correlation of light amount distributions along the Y direction may be confirmed, and the position of the active area AA may be adjusted along the Y direction.

Fourth Modification of Third Embodiment

FIG. 35 depicts a flowchart showing an example of an adjustment operation of a distance measuring device 3D according to a fourth modification of the third embodiment. As shown in FIG. 35, the distance measuring device 3D according to the fourth modification of the third embodiment periodically performs an adjustment operation when, for example, continuous scanning (measurement operation) is performed (Start).

When the adjustment operation is started, the controller 10 calculates a distribution of velocities of each of the light detectors 33A and 33B at each measurement point (S90). Then, the controller 10 confirms a correlation of the calculated velocity distributions (S91). In the process of S91, for example, the velocity distribution of an object detected by pixels PX that pass through the center in the active area AA and are aligned in the X direction is confirmed. Then, the controller 10 confirms a correlation between the velocity distribution of pixels PX in the light detector 33A and the velocity distribution of pixels PX in the light detector 33B.

If the correlation of the velocity distributions of the light detectors 33A and 33B is greater than a predetermined value (S92, NO), the distance measuring device 3D finishes the adjustment operation (End). On the other hand, if the correlation of the velocity distributions of the light detectors 33A and 33B is equal to or less than the predetermined value (S92, YES), the controller 10 adjusts a position of an active area AA of the light detector 33B to be set in subsequent scanning so as to increase the correlation of the velocity distributions between the light detectors 33A and 33B (S93). If the process of S93 is completed, the distance measuring device 3D finishes the adjustment operation (End).

FIG. 36 depicts a schematic diagram showing a specific example of the adjustment operation of the distance measuring device 3D according to the fourth modification of the third embodiment. FIG. 36 shows a schematic diagram of the light detectors 33A and 33B, and an example of velocity distribution based on a ranging result of each active area AA.

As shown in FIG. 36, in the fourth modification of the third embodiment, the controller 10 calculates the velocity distribution in the active area AA, for example, along the X direction. In this example, a velocity distribution in the active area AA of the light detector 33A has a peak in the pixel PX2, and a velocity distribution in the active area AA of the light detector 33B has a peak in the pixel PX3. In this case, the controller 10 slides the active area AA of the light detector 33B toward the pixel PX1 side when scanning the next frame.

Thereby, the distance measuring device 3D according to the fourth modification of the third embodiment can receive the reflected light L2 near the center of the active area AA, and improve the light-receiving accuracy of the reflected light L2. That is, the distance measuring device 3D can improve reliability of a ranging result. In the fourth modification of the third embodiment, various functions can be used to calculate a correlation of the velocity distributions. In the fourth modification of the third embodiment, a correlation of velocity distributions along the Y direction may be confirmed, and the position of the active area AA may be adjusted along the Y direction.

In the distance measuring device 3, a change in position of the active area AA based on scanning of the outgoing light L1 is programmed as a function of time (e.g., linear or sine wave). The adjustment operation described in the third embodiment and each modification of the third embodiment relates to the fine adjustment of the active area AA. In the distance measuring device 3, since the FoV differs among a plurality of light detection units PU1 and PU2, the light-receiving position of the reflected light L2 may deviate from the light-receiving area DA. In this case, the distance measuring device 3 may stop the adjustment operation (adjustment function of the active area AA).

[4] Fourth Embodiment

A distance measuring device 4 according to a fourth embodiment relates to a configuration example of the mirror 25 in the distance measuring device 1 according to the first embodiment. In the following, points different from the distance measuring device 1 according to the first embodiment will be described regarding the distance measuring device 4 according to the fourth embodiment.

[4-1] Configuration of Mirror 25

Figure 37:
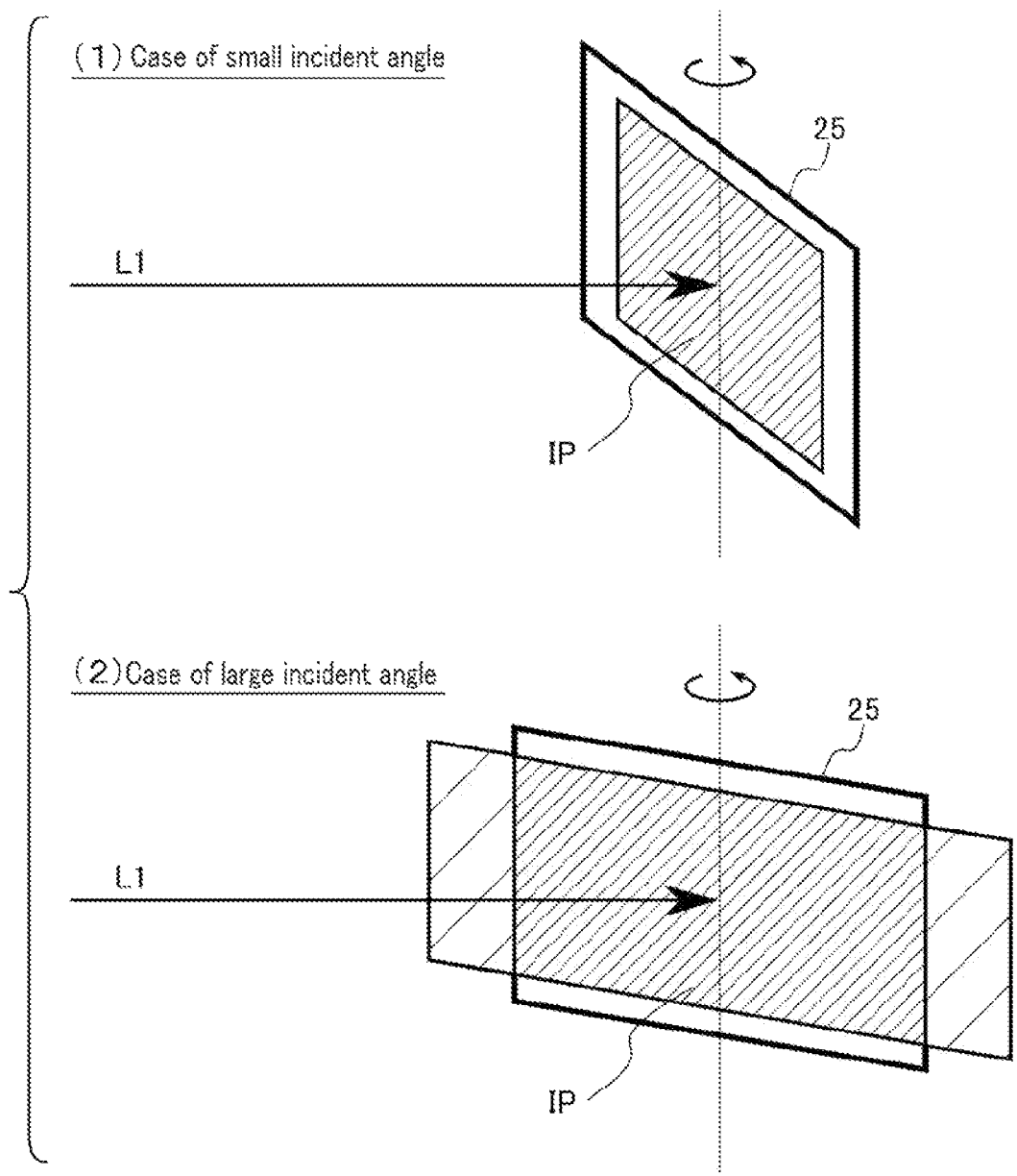
FIG. 37 depicts a schematic diagram showing an example of a configuration of a mirror in a distance measuring device according to a fourth embodiment.

FIG. 37 depicts a schematic diagram showing an example of a configuration of the mirror 25 in the distance measuring device 4 according to the fourth embodiment. FIGS. 37 (1) and 37 (2) show states in which incident angles of laser light on the mirror 25 are different from each other. The mirror 25 according to the fourth embodiment has a configuration in which a part of the outgoing light L1 is not reflected according to the incident angle of the laser light (outgoing light L1).

FIG. 37 (1) corresponds to a case where the incident angle of the laser light with respect to the mirror 25 is small. As shown in FIG. 37 (1), when the incident angle of the outgoing light L1 with respect to the mirror 25 is small, an entire irradiation portion IP of the outgoing light L1 is included in a reflection range of the mirror 25. In this case, the mirror 25 reflects the outgoing light L1 in a predetermined direction while minimizing a loss of light energy.

FIG. 37 (2) corresponds to a case where the incident angle of the laser light with respect to the mirror 25 is larger than that of FIG. 37 (1). On the other hand, as shown in FIG. 37 (2), when the incident angle of the outgoing light L1 with respect to the mirror 25 is large, a part of the irradiation portion IP of the outgoing light L1 is out of the reflection range of the mirror 25. In this case, the mirror 25 reflects the outgoing light L1 in a predetermined direction in a state where a part of the light energy is lost.

Then, in the distance measuring device 4 according to the fourth embodiment, the state in which the incident angle of the outgoing light L1 with respect to the mirror 25 is small is associated with ranging of a target object TG on the telephoto side. The state in which the incident angle of the outgoing light L1 with respect to the mirror 25 is large is associated with ranging of a target object TG on the wide-angle side. That is, in the ranging of the target object TG on the telephoto side, the loss of light energy of the outgoing light L1 is suppressed. In the ranging of the target object TG on the wide-angle side, a part of the light energy of the outgoing light L1 is lost. The other configurations and operations of the distance measuring device 4 according to the fourth embodiment are the same as those of the distance measuring device 1 according to the first embodiment.

[4-2] Effect of Fourth Embodiment

Light energy of the outgoing light L1 required for ranging of a target object TG changes according to the distance. For example, as the distance from the target object TG increases, the light energy of the outgoing light L1 decreases. Thus, in order to increase the measurable distance, it is preferable that output of the outgoing light L1 by the emission section 20 be designed to be as large as possible.

Further, when the distance measuring device is mounted on a vehicle, the scanning area SA includes a telephoto side area that requires long-distance ranging and a wide-angle side area that can be sufficiently ranged by short-distance ranging. Scanning corresponding to the telephoto side area uses, for example, a state in which the incident angle of the outgoing light L1 with respect to the mirror 25 is small. Scanning corresponding to the wide-angle side area uses, for example, a state in which the incident angle of the outgoing light L1 with respect to the mirror 25 is large.

In contrast, the distance measuring device 4 according to the fourth embodiment includes the mirror 25 having a small area. The size of the mirror 25 in the fourth embodiment is designed in accordance with a range of a reflecting surface of the mirror 25 to which the outgoing light L1 at the time of ranging on the telephoto side is applied. Specifically, the reflecting surface of the mirror 25 in the fourth embodiment is designed to include the entire irradiation surface of the outgoing light L1 at the time of ranging on the telephoto side. On the other hand, in the mirror 25 of the fourth embodiment, a part of the irradiation surface of the outgoing light L1 may protrude from the reflecting surface of the mirror 25 depending on the incident angle of the outgoing light L1.

In the distance measuring device 4 according to the fourth embodiment, a loss of the outgoing light L1 due to the reflection of the mirror 25 is suppressed during the ranging on the telephoto side, and long-distance ranging becomes possible. On the other hand, at the time of ranging on the wide-angle side, a part of the outgoing light L1 is not applied to the mirror 25, and a loss of light energy of the outgoing light L1 occurs. However, since a distance necessary to be measured on the wide-angle side is shorter than that on the telephoto side, the energy of the outgoing light L1 required for ranging is smaller than that on the telephoto side. Thus, the distance measuring device 4 can measure a short-distance target object TG on the wide-angle side without any problem even if the outgoing light L1 is lost.

In addition, the distance measuring device 4 according to the fourth embodiment uses the incident angle with respect to the mirror 25 in a wide range. Thus, the distance measuring device 4 according to the fourth embodiment can reduce a blanking period accompanied with rotation of the mirror 25. The controller 10 may control the mirror 25 so that the scanning speed at the time of ranging on the telephoto side is slower than that at the time of ranging on the wide-angle side. Thereby, the distance measuring device 4 can improve an angle resolution at the time of ranging on the telephoto side, and improve reliability of a ranging result in the distance measuring device 4.

[5] Fifth Embodiment

A distance measuring device 5 according to a fifth embodiment has the same configuration as that of the distance measuring device 1 according to the first embodiment. Then, the distance measuring device 5 according to the fifth embodiment uses a scanning method that is different from that of the first embodiment. In the following, points different from the distance measuring device 1 according to the first embodiment will be described regarding the distance measuring device 5 according to the fifth embodiment.

[5-1] Operation of Emission Section 20

Figure 38:
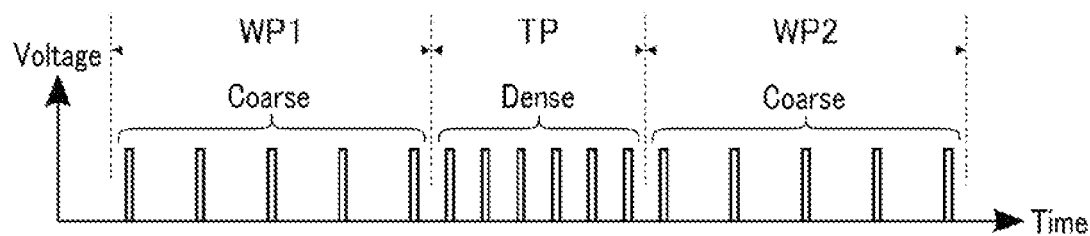
FIG. 38 depicts a time chart showing an example of a scanning method of an emission section in a distance measuring device according to a fifth embodiment.

FIG. 38 depicts a time chart showing an example of a scanning method of an emission section 20 in the distance measuring device 5 according to the fifth embodiment. In FIG. 38, an ordinate axis of the chart indicates output power with respect to the light source 23. A set of a wide angle portion WP1, a telephoto portion TP, and a wide angle portion WP2 is included in a single scanning area from a left end to a right end of a scanning area SA.

In this example, the FoV of the light detection unit PU1 on the telephoto side is designed according to the telephoto portion TP, and a focal distance of the light detection unit PU1 is optimized for long-distance ranging. The FoV of the light detection unit PU2 on the wide-angle side is designed according to the wide angle portion WP1, the telephoto portion TP, and the wide angle portion WP2, and a focal distance of the light detection unit PU2 is optimized for short-distance ranging.

As shown in FIG. 38, the controller 10 intermittently inputs pulse signals to the light source 23 at wide intervals during two periods respectively corresponding to the wide angle portions WP1 and WP2. On the other hand, the controller 10 intermittently inputs pulse signals to the light source 23 at narrow intervals during a period corresponding to the telephoto portion TP. That is, the emission interval of the outgoing light L1 is coarse in the wide angle portions WP1 and WP2, and dense in the telephoto portion TP. As described above, the distance measuring device 5 according to the fifth embodiment changes the emission interval of the outgoing light L1 according to the scanning position (scanning angle).

[5-2] Effect of Fifth Embodiment

In a distance measuring device using a non-coaxial optical system and a 2D sensor, overlapping of a ranging period for each outgoing light L1 is allowed. Accordingly, the distance measuring device 5 according to the fifth embodiment realizes a required ranging resolution for each scanning position by changing the emission interval of the outgoing light L1.

For example, when the distance measuring device 1 is mounted on a vehicle, it is preferable that a target object TG in front is detected in a narrow range and with a high resolution. On the other hand, in a scanning area SA, a lower resolution than that in front may be sufficient in an area off the road surface. Further, the number of beams of outgoing light L1 per unit time that can be processed by the measurement operation has a constraint on an upper limit value such as a duty of a laser.

Accordingly, the distance measuring device 5 according to the fifth embodiment sets the number of beams of outgoing light L1 in the telephoto portion TP to be larger than that of the outgoing light L1 in the wide angle portions WP1 and WP2. In this way, by increasing the number of beams of outgoing light L1 in the telephoto portion TP, the distance measuring device 5 can reduce an angle resolution in the telephoto portion TP. In addition, by increasing the pulse interval in the wide angle portions WP1 and WP2, the distance measuring device 5 can improve the angle resolution of the telephoto portion TP while keeping the constraint on the number of beams of outgoing light L1 to be processed.

Further, in the telephoto portion TP, by results of a plurality of emissions being averaged, an S/N ratio can be improved, and the distance that can be ranged and distance accuracy can be improved. Furthermore, the distance measuring device 5 can improve the distance that can be ranged without reducing the resolution when the averaging algorithm (SAT: Smart Accumulation Technique) described in the second embodiment is used.

[5-3] Modification of Fifth Embodiment

The distance measuring device 5 according to the fifth embodiment can be modified in various ways. In the following, points different from the fifth embodiment will be described regarding a modification of the fifth embodiment.

Figure 39:
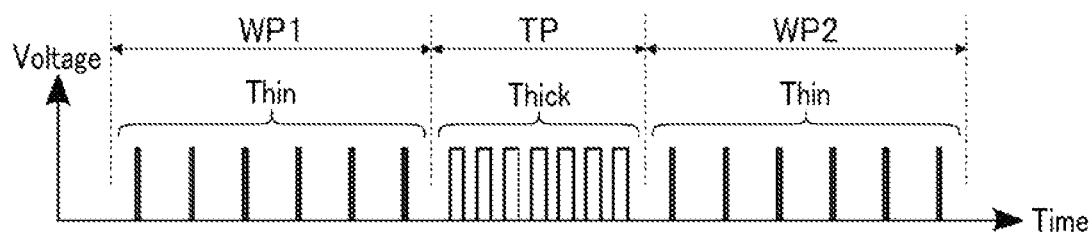
FIG. 39 depicts a schematic diagram showing an example of a scanning method of an emission section in a distance measuring device according to a modification of the fifth embodiment.

FIG. 39 depicts a schematic diagram showing an example of a scanning method of an emission section 20 in a distance measuring device 5A according to the modification of the fifth embodiment. As shown in FIG. 39, the distance measuring device 5A according to the modification of the fifth embodiment sets a pulse width in the wide angle portions WP1 and WP2 to be narrower than a pulse width in the telephoto portion TP. As a pulse width of the outgoing light L1 becomes larger, energy of the outgoing light L1 increases. Thus, the outgoing light L1 based on a large pulse width is preferable for ranging of a long-distance target object TG. On the other hand, when the pulse width of the outgoing light L1 is large, a temporal jitter in ranging becomes large. In addition, a light reception result of the light detector 33 tends to be saturated.

Thus, the distance measuring device 5A according to the modification of the fifth embodiment makes light energy of the outgoing light L1 in the wide angle portions WP1 and WP2 smaller than light energy of the outgoing light L1 in the telephoto portion TP. Thereby, the distance measuring device 5A according to the modification of the fifth embodiment can reduce the jitter in short-distance ranging in ranging of a target object TG on the wide-angle side, and improve short-distance measurement accuracy. Further, the distance measuring device 5A can suppress the saturation of the light reception result, and in that respect as well, can improve the distance accuracy.

[6] Configuration Example of Light Detection Unit PU

The configuration of the light detection unit PU described in the first embodiment may be other configurations. In the following, other configuration examples of the light detection unit PU will be described.

For example, the BPFs 31A and 31B may have different characteristics in order to optimize the frequency of the reflected light L2 incident on the light detectors 33A and 33B. For example, the respective frequency bands of the BPFs 31A and 31B may be designed to be high or low based on an operating temperature of the distance measuring device 1. Thereby, the distance measuring device 1 can have a strong resistance to temperature change. In addition, the respective frequency bands of the BPFs 31A and 31B may be designed to be wide or narrow in order to expand the dynamic range. Thereby, saturation of light reception results of the light detectors 33A and 33B can be suppressed.

The size and shape of the light detector 33A and those of the light detector 33B may be different. In other words, the size and shape of a sensor used in the light detection unit PU1 and those of a sensor used in the light detection unit PU2 may be different. The distance measuring device 1 can optimize a resolution of a ranging result by the light detection unit PU1 and a resolution of a ranging result by the light detection unit PU2 by using sensors in different sizes between the light detection units PU1 and PU2.

In the following, points different from the light detection unit PU described in the first embodiment will be described with reference to the drawings regarding first to seventh configuration examples of the light detection unit PU.

First Configuration Example

Figure 40:
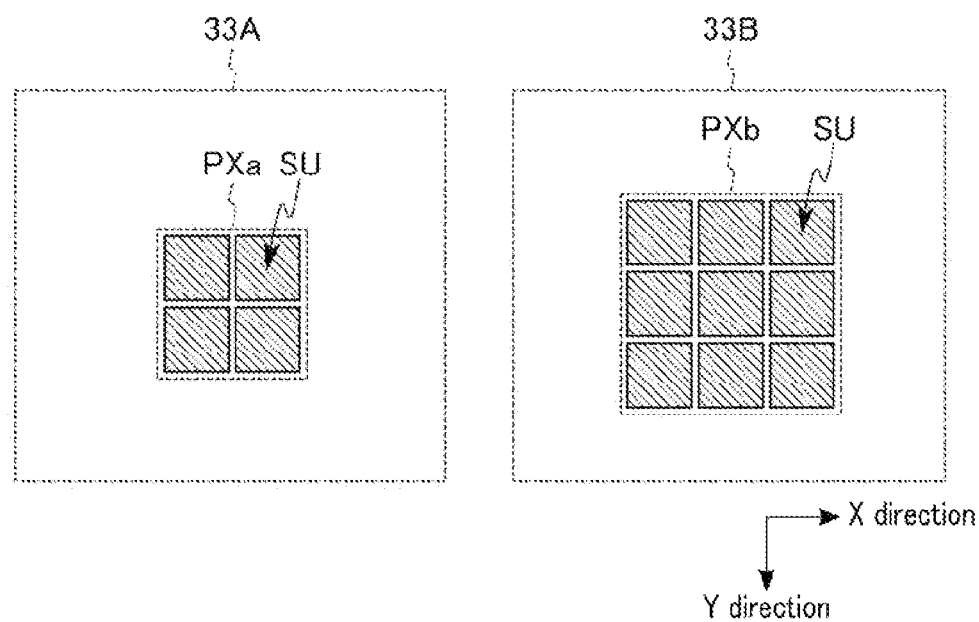
FIG. 40 depicts a plan view showing an example of configurations of pixels of two light detectors in a first configuration example of a light detection unit.

FIG. 40 depicts a plan view showing an example of configurations of pixels PX of two light detectors 33A and 33B in a first configuration example of the light detection unit PU. As shown in FIG. 40, the light detector 33A includes a pixel PXa including four SPAD units SU. The light detector 33B includes a pixel PXa including nine SPAD units SU.

As described above, the size of one pixel PX included in the light detector 33A and that of one pixel PX included in the light detector 33B may be different. In other words, the number of SPAD units SU included in a pixel PX in the light detector 33A and the number of SPAD units SU included in a pixel PX in the light detector 33B may be different. The number of SPAD units SU included in the pixel PXa and the number of SPAD units SU included in a pixel PXb can be appropriately designed according to the designs of the optical systems 32A and 32B, respectively.

For example, when the distance measuring device 1 is mounted on a vehicle, it is preferable that ranging of a short-distance target object TG be more accurate than ranging of a long-distance target object TG. In this case, the number of SPAD units SU included in the pixel PXb is designed to be larger than that of SPAD units SU included in the pixel PXa. Thus, the dynamic range of the light detector 33B on the wide-angle side becomes wider than the dynamic range of the light detector 33A on the telephoto side. As a result, the first configuration example of the light detection unit PU can suppress saturation of a light reception result when receiving the reflected light L2 from a short-distance target object TG, and improve measurement accuracy at a short distance.

Second Configuration Example

Figure 41:
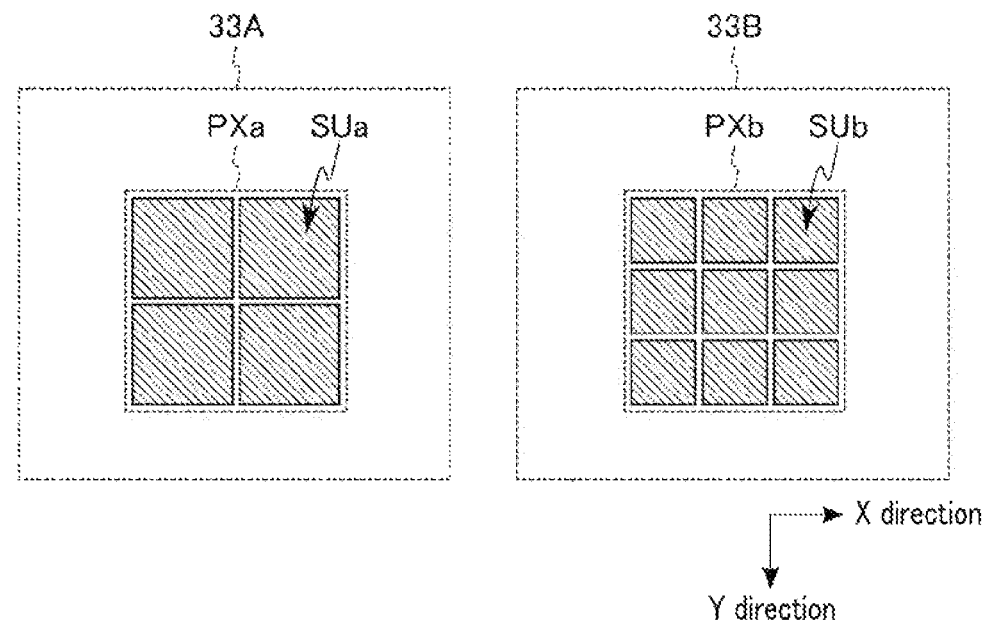
FIG. 41 depicts a plan view showing an example of configurations of pixels of two light detectors in a second configuration example of the light detection unit.

FIG. 41 depicts a plan view showing an example of configurations of pixels PX of two light detectors 33A and 33B in a second configuration example of the light detection unit PU. As shown in FIG. 41, a pixel PXa includes four SPAD units SUa, and a pixel PXb includes nine SPAD units SUb. A total area of a set of four SPAD units SUa is approximately equal to that of a set of four SPAD units SUb. That is, the size of a SPAD unit SUa is larger than that of a SPAD unit SUb. In this example, the dynamic range of the light detector 33B is higher than the dynamic range of the light detector 33A. On the other hand, sensitivity (PDE: Photon Detection Efficiency) of the light detector 33A is slightly higher than sensitivity (PDE) of the light detector 33B.

As described above, the size of one SPAD included in the light detector 33A and the size of one SPAD included in the light detector 33B may be different. In other words, the size of the SPAD unit SUa included in the pixel PXa in the light detector 33A and the size of the SPAD unit SUb included in the pixel PXb in the light detector 33B may be different. The pixel PXa of the light detector 33A and the pixel PXb may be the same or different in size. The size of the SPAD unit SUa and the size of the SPAD unit SUb can be appropriately designed according to the designs of the optical systems 32A and 32B, respectively.

The second configuration example of the light detection unit PU can optimize the dynamic range for each light detector 33 in the same manner as in the first configuration example. As a result, the second configuration example of the light detection unit PU can suppress saturation of a light reception result when receiving the reflected light L2 from a short-distance target object TG, and improve measurement accuracy at a short distance. On the other hand, the second configuration example of the light detection unit PU has high sensitivity so that ranging at a longer distance also becomes possible at the same time.

Third Configuration Example

Figure 42:
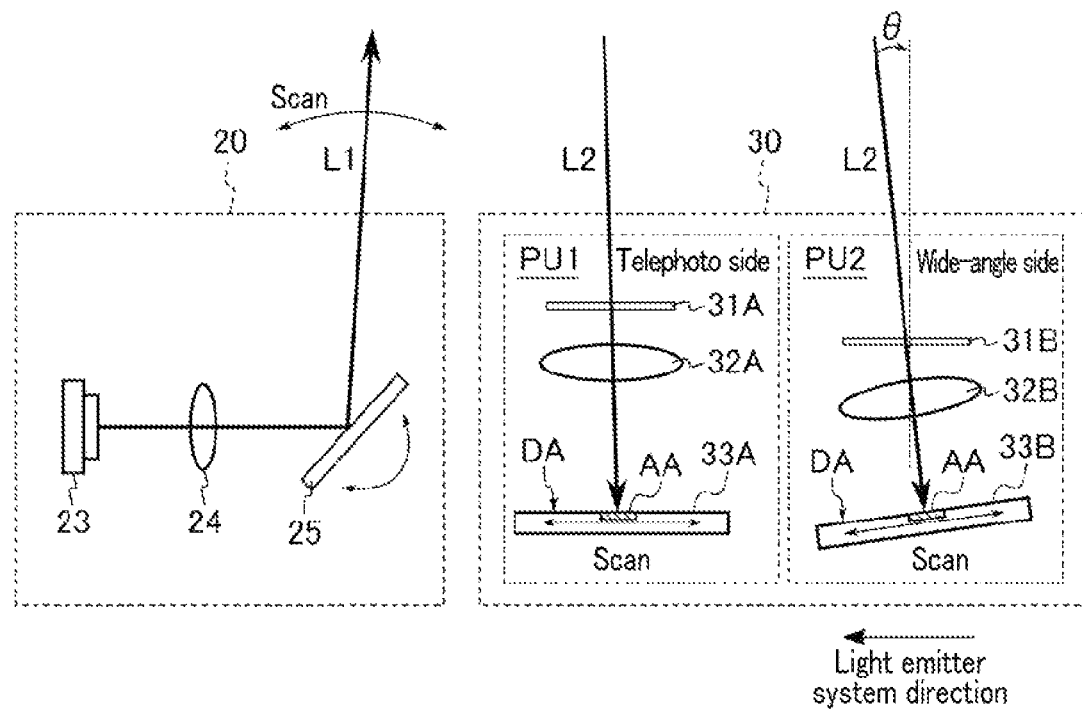
FIG. 42 depicts a schematic diagram showing an example of configurations of two light detection units in a third configuration example of the light detection unit.

FIG. 42 depicts a schematic diagram showing an example of configurations of two light detection units PU1 and PU2 in a third configuration example of the light detection unit PU. As shown in FIG. 42, an optical axis of the light detection unit PU2 on the wide-angle side is provided to be tilted by an angle "e" in a light emitter system direction with respect to an optical axis of the light detection unit PU1 on the telephoto side. The light emitter system direction corresponds to a direction from the light receiver 30 to the emission section 20. A parallax based on a non-coaxial optical system decreases with an inclination of "e" for a short-distance target.

As described above, the inclination of the optical axis of the light detection unit PU1 and the inclination of the optical axis of the light detection unit PU2 may be different. In the third configuration example of the light detection unit PU, the parallax can be mitigated by the inclination of the optical axis. As a result, the third configuration example of the light detection unit PU can improve detection probability and measurement accuracy of a short-distance target object TG.

Fourth Configuration Example

Figure 43:
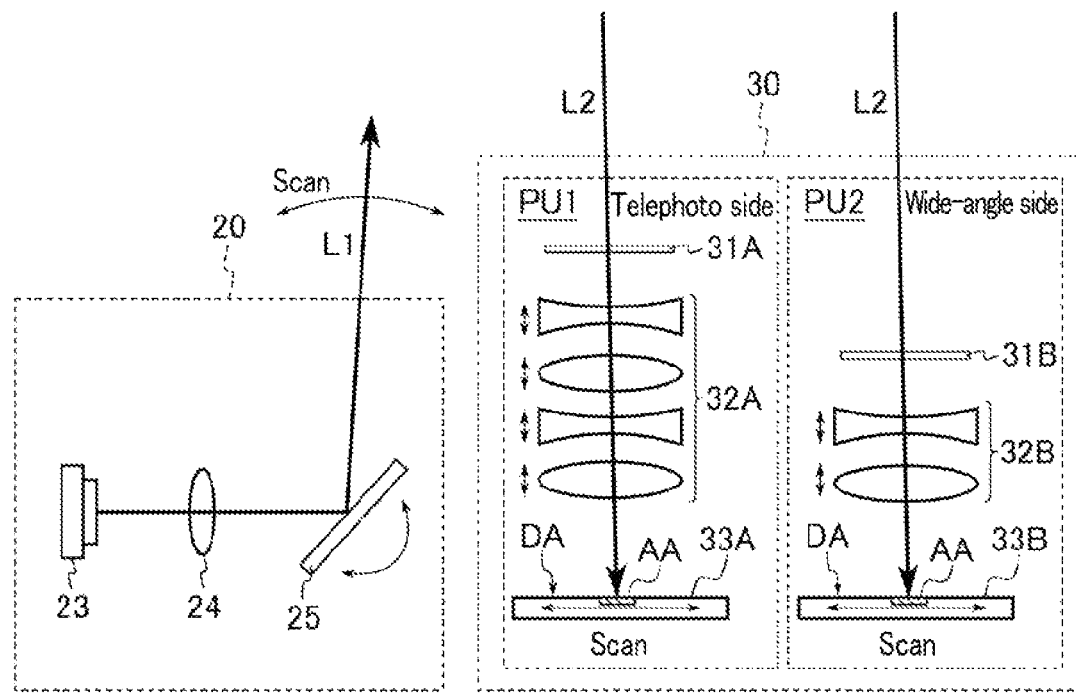
FIG. 43 depicts a schematic diagram showing an example of configurations of two light detection units in a fourth configuration example of the light detection unit.

FIG. 43 depicts a schematic diagram showing an example of configurations of two light detection units PU1 and PU2 in a fourth configuration example of the light detection unit PU. As shown in FIG. 43, the optical system 32A of the light detection unit PU1 on the telephoto side includes four movable lenses. The optical system 32B of the light detection unit PU2 on the wide-angle side includes two movable lenses.

As described above, each of the light detection units PU1 and PU2 may be provided with an optical zoom. The number of lenses provided in each of the optical systems 32A and 32B may be other numbers. In each optical system 32, a plurality of types of lenses such as a concave lens and a convex lens may be combined. The light detection unit PU in which the focal distance is set to be long can increase the distance that can be ranged. The light detection unit PU in which the focal distance is set to be short can reduce the parallax. The optical zoom of each of the light detection units PU1 and PU2 can be controlled according to the situation.

For example, when the distance measuring device 1 is mounted on a vehicle, the controller 10 can improve detection accuracy of a vehicle in front (target object TG) by setting the focal distance to become longer and the FoV to become narrower as the speed of the vehicle increases. Further, the controller 10 can improve detection accuracy of a person, etc. near the vehicle by setting the focal distance to become shorter and the FoV to become wider as the speed of the vehicle decreases. As described above, in the fourth configuration example of the light detection unit PU, an optimum focal distance can be set for each scene so that the reliability of the distance measuring device 1 can be improved.

Fifth Configuration Example

Figure 44:
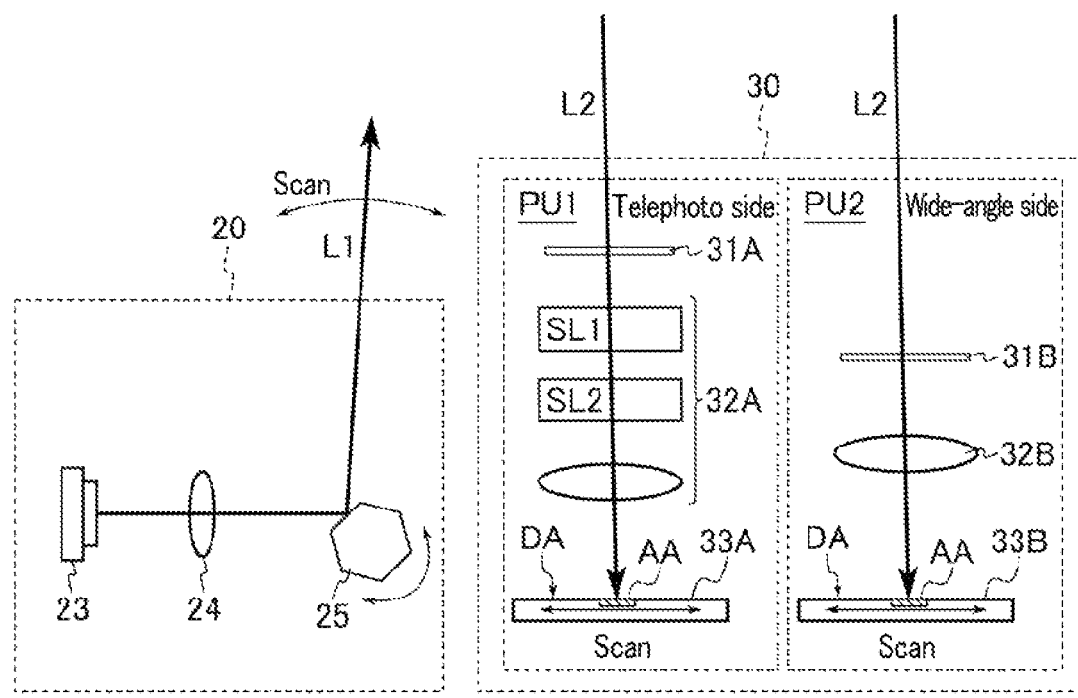
FIG. 44 depicts a schematic diagram showing an example of configurations of two light detection units in a fifth configuration example of the light detection unit.

FIG. 44 depicts a schematic diagram showing an example of configurations of two light detection units PU1 and PU2 in a fifth configuration example of the light detection unit PU. As shown in FIG. 44, the optical system 32A of the light detection unit PU1 includes cylindrical lenses SL1 and SL2. In addition, the mirror 25 of the emission section 20 is a polygon mirror with a tilt, where two-dimensional scanning is assumed. In this way, anisotropy of the lens may be changed for each light detection unit PU.

For example, it is assumed that the horizontal field of view angle (FoV in the X direction) of the light detection unit PU1 on the telephoto side is ⅙ of the horizontal field of view angle of the light detection unit PU2 on the wide-angle side, and the light detectors 33A and 33B are the same in size in the X direction. Under this assumption, when isotropic optical systems 32A and 32B are used, the sensor size on the vertical side (sensor size in the Y direction) of the light detector 33A of the light detection unit PU1 on the telephoto side is 6 times the sensor size on the vertical side of the light detector 33B of the light detection unit PU2 on the wide-angle side.

In contrast, in the fifth configuration example of the light detection unit PU, the optical system 32A includes the cylindrical lenses SL1 and SL2 so as to form an image in a vertically narrow size. The cylindrical lenses SL1 and SL2 have a concave shape and a convex shape, respectively. Thereby, the FoV in the vertical direction (e.g., the Y direction) of the sensor is adjusted to be the same between the light detection units PU1 and PU2. As a result, in the fifth configuration example of the light detection unit PU, the sensor size of the light detector 33B can be reduced. That is, in the fifth configuration example of the light detection unit PU, the sizes of the light detectors 33A and 33B can be optimized.

Incidentally, the problem of the FoV in the vertical direction or the sensor size described here is also dealt with by the scanning method of a multichannel raster in which a plurality of channels of laser diodes are vertically arranged as described in the first modification of the first embodiment. The fifth configuration example is a solution to the above-described problem, which is different from the first modification of the first embodiment. These two methods may be combined, and the FoV on the telephoto side and the wide-angle side may be further significantly changed.

Sixth Configuration Example

Each of FIG. 45 and FIG. 46 depicts a schematic diagram showing an example of configurations of two light detection units PU1 and PU2 in a sixth configuration example of the light detection unit PU. As shown in FIG. 45, the optical systems 32A and 32B include a lens provided integrally between the light detection units PU1 and PU2. Such a lens is made of, for example, plastic. Then, a light-shielding portion is provided between the light detectors 33A and 33B. The light-shielding portion suppresses incidence of light between the light detection units PU1 and PU2. Thus, the sixth configuration example of the light detection unit PU can suppress the cost of the light receiver 30.

As shown in FIG. 46, the sixth configuration example and the fifth configuration example of the light detection unit PU may be combined. In other words, in the sixth configuration example of the light detection unit PU, either one of the light detection units PU1 and PU2 may include an anisotropic optical system. In this example, the cylindrical lenses SL1 (e.g., a convex shape) and SL2 (e.g., a concave shape) are added to the optical system 32B of the light detection unit PU2 on the wide-angle side. As a result, the combination of the sixth configuration example and the fifth configuration example of the light detection unit PU can optimize the sizes of the light detectors 33A and 33B.

[7] Others

In the above-described embodiments, the case where the controller 10 notifies the measurement section 40 of the emission time T1 of the outgoing light L1 is exemplified, but the present invention is not limited thereto. The outgoing light L1 may be dispersed within the emission section 20, and the emission time T1 may be set based on a time at which the dispersed outgoing light L1 is detected by the sensor provided in the light receiver 30. In this case, the emission time T1 is reported from the light receiver 30 to the measurement section 40.

The above-described embodiments and modifications can be combined. For example, the second embodiment can be combined with any one of the third to fifth embodiments. The third embodiment can be combined with any one of the fourth and fifth embodiments. Furthermore, three or more embodiments may be combined together. The distance measuring device 1 in which a plurality of embodiments are combined can obtain the effect of each of the combined embodiments.

In the first embodiment, the light receiver 30 may include three or more light detection units PU that are optimized for distances different from one another. In the case where the light receiver 30 includes three or more light detection units PU, for example, the first light detection unit PU is optimized for a long distance, the second light detection unit PU is optimized for a short distance, and the third light detection unit PU is optimized for an extremely short distance. Thereby, the distance measuring device 1 can improve measurement accuracy of an extremely short distance to a short distance where a parallax and a defocus are likely to occur. Also in the case of including three or more light detection units PU, the distance measuring device 1 can be combined with each of the second to fifth embodiments and the configuration examples of the light detection unit PU.

The category of each configuration of the distance measuring device 1 may be other categories. The measurement section 40 may be other categories as long as it can realize the operations described in the above-described embodiments. The CPU included in the controller 10 may be other circuits. For example, in place of the CPU, for example, an MPU (Micro Processing Unit), etc. may be used. In addition, each of the processes described in each embodiment may be realized by dedicated hardware. Processes executed by software and processes executed by hardware may be mixed, or either one of them may exist. In each embodiment, in the flowchart used for describing the operations, the order of processes may be interchanged as far as possible, and other processes may be added.

In the present specification, the "active area AA" may also be referred to as a light-receiving area. The outgoing light L1 emitted by the light source 23 into which a pulse signal is input based on control of the controller 10 may also be referred to as a pulse signal. A "pulse width" is, for example, calculated by a half-value width of a target pulse signal. The "emission section 20" may also be referred to as a "light emitter".

In the present specification, a "light reception result of the light detector 33" may also be referred to as a digital signal including a light reception result of the reflected light L2. A "bottom portion of a digital signal" indicates floor noise included in the digital signal. A "value of a bottom portion" is, for example, a time average value of luminance at a single measurement time. The "single measurement time" corresponds to a single sampling period. A "value of a portion protruding from a bottom portion" indicates, for example, luminance of a protruding portion corresponding to a light reception result of the reflected light L2 of a digital signal including the light reception result of the reflected light L2. A "peak of a signal" indicates a portion with the highest luminance in a protruding portion from a bottom portion of a digital signal including a light reception result.

In the present specification, a level "H" voltage is a voltage at which an N-type transistor enters an ON state when said voltage is applied to its gate, and a P-type transistor enters an OFF state when said voltage is applied to its gate. A level "L" voltage is a voltage at which an N-type transistor enters an OFF state when said voltage is applied to its gate, and a P-type transistor enters an ON state when said voltage is applied to its gate.

In the present specification, the term "couple/connect" refers to electrical coupling, and does not exclude intervention of, for example, another element. In the present specification, an "ON state" refers to a state in which the gate of a relevant transistor has a voltage equal to or greater than a threshold voltage of the transistor being applied. An "OFF state" refers to a state in which the gate of a relevant transistor has a voltage below a threshold voltage of the transistor being applied, and does not exclude, for example, a state in which a minute electric current such as a leakage current of the transistor flows.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A distance measuring device comprising:
   a light emitter including a light source and a mirror, wherein when the light source emits an optical signal, and the mirror reflects the optical signal;
   a first light receiver including a first sensor and a first optical system, wherein the first sensor includes a plurality of first pixels arranged two-dimensionally on a first substrate, and the first optical system is configured to guide a reflected light of the optical signal emitted from the light emitter to the first sensor;
   a second light receiver including a second sensor and a second optical system, wherein the second sensor includes a plurality of second pixels arranged two-dimensionally on a second substrate different from the first substrate, and the second optical system is configured to guide the reflected light to the second sensor;
   a measurement section configured to calculate a first distance value and a second distance value, wherein the first distance value is calculated using a first time and a second time, and the second distance value is calculated using the first time and a third time, and wherein the first time is a time at which the light source emits the optical signal, the second time is a time at which the first sensor detects the reflected light, and the third time is a time at which the second sensor detects the reflected light; and
   a controller configured to cause the light source to emit the optical signal intermittently, wherein the controller is configured to control the mirror to perform scanning using the optical signal, set a first light-receiving area in which at least one first pixel among the first pixels is selectively turned on in the first sensor, set a second light-receiving area in which at least one second pixel among the second pixels is selectively turned on in the second sensor, and determine a position of the first light-receiving area and a position of the second light-receiving area according to a state of the mirror when the optical signal is emitted.

2. The distance measuring device of claim 1, wherein a focal distance of the first optical system is longer than a focal distance of the second optical system.

3. The distance measuring device of claim 2, wherein an aperture value of the first optical system is smaller than an aperture value of the second optical system.

4. The distance measuring device of claim 2, wherein when both of the first distance value and the second distance value exceed a first threshold value, the measurement section is configured to output the first distance value as a ranging result associated with the optical signal.

5. The distance measuring device of claim 2, wherein when both of the first distance value and the second distance value fall below a second threshold value, the measurement section is configured to output the second distance value as a ranging result associated with the optical signal.

6. The distance measuring device of claim 2, wherein the measurement section is configured to set the first distance value as the second distance value when the reflected light is not detected by the first sensor and is detected by the second sensor.

7. The distance measuring device of claim 2, wherein when the mirror is in a first state, an entire irradiation surface of the optical signal emitted from the light source is included in a reflecting surface of the mirror, and
when the mirror is in a second state, a part of the irradiation surface of the optical signal emitted from the light source deviates from the mirror.

8. The distance measuring device of claim 2, wherein in the scanning, the intermittently emitted optical signals include a first optical signal and a second optical signal, and an emission position of the second optical signal is adjacent to an emission position of the first optical signal, and
the measurement section is configured to:
   calculate a third distance value based on a result of detecting a first reflected light of the first optical signal by the first sensor, and calculate a fourth distance value based on a result of detecting the first reflected light by the second sensor;

calculate a fifth distance value based on a result of detecting a second reflected light of the second optical signal by the first sensor, and calculate a sixth distance value based on a result of detecting the second reflected light by the second sensor;

calculate first reliability of the third distance value based on a difference between the fifth distance value and the third distance value;

calculate second reliability of the fourth distance value based on a difference between the sixth distance value and the fourth distance value; and determine reliability of a distance value corresponding to the first optical signal based on the first reliability and the second reliability.

9. The distance measuring device of claim 8, wherein the measurement section is configured to calculate reliability of the distance value corresponding to the first optical signal when the third distance value and the fourth distance value are equal.

10. The distance measuring device of claim 8, wherein the measurement section is configured to subtract the first reliability when each of the third distance value and the fourth distance value falls below a third threshold value.

11. The distance measuring device of claim 1, wherein the controller is configured to, based on a light reception result of each of the first sensor and the second sensor obtained by the scanning, change a scanning position in subsequent scanning.

12. The distance measuring device of claim 1, wherein the controller is configured to, based on a light reception result of each of the first sensor and the second sensor obtained by the scanning, change a position of each of the first light-receiving area and the second light-receiving area in subsequent scanning.

13. The distance measuring device of claim 12, wherein the controller is configured to compare a plurality of distance data calculated based on an output of each of a plurality of second pixels included in the second light-receiving area and the first distance value, and the controller is configured to perform the change so that a position of a second pixel associated with distance data having a numerical value that is the same as the first distance value among the plurality of distance data becomes closer to a center of the second light-receiving area.

14. The distance measuring device of claim 12, wherein the controller is configured to compare a first light amount distribution and a second light amount distribution, and perform the change so as to increase a correlation between the first light amount distribution and the second light amount distribution, the first light amount distribution is calculated based on an output of each of a plurality of first pixels included in the first light-receiving area, and the second light amount distribution is calculated based on an output of each of a plurality of second pixels included in the second light-receiving area.

15. The distance measuring device of claim 12, wherein the controller is configured to compare a first velocity distribution and a second velocity distribution, and perform the change so as to increase a correlation between the first velocity distribution and the second velocity distribution, the first velocity distribution is calculated based on an output of each of a plurality of first pixels included in the first light-receiving area, and the second velocity distribution is calculated based on an output of each of a plurality of second pixels included in the second light-receiving area.

16. The distance measuring device of claim 1, wherein a path of the scanning includes a telephoto portion, a first wide angle portion, and a second wide angle portion, the first wide angle portion and the second wide angle portion sandwich the telephoto portion, the telephoto portion is included in a field of view angle of the first light receiver, the telephoto portion, the first wide angle portion, and the second wide angle portion are included in a field of view angle of the second light receiver, and an interval at which the optical signal is emitted in scanning of the telephoto portion is shorter than each of an interval at which the optical signal is emitted in scanning of the first wide angle portion and an interval at which the optical signal is emitted in scanning of the second wide angle portion.

17. The distance measuring device of claim 1, wherein a path of the scanning includes a telephoto portion, a first wide angle portion, and a second wide angle portion, the first wide angle portion and the second wide angle portion sandwich the telephoto portion, the telephoto portion is included in a field of view angle of the first light receiver, the telephoto portion, the first wide angle portion, and the second wide angle portion are included in a field of view angle of the second light receiver, and each of a pulse width of the optical signal in scanning of the first wide angle portion and a pulse width of the optical signal in scanning of the second wide angle portion is shorter than a pulse width of the optical signal in scanning of the telephoto portion.

18. The distance measuring device of claim 1, wherein a size of the first pixel is smaller than a size of the second pixel.

19. The distance measuring device of claim 1, wherein the first pixel includes at least one first avalanche photodiode, the second pixel includes at least one second avalanche photodiode, and a size of the second avalanche photodiode is smaller than a size of the first avalanche photodiode.

20. The distance measuring device of claim 1, wherein the light source includes a plurality of laser diodes aligned in a first direction, the laser diodes include at least one first laser diode and at least one second laser diode, the at least one first laser diode emits optical signals in order in a first cycle, and the at least one second laser diode emits optical signals in order in a second cycle longer than the first cycle, and the controller is configured to:

set the first light-receiving area in the first sensor in accordance with the optical signals emitted in order by the at least one first laser diode in the first cycle; and set the second light-receiving area in the second sensor in accordance with the optical signals emitted in order by the at least one second laser diode in the second cycle.

* * * * *